United States Patent
Yang et al.

(10) Patent No.: US 11,490,414 B2
(45) Date of Patent: Nov. 1, 2022

(54) TECHNIQUES FOR INTRA-USER EQUIPMENT AND INTER-USER EQUIPMENT CANCELATION OF OVERLAPPING COMMUNICATIONS

(71) Applicant: QUALCOMM Incorporated, San Diego, CA (US)

(72) Inventors: Wei Yang, San Diego, CA (US); Seyedkianoush Hosseini, San Diego, CA (US); Peter Gaal, San Diego, CA (US); Wanshi Chen, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 74 days.

(21) Appl. No.: 17/174,272

(22) Filed: Feb. 11, 2021

(65) Prior Publication Data

US 2021/0259010 A1    Aug. 19, 2021

Related U.S. Application Data

(60) Provisional application No. 62/977,080, filed on Feb. 14, 2020.

(51) Int. Cl.
*H04W 72/14* (2009.01)
*H04W 72/12* (2009.01)

(52) U.S. Cl.
CPC ....... *H04W 72/14* (2013.01); *H04W 72/1247* (2013.01); *H04W 72/1284* (2013.01)

(58) Field of Classification Search
CPC ......... H04W 72/1242; H04W 72/1247; H04W 72/1268; H04W 72/1284; H04W 72/14
See application file for complete search history.

(56) References Cited

U.S. PATENT DOCUMENTS 11,044,708 B2 *   6/2021  Xu ................... H04L 1/1671
2019/0174428 A1 * 6/2019  Shao ................. H04W 52/346
(Continued)

OTHER PUBLICATIONS

Ericsson: "Inter-UE Prioritization and Multiplexing of UL Transmissions", 3GPP Draft, 3GPP TSG-RAN WG1 Meeting #99, R1-1911949, 3rd Generation Partnership Project (3GPP), Mobile Competence Centre; 650, Route Des Lucioles; F-06921, Sophia-Antipolis Cedex; France, vol. RAN WG1, No. Reno, NV, USA; Nov. 18, 2019- Nov. 22, 2019, Nov. 9, 2019 (Nov. 9, 2019), XP051823130, 11 pages, Retrieved from the Internet: URL: https://ftp.3gpp.org/tsg_ran/WG1_RL1/TSGR1_99/Docs/R1-1911949.zip R1 -1911949 Inter-UE Prioritization and Multiplexing of UL Transmissions.docx [retrieved on Nov. 9, 2019] paragraph [2.1.3].
(Continued)

*Primary Examiner* — Dung B Huynh
(74) *Attorney, Agent, or Firm* — Holland & Hart LLP/Qualcomm Incorporated

(57) ABSTRACT

Methods, systems, and devices for wireless communications are described. Wireless communications systems may employ one or more scheduling constraints to support efficient utilization of techniques for intra-device handling of overlapping scheduled uplink transmissions (e.g., intra-device dynamic resource cancelation and multiplexing) as well as inter-device handling of overlapping scheduled uplink transmissions (e.g., inter-device dynamic resource cancelation and multiplexing). Scheduling constraints may define how a device may apply intra-device and inter-device multiplexing and cancelation rules for various scenarios. For example, a device may apply intra-UE cancelation rules before inter-device cancelation rules. In some examples, later-received grants or uplink preemption indications (UL-PIs) may not change a device's previously established decision to drop an uplink transmission. As another example, a device may not expect to receive a grant for an uplink transmission that would arise in subsequent cancelation of that uplink transmission due to a previously-received grant or previously-received ULPI.

52 Claims, 22 Drawing Sheets

(56) References Cited

U.S. PATENT DOCUMENTS

| | | | | |
|---|---|---|---|---|
| 2019/0261391 | A1* | 8/2019 | Kundu | H04W 72/0446 |
| 2019/0349954 | A1* | 11/2019 | Quan | H04W 72/0413 |
| 2019/0394758 | A1* | 12/2019 | Cheng | H04W 76/27 |
| 2020/0068495 | A1* | 2/2020 | Yang | H04W 52/243 |
| 2020/0229104 | A1* | 7/2020 | MolavianJazi | H04W 52/367 |
| 2020/0296692 | A1* | 9/2020 | Lee | H04W 8/24 |
| 2020/0396701 | A1* | 12/2020 | Yi | H04W 52/367 |
| 2021/0028891 | A1* | 1/2021 | Zhou | H04L 1/1819 |
| 2021/0028910 | A1* | 1/2021 | Cheng | H04L 5/0094 |
| 2021/0029719 | A1* | 1/2021 | Zhou | H04L 5/0053 |
| 2021/0076405 | A1* | 3/2021 | Li | H04W 72/1284 |
| 2021/0160917 | A1* | 5/2021 | Goto | H04W 72/042 |
| 2021/0168783 | A1* | 6/2021 | Islam | H04W 72/10 |
| 2021/0168848 | A1* | 6/2021 | Chatterjee | H04W 72/1242 |
| 2021/0204215 | A1* | 7/2021 | Babaei | H04W 72/1289 |
| 2021/0243779 | A1* | 8/2021 | Takeda | H04W 72/0453 |
| 2021/0266941 | A1* | 8/2021 | Park | H04L 27/2607 |
| 2021/0337536 | A1* | 10/2021 | Li | H04L 5/0057 |
| 2021/0337538 | A1* | 10/2021 | Li | H04L 1/1664 |
| 2022/0039127 | A1* | 2/2022 | Li | H04W 72/1289 |
| 2022/0158774 | A1* | 5/2022 | Liu | H04L 1/1854 |
| 2022/0159683 | A1* | 5/2022 | Islam | H04W 72/042 |

OTHER PUBLICATIONS

International Search Report and Written Opinion—PCT/US2021/017771—ISA/EPO—Jun. 1, 2021.
Nokia, et al., "Intra-UE Prioritization for Collision Between Uplink Grants," 3GPP Draft, 3GPP TSG-RAN WG2 Meeting #105bis, R2-1904072 Intra-UE Prioritization for Collision Between Uplink Grants, 3rd Generation Partnership Project (3GPP), Mobile Competence Centre; 650, Route Des Lucioles; F-06921, Sophia-Antipolis Cedex; France, vol. RAN WG2, No. Xi'an, China, Apr. 8, 2019-Apr. 12, 2019, Apr. 6, 2019 (Apr. 6, 2019), XP051701387, 3 pages, Retrieved from the Internet: URL: http://www.3gpp.org/ftp/Meetings%5F3GPP%5FSYNC/RAN2/Docs/R2%2D1904072%2Ezip [retrieved on Apr. 6, 2019] p. 2.
Qualcomm Incorporated: "Intra-UE Prioritization Framework", 3GPP Draft, 3GPP TSG-RAN WG2 Meeting #106, R2-1907924, Intra-UE Prioritization Framework, 3rd Generation Partnership Project (3GPP), Mobile Competence Centre, 650, Route Des Lucioles, F-06921 Sophia-Antipolis Cedex, France, vol. RAN WG2, No. Reno, USA, May 13, 2019-May 17, 2019, May 13, 2019 (May 13, 2019), XP051731337, 12 pages, Retrieved from the Internet: URL: http://www.3gpp.org/Meetings%5F3GPP%5FSYNC/RAN2/Docs/R2%2D1907924%2Ezip. [retrieved on May 13, 2019] p. 1-p. 3, the whole document.
Qualcomm Incorporated: "Uplink Inter-UE Tx Multiplexing and Prioritization", 3GPP Draft, 3GPP TSG-RAN WG1 #98b, R1-1911122, Uplink Inter-UE Tx Multiplexing and Prioritization, 3rd Generation Partnership Project (3GPP), Mobile Competence Centre, 650, Route Des Lucioles, F-06921, Sophia-Antipolis Cedex, vol. RAN WG1, No. Chongqing, China, Oct. 14, 2019-Oct. 20, 2019, Oct. 8, 2019 (Oct. 8, 2019), XP051809292, 9 pages, Retrieved from the Internet: URL:https://ftp.3gpp.org/tsg_ran/WG1_RL1/TSGR1_98b/Docs/R1-1911122.zip, R1-1911122, Uplink Inter-UE Tx Multiplexing and Prioritization.docx [retrieved on Oct. 8, 2019], Section "2.3 Applicability of UL Cancellation Indication to Uplink channels". paragraph 2.2, figure 3.

* cited by examiner

TECHNIQUES FOR INTRA-USER EQUIPMENT AND INTER-USER EQUIPMENT CANCELATION OF OVERLAPPING COMMUNICATIONS

CROSS REFERENCE

The present application for patent claims the benefit of U.S. Provisional Patent Application No. 62/977,080 by YANG et al., entitled "TECHNIQUES FOR INTRA-USER EQUIPMENT AND INTER-USER EQUIPMENT CANCELLATION OF OVERLAPPING COMMUNICATIONS," filed Feb. 14, 2020, assigned to the assignee hereof, and expressly incorporated by reference herein.

FIELD OF TECHNOLOGY

The following relates generally to wireless communications and more specifically to techniques for intra-user equipment (UE) and inter-UE cancelation of overlapping communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems, such as NR systems, may support heterogeneous conditions for one or more service deployments. For example, communication devices, such as a base station or a UE, may support flexibility in allocating multiple supported services or traffic types over resources of a channel. As part of the allocation of channel resources, a base station and a UE may support the prioritization of some communications over others, which may include prioritization of traffic or services having different reliability thresholds, different latency thresholds, or both. In some cases, efficient system utilization may be based on how resources are shared or allocated between different traffic types, or how UEs are configured according to different traffic types.

SUMMARY

The described techniques relate to improved methods, systems, devices, and apparatuses that support techniques for intra-user equipment (UE) and inter-UE cancelation of overlapping communications. Generally, the described techniques provide for one or more scheduling constraints that may be defined regarding uplink transmissions (e.g., such as overlapping physical uplink shared channel (PUSCH) and physical uplink control channel (PUCCH) transmissions). For example, some wireless communications systems may support techniques for intra-UE handling of overlapping scheduled uplink transmissions (e.g., intra-UE multiplexing) as well as inter-UE handling of overlapping scheduled uplink transmissions (e.g., inter-UE multiplexing). Further, as described herein, wireless communications systems may employ one or more scheduling constraints to support efficient utilization of such techniques for intra-UE and inter-UE handling of overlapping scheduled transmissions.

For instance, the described techniques may provide for scheduling constraints that may define how a UE may apply intra-UE and inter-UE multiplexing and cancelation rules in various scenarios. For example, a UE may apply intra-UE cancelation rules (e.g., potentially resulting in a dropped uplink transmission) before inter-UE cancelation rules. In some examples, later-received grants or later-received uplink preemption indications (ULPIs) may not change the UE's decision to drop the uplink transmission. As another example of a scheduling constraint, a UE may not expect to receive a grant for an uplink transmission that would arise in subsequent cancelation of that uplink transmission due to a previously-received grant or previously-received uplink preemption indication (ULPI).

A method of wireless communication at a UE is described. The method may include receiving a first grant for a first uplink transmission scheduled for transmission by the UE, identifying that the first uplink transmission at least partially overlaps with a second uplink transmission also scheduled for transmission by the UE, and determining to drop the second uplink transmission based on a first scheduling constraint to resolve overlapping between the first uplink transmission and the second uplink transmission, where the first scheduling constraint is based at least in part on a first priority of the first uplink transmission being greater than a second priority of the second uplink transmission. The method may further include transmitting uplink data transmissions in accordance with a second scheduling constraint, where the second scheduling constraint relates to an additional uplink transmission scheduled by an additional grant received after the first grant and scheduled to at least partially overlap with the first uplink transmission, and where the second scheduling constraint is evaluated after satisfaction of the first scheduling constraint to resolve overlapping between the additional uplink transmission and the first uplink transmission after resolving overlapping between the first uplink transmission and the second uplink transmission.

An apparatus for wireless communication at a UE is described. The apparatus may include a processor, memory coupled with the processor, and instructions stored in the memory. The instructions may be executable by the processor to cause the apparatus to receive a first grant for a first uplink transmission scheduled for transmission by the UE, identify that the first uplink transmission at least partially overlaps with a second uplink transmission also scheduled for transmission by the UE, determine to drop the second uplink transmission based on a first scheduling constraint to resolve overlapping between the first uplink transmission and the second uplink transmission, where the first scheduling constraint is based at least in part a first priority of the first uplink transmission being greater than a second priority of the second uplink transmission, and transmit uplink data transmissions in accordance with a second scheduling constraint, where the second scheduling constraint relates to an additional uplink transmission scheduled by an additional grant received after the first grant and scheduled to at least partially overlap with the first uplink transmission, and where the second scheduling constraint is evaluated after satisfaction of the first scheduling constraint to resolve overlapping between the additional uplink transmission and the first uplink transmission after resolving overlapping between the first uplink transmission and the second uplink transmission.

Another apparatus for wireless communication at a UE is described. The apparatus may include means for receiving a first grant for a first uplink transmission scheduled for transmission by the UE, identifying that the first uplink transmission at least partially overlaps with a second uplink transmission also scheduled for transmission by the UE, determining to drop the second uplink transmission based on a first scheduling constraint to resolve overlapping between the first uplink transmission and the second uplink transmission, where the first scheduling constraint is based at least in part a first priority of the first uplink transmission being greater than a second priority of the second uplink transmission, and transmitting uplink data transmissions in accordance with a second scheduling constraint, where the second scheduling constraint relates to an additional uplink transmission scheduled by an additional grant received after the first grant and scheduled to at least partially overlap with the first uplink transmission, and where the second scheduling constraint is evaluated after satisfaction of the first scheduling constraint to resolve overlapping between the additional uplink transmission and the first uplink transmission after resolving overlapping between the first uplink transmission and the second uplink transmission.

A non-transitory computer-readable medium storing code for wireless communication at a UE is described. The code may include instructions executable by a processor to receive a first grant for a first uplink transmission scheduled for transmission by the UE, identify that the first uplink transmission at least partially overlaps with a second uplink transmission also scheduled for transmission by the UE, determine to drop the second uplink transmission based on a first scheduling constraint to resolve overlapping between the first uplink transmission and the second uplink transmission, where the first scheduling constraint is based at least in part a first priority of the first uplink transmission being greater than a second priority of the second uplink transmission, and transmit uplink data transmissions in accordance with a second scheduling constraint, where the second scheduling constraint relates to an additional uplink transmission scheduled by an additional grant received after the first grant and scheduled to at least partially overlap with the first uplink transmission, and where the second scheduling constraint is evaluated after satisfaction of the first scheduling constraint to resolve overlapping between the additional uplink transmission and the first uplink transmission after resolving overlapping between the first uplink transmission and the second uplink transmission.

Some examples of the method, apparatuses, and non-transitory computer-readable medium described herein may further include operations, features, means, or instructions for receiving the additional grant, and ignoring the received additional grant based on the second scheduling constraint until overlapping between the first uplink transmission and the second uplink transmission is resolved, where the second uplink transmission may be dropped based on the ignoring.

Some examples of the method, apparatuses, and non-transitory computer-readable medium described herein may further include operations, features, means, or instructions for receiving the additional grant for the additional uplink transmission scheduled for transmission by the UE, and determining to drop the first uplink transmission based on the additional uplink transmission at least partially overlapping with the first uplink transmission, where the second uplink transmission and the additional uplink transmission may be non-overlapping.

In some examples of the method, apparatuses, and non-transitory computer-readable medium described herein, transmitting the uplink data transmissions in accordance with the second scheduling constraint may include operations, features, means, or instructions for piggybacking at least a portion of the first uplink transmission on to the additional uplink transmission based on the determination to drop the first uplink transmission, and transmitting the additional uplink transmission and the piggybacked portion of the first uplink transmission, where the determination to drop the second uplink transmission may be maintained based on the second scheduling constraint.

In some examples of the method, apparatuses, and non-transitory computer-readable medium described herein, the first uplink transmission includes a high priority uplink control channel transmission or a high priority uplink shared channel transmission. In some examples of the method, apparatuses, and non-transitory computer-readable medium described herein, the second uplink transmission includes a low priority uplink control channel transmission, a low priority uplink shared channel transmission, or a sounding reference signal transmission. In some examples of the method, apparatuses, and non-transitory computer-readable medium described herein, the additional uplink transmission includes an additional high priority uplink transmission. In some examples of the method, apparatuses, and non-transitory computer-readable medium described herein, the additional grant includes a group-common grant, an uplink cancelation indication, or a slot format indicator.

A method of wireless communication at a UE is described. The method may include identifying that a first uplink transmission scheduled for transmission by the UE at least partially overlaps with a second uplink transmission also scheduled for transmission by the UE, receiving an uplink cancelation indication for a frequency-time resource that at least partially overlaps with the first uplink transmission, determining to drop the second uplink transmission based on a scheduling constraint to resolve overlapping between the first uplink transmission and the second uplink transmission, where the scheduling constraint is based at least in part on a first priority of the first uplink transmission being greater than a second priority of the second uplink transmission, and applying the uplink cancelation indication to the first uplink transmission after determining that the scheduling constraint is satisfied.

An apparatus for wireless communication at a UE is described. The apparatus may include a processor, memory coupled with the processor, and instructions stored in the memory. The instructions may be executable by the processor to cause the apparatus to identify that a first uplink transmission scheduled for transmission by the UE at least partially overlaps with a second uplink transmission also scheduled for transmission by the UE, receive an uplink cancelation indication for a frequency-time resource that at least partially overlaps with the first uplink transmission, determine to drop the second uplink transmission based on a scheduling constraint to resolve overlapping between the first uplink transmission and the second uplink transmission, where the scheduling constraint is based at least in part on a first priority of the first uplink transmission being greater than a second priority of the second uplink transmission, and apply the uplink cancelation indication to the first uplink transmission after determining that the scheduling constraint is satisfied.

Another apparatus for wireless communication at a UE is described. The apparatus may include means for identifying that a first uplink transmission scheduled for transmission by the UE at least partially overlaps with a second uplink transmission also scheduled for transmission by the UE, receiving an uplink cancelation indication for a frequency-time resource that at least partially overlaps with the first uplink transmission, determining to drop the second uplink transmission based on a scheduling constraint to resolve overlapping between the first uplink transmission and the second uplink transmission, where the scheduling constraint is based at least in part on a first priority of the first uplink transmission being greater than a second priority of the second uplink transmission, and applying the uplink cancelation indication to the first uplink transmission after determining that the scheduling constraint is satisfied.

A non-transitory computer-readable medium storing code for wireless communication at a UE is described. The code may include instructions executable by a processor to identify that a first uplink transmission scheduled for transmission by the UE at least partially overlaps with a second uplink transmission also scheduled for transmission by the UE, receive an uplink cancelation indication for a frequency-time resource that at least partially overlaps with the first uplink transmission, determine to drop the second uplink transmission based on a scheduling constraint to resolve overlapping between the first uplink transmission and the second uplink transmission, where the scheduling constraint is based at least in part on a first priority of the first uplink transmission being greater than a second priority of the second uplink transmission, and apply the uplink cancelation indication to the first uplink transmission after determining that the scheduling constraint is satisfied.

In some examples of the method, apparatuses, and non-transitory computer-readable medium described herein, applying the uplink cancelation indication to the first uplink transmission may include operations, features, means, or instructions for determining to drop the first uplink transmission based on the frequency-time resource at least partially overlapping with the first uplink transmission. In some examples of the method, apparatuses, and non-transitory computer-readable medium described herein, applying the uplink cancelation indication to the first uplink transmission may include operations, features, means, or instructions for determining to transmit the first uplink transmission even though the frequency-time resource at least partially overlaps with the first uplink transmission.

In some examples of the method, apparatuses, and non-transitory computer-readable medium described herein, the first uplink transmission includes a high priority uplink control channel transmission or a high priority uplink shared channel transmission. In some examples of the method, apparatuses, and non-transitory computer-readable medium described herein, the second uplink transmission includes a low priority uplink control channel transmission, a low priority uplink shared channel transmission, or a sounding reference signal transmission.

A method of wireless communication at a UE is described. The method may include receiving a first grant for a first uplink transmission scheduled for transmission by the UE, receiving, after receipt of the first grant, a second grant for a second uplink transmission scheduled for transmission by the UE, determining that the first uplink transmission and the second uplink transmission are scheduled so as to satisfy a scheduling constraint that is based on a first priority of the first uplink transmission being greater than a second priority of the second uplink transmission, the scheduling constraint further based on whether the first uplink transmission overlaps with the second uplink transmission, and transmitting the first uplink transmission or the second uplink transmission based on satisfaction of the scheduling constraint.

An apparatus for wireless communication at a UE is described. The apparatus may include a processor, memory coupled with the processor, and instructions stored in the memory. The instructions may be executable by the processor to cause the apparatus to receive a first grant for a first uplink transmission scheduled for transmission by the UE, receive, after receipt of the first grant, a second grant for a second uplink transmission scheduled for transmission by the UE, determine that the first uplink transmission and the second uplink transmission are scheduled so as to satisfy a scheduling constraint that is based on a first priority of the first uplink transmission being greater than a second priority of the second uplink transmission, the scheduling constraint further based on whether the first uplink transmission overlaps with the second uplink transmission, and transmit the first uplink transmission or the second uplink transmission based on satisfaction of the scheduling constraint.

Another apparatus for wireless communication at a UE is described. The apparatus may include means for receiving a first grant for a first uplink transmission scheduled for transmission by the UE, receiving, after receipt of the first grant, a second grant for a second uplink transmission scheduled for transmission by the UE, determining that the first uplink transmission and the second uplink transmission are scheduled so as to satisfy a scheduling constraint that is based on a first priority of the first uplink transmission being greater than a second priority of the second uplink transmission, the scheduling constraint further based on whether the first uplink transmission overlaps with the second uplink transmission, and transmitting the first uplink transmission or the second uplink transmission based on satisfaction of the scheduling constraint.

A non-transitory computer-readable medium storing code for wireless communication at a UE is described. The code may include instructions executable by a processor to receive a first grant for a first uplink transmission scheduled for transmission by the UE, receive, after receipt of the first grant, a second grant for a second uplink transmission scheduled for transmission by the UE, determine that the first uplink transmission and the second uplink transmission are scheduled so as to satisfy a scheduling constraint that is based on a first priority of the first uplink transmission being greater than a second priority of the second uplink transmission, the scheduling constraint further based on whether the first uplink transmission overlaps with the second uplink transmission, and transmit the first uplink transmission or the second uplink transmission based on satisfaction of the scheduling constraint.

In some examples of the method, apparatuses, and non-transitory computer-readable medium described herein, transmitting the first uplink transmission or the second uplink transmission based on satisfaction of the scheduling constraint may include operations, features, means, or instructions for transmitting the first uplink transmission. Some examples of the method, apparatuses, and non-transitory computer-readable medium described herein may further include operations, features, means, or instructions for identifying that the UE may have data to be included in the first uplink transmission, where the first uplink transmission may be transmitted based on the UE having data to be included in the first uplink transmission. Some examples of the method, apparatuses, and non-transitory computer-readable medium described herein may further include operations, features, means, or instructions for discarding the received second grant based on the scheduling constraint, where the first uplink transmission may be transmitted based on the discarding.

In some examples of the method, apparatuses, and non-transitory computer-readable medium described herein, the first grant includes a dynamic high priority grant. In some examples of the method, apparatuses, and non-transitory computer-readable medium described herein, transmitting the first uplink transmission or the second uplink transmission based on satisfaction of the scheduling constraint may include operations, features, means, or instructions for transmitting the second uplink transmission. Some examples of the method, apparatuses, and non-transitory computer-readable medium described herein may further include operations, features, means, or instructions for determining to skip the first uplink transmission based on a buffer status of the UE being below a threshold, where the second uplink transmission may be transmitted based on the determination to skip the first uplink transmission.

In some examples of the method, apparatuses, and non-transitory computer-readable medium described herein, the first uplink transmission includes a high priority scheduling request or a high priority uplink configured grant transmission. In some examples of the method, apparatuses, and non-transitory computer-readable medium described herein, the scheduling constraint may be satisfied based on the first uplink transmission and the second uplink transmission being non-overlapping.

In some examples of the method, apparatuses, and non-transitory computer-readable medium described herein, the first uplink transmission comprises a hybrid automatic repeat request acknowledgment transmission or a channel state information transmission. In some examples of the method, apparatuses, and non-transitory computer-readable medium described herein, the scheduling constraint provides that the UE does not expect to receive a grant scheduling a low priority uplink transmission that overlaps with a previously scheduled high priority uplink transmission.

A method of wireless communication at a UE is described. The method may include receiving an uplink cancelation indication for a first frequency-time resource, receiving, after receipt of the uplink cancelation indication, a grant for an uplink transmission scheduled for transmission by the UE in a second frequency-time resource, determining that the uplink transmission is scheduled so as to satisfy a scheduling constraint that is based on whether the first frequency-time resource overlaps with the second frequency-time resource, and determining to preempt the first frequency-time resource and transmit the uplink transmission based on satisfaction of the scheduling constraint.

An apparatus for wireless communication at a UE is described. The apparatus may include a processor, memory coupled with the processor, and instructions stored in the memory. The instructions may be executable by the processor to cause the apparatus to receive an uplink cancelation indication for a first frequency-time resource, receive, after receipt of the uplink cancelation indication, a grant for an uplink transmission scheduled for transmission by the UE in a second frequency-time resource, determine that the uplink transmission is scheduled so as to satisfy a scheduling constraint that is based on whether the first frequency-time resource overlaps with the second frequency-time resource, and determine to preempt the first frequency-time resource and transmit the uplink transmission based on satisfaction of the scheduling constraint.

Another apparatus for wireless communication at a UE is described. The apparatus may include means for receiving an uplink cancelation indication for a first frequency-time resource, receiving, after receipt of the uplink cancelation indication, a grant for an uplink transmission scheduled for transmission by the UE in a second frequency-time resource, determining that the uplink transmission is scheduled so as to satisfy a scheduling constraint that is based on whether the first frequency-time resource overlaps with the second frequency-time resource, and determining to preempt the first frequency-time resource and transmit the uplink transmission based on satisfaction of the scheduling constraint.

A non-transitory computer-readable medium storing code for wireless communication at a UE is described. The code may include instructions executable by a processor to receive an uplink cancelation indication for a first frequency-time resource, receive, after receipt of the uplink cancelation indication, a grant for an uplink transmission scheduled for transmission by the UE in a second frequency-time resource, determine that the uplink transmission is scheduled so as to satisfy a scheduling constraint that is based on whether the first frequency-time resource overlaps with the second frequency-time resource, and determine to preempt the first frequency-time resource and transmit the uplink transmission based on satisfaction of the scheduling constraint.

In some examples of the method, apparatuses, and non-transitory computer-readable medium described herein, the scheduling constraint may be satisfied based on the first frequency-time resource being entirely separate in time and frequency than the second frequency-time resource.

A method of wireless communication at a base station is described. The method may include transmitting a first grant for a first uplink transmission scheduled for transmission by a UE, identifying that the first uplink transmission at least partially overlaps with a second uplink transmission also scheduled for transmission by the UE, determining the second uplink transmission will be dropped by the UE based on a first scheduling constraint to resolve overlapping between the first uplink transmission and the second uplink transmission, where the first scheduling constraint is based at least in part on a first priority of the first uplink transmission being greater than a second priority of the second uplink transmission, and transmitting, after the first grant, an additional grant in accordance with a second scheduling constraint, where the second scheduling constraint relates to an additional uplink transmission scheduled by the additional grant and scheduled to at least partially overlap with the first uplink transmission, and where the second scheduling constraint is evaluated after satisfaction of the first scheduling constraint to resolve overlapping between the additional uplink transmission and the first uplink transmission after resolving overlapping between the first uplink transmission and the second uplink transmission.

An apparatus for wireless communication at a base station is described. The apparatus may include a processor, memory coupled with the processor, and instructions stored in the memory. The instructions may be executable by the processor to cause the apparatus to transmit a first grant for a first uplink transmission scheduled for transmission by a UE, identify that the first uplink transmission at least partially overlaps with a second uplink transmission also scheduled for transmission by the UE, determine the second uplink transmission will be dropped by the UE based on a first scheduling constraint to resolve overlapping between the first uplink transmission and the second uplink transmission, where the first scheduling constraint is based at least in part on a first priority of the first uplink transmission being greater than a second priority of the second uplink transmission, and transmit, after the first grant, an additional grant in accordance with a second scheduling constraint, where the second scheduling constraint relates to an additional uplink transmission scheduled by the additional grant and scheduled to at least partially overlap with the first uplink transmission, and where the second scheduling constraint is evaluated after satisfaction of the first scheduling constraint to resolve overlapping between the additional uplink transmission and the first uplink transmission after resolving overlapping between the first uplink transmission and the second uplink transmission.

Another apparatus for wireless communication at a base station is described. The apparatus may include means for transmitting a first grant for a first uplink transmission scheduled for transmission by a UE, identifying that the first uplink transmission at least partially overlaps with a second uplink transmission also scheduled for transmission by the UE, determining the second uplink transmission will be dropped by the UE based on a first scheduling constraint to resolve overlapping between the first uplink transmission and the second uplink transmission, where the first scheduling constraint is based at least in part on a first priority of the first uplink transmission being greater than a second priority of the second uplink transmission, and transmitting, after the first grant, an additional grant in accordance with a second scheduling constraint, where the second scheduling constraint relates to an additional uplink transmission scheduled by the additional grant and scheduled to at least partially overlap with the first uplink transmission, and where the second scheduling constraint is evaluated after satisfaction of the first scheduling constraint to resolve overlapping between the additional uplink transmission and the first uplink transmission after resolving overlapping between the first uplink transmission and the second uplink transmission.

A non-transitory computer-readable medium storing code for wireless communication at a base station is described. The code may include instructions executable by a processor to transmit a first grant for a first uplink transmission scheduled for transmission by a UE, identify that the first uplink transmission at least partially overlaps with a second uplink transmission also scheduled for transmission by the UE, determine the second uplink transmission will be dropped by the UE based on a first scheduling constraint to resolve overlapping between the first uplink transmission and the second uplink transmission, where the first scheduling constraint is based at least in part on a first priority of the first uplink transmission being greater than a second priority of the second uplink transmission, and transmit, after the first grant, an additional grant in accordance with a second scheduling constraint, where the second scheduling constraint relates to an additional uplink transmission scheduled by the additional grant and scheduled to at least partially overlap with the first uplink transmission, and where the second scheduling constraint is evaluated after satisfaction of the first scheduling constraint to resolve overlapping between the additional uplink transmission and the first uplink transmission after resolving overlapping between the first uplink transmission and the second uplink transmission.

Some examples of the method, apparatuses, and non-transitory computer-readable medium described herein may further include operations, features, means, or instructions for determining the transmitted additional grant will be ignored by the UE based on the second scheduling constraint until overlapping between the first uplink transmission and the second uplink transmission is resolved, where the second uplink transmission may be dropped based on the ignoring. Some examples of the method, apparatuses, and non-transitory computer-readable medium described herein may further include operations, features, means, or instructions for determining the first uplink transmission will be dropped by the UE based on transmitting the additional grant. Some examples of the method, apparatuses, and non-transitory computer-readable medium described herein may further include operations, features, means, or instructions for receiving the additional uplink transmission and a piggybacked portion of the first uplink transmission.

In some examples of the method, apparatuses, and non-transitory computer-readable medium described herein, the first uplink transmission includes a high priority uplink control channel transmission or a high priority uplink shared channel transmission. In some examples of the method, apparatuses, and non-transitory computer-readable medium described herein, the second uplink transmission includes a low priority uplink control channel transmission, a low priority uplink shared channel transmission, or a sounding reference signal transmission. In some examples of the method, apparatuses, and non-transitory computer-readable medium described herein, the additional uplink transmission includes an additional high priority uplink transmission. In some examples of the method, apparatuses, and non-transitory computer-readable medium described herein, the additional grant includes a group-common grant, an uplink cancelation indication, or a slot format indicator.

A method of wireless communication at a base station is described. The method may include identifying that a first uplink transmission scheduled for transmission by a UE at least partially overlaps with a second uplink transmission also scheduled for transmission by the UE, transmitting an uplink cancelation indication for a frequency-time resource that at least partially overlaps with the first uplink transmission, the second uplink transmission, or both, determining the second uplink transmission will be dropped by the UE based on a first scheduling constraint to resolve overlapping between the first uplink transmission and the second uplink transmission, where the first scheduling constraint is based at least in part on a first priority of the first uplink transmission being greater than a second priority of the second uplink transmission, and receiving the first uplink transmission in accordance with a second scheduling constraint, where the second scheduling constraint is evaluated after satisfaction of the first scheduling constraint, and where the second scheduling constraint relates to the frequency-time resource at least partially overlapping with the first uplink transmission, the second uplink transmission, or both.

An apparatus for wireless communication at a base station is described. The apparatus may include a processor, memory coupled with the processor, and instructions stored in the memory. The instructions may be executable by the processor to cause the apparatus to identify that a first uplink transmission scheduled for transmission by a UE at least partially overlaps with a second uplink transmission also scheduled for transmission by the UE, transmit an uplink cancelation indication for a frequency-time resource that at least partially overlaps with the first uplink transmission, the second uplink transmission, or both, determine the second uplink transmission will be dropped by the UE based on a first scheduling constraint to resolve overlapping between the first uplink transmission and the second uplink transmission, where the first scheduling constraint is based at least in part on a first priority of the first uplink transmission being greater than a second priority of the second uplink transmission, and receive the first uplink transmission in accordance with a second scheduling constraint, where the second scheduling constraint is evaluated after satisfaction of the first scheduling constraint, and where the second scheduling constraint relates to the frequency-time resource at least partially overlapping with the first uplink transmission, the second uplink transmission, or both.

Another apparatus for wireless communication at a base station is described. The apparatus may include means for identifying that a first uplink transmission scheduled for transmission by a UE at least partially overlaps with a second uplink transmission also scheduled for transmission by the UE, transmitting an uplink cancelation indication for a frequency-time resource that at least partially overlaps with the first uplink transmission, the second uplink transmission, or both, determining the second uplink transmission will be dropped by the UE based on a first scheduling constraint to resolve overlapping between the first uplink transmission and the second uplink transmission, where the first scheduling constraint is based at least in part on a first priority of the first uplink transmission being greater than a second priority of the second uplink transmission, and receiving the first uplink transmission in accordance with a second scheduling constraint, where the second scheduling constraint is evaluated after satisfaction of the first scheduling constraint, and where the second scheduling constraint relates to the frequency-time resource at least partially overlapping with the first uplink transmission, the second uplink transmission, or both.

A non-transitory computer-readable medium storing code for wireless communication at a base station is described. The code may include instructions executable by a processor to identify that a first uplink transmission scheduled for transmission by a UE at least partially overlaps with a second uplink transmission also scheduled for transmission by the UE, transmit an uplink cancelation indication for a frequency-time resource that at least partially overlaps with the first uplink transmission, the second uplink transmission, or both, determine the second uplink transmission will be dropped by the UE based on a first scheduling constraint to resolve overlapping between the first uplink transmission and the second uplink transmission, where the first scheduling constraint is based at least in part on a first priority of the first uplink transmission being greater than a second priority of the second uplink transmission, and receive the first uplink transmission in accordance with a second scheduling constraint, where the second scheduling constraint is evaluated after satisfaction of the first scheduling constraint, and where the second scheduling constraint relates to the frequency-time resource at least partially overlapping with the first uplink transmission, the second uplink transmission, or both.

In some examples of the method, apparatuses, and non-transitory computer-readable medium described herein, receiving the first uplink transmission in accordance with the second scheduling constraint may include operations, features, means, or instructions for determining the first uplink transmission will be dropped by the UE based on the frequency-time resource at least partially overlapping with the first uplink transmission. In some examples of the method, apparatuses, and non-transitory computer-readable medium described herein, receiving the first uplink transmission in accordance with the second scheduling constraint may include operations, features, means, or instructions for receiving the first uplink transmission based on the frequency-time resource at least partially overlapping with the second uplink transmission.

In some examples of the method, apparatuses, and non-transitory computer-readable medium described herein, the first uplink transmission includes a high priority uplink control channel transmission or a high priority uplink shared channel transmission. In some examples of the method, apparatuses, and non-transitory computer-readable medium described herein, the second uplink transmission includes a low priority uplink control channel transmission, a low priority uplink shared channel transmission, or a sounding reference signal transmission.

A method of wireless communication at a base station is described. The method may include transmitting a first grant for a first uplink transmission scheduled for transmission by a UE, identifying a scheduling constraint based on a first priority of the first uplink transmission being greater than a second priority of a second uplink transmission to be scheduled by a second grant transmitted after the first grant, and transmitting, after the first grant, the second grant in accordance with the scheduling constraint.

An apparatus for wireless communication at a base station is described. The apparatus may include a processor, memory coupled with the processor, and instructions stored in the memory. The instructions may be executable by the processor to cause the apparatus to transmit a first grant for a first uplink transmission scheduled for transmission by a UE, identify a scheduling constraint based on a first priority of the first uplink transmission being greater than a second priority of a second uplink transmission to be scheduled by a second grant transmitted after the first grant, and transmit, after the first grant, the second grant in accordance with the scheduling constraint.

Another apparatus for wireless communication at a base station is described. The apparatus may include means for transmitting a first grant for a first uplink transmission scheduled for transmission by a UE, identifying a scheduling constraint based on a first priority of the first uplink transmission being greater than a second priority of a second uplink transmission to be scheduled by a second grant transmitted after the first grant, and transmitting, after the first grant, the second grant in accordance with the scheduling constraint.

A non-transitory computer-readable medium storing code for wireless communication at a base station is described. The code may include instructions executable by a processor to transmit a first grant for a first uplink transmission scheduled for transmission by a UE, identify a scheduling constraint based on a first priority of the first uplink transmission being greater than a second priority of a second uplink transmission to be scheduled by a second grant transmitted after the first grant, and transmit, after the first grant, the second grant in accordance with the scheduling constraint.

Some examples of the method, apparatuses, and non-transitory computer-readable medium described herein may further include operations, features, means, or instructions for receiving the first uplink transmission based on the transmitted first grant. In some examples of the method, apparatuses, and non-transitory computer-readable medium described herein, the first grant includes a dynamic high priority grant. Some examples of the method, apparatuses, and non-transitory computer-readable medium described herein may further include operations, features, means, or instructions for receiving the second uplink transmission based on the transmitted additional grant. In some examples of the method, apparatuses, and non-transitory computer-readable medium described herein, the first uplink transmission includes a high priority scheduling request or a high priority uplink configured grant transmission.

Some examples of the method, apparatuses, and non-transitory computer-readable medium described herein may further include operations, features, means, or instructions for determining the UE skipped the first uplink transmission based on receiving the second uplink transmission, where the determination that the UE skipped the first uplink transmission may be based on a buffer status of the UE being below a threshold. In some examples of the method, apparatuses, and non-transitory computer-readable medium described herein, the scheduling constraint further relates to the second uplink transmission scheduled to overlap with the first uplink transmission.

In some examples of the method, apparatuses, and non-transitory computer-readable medium described herein, the first uplink transmission comprises a hybrid automatic repeat request acknowledgment transmission or a channel state information transmission. In some examples of the method, apparatuses, and non-transitory computer-readable medium described herein, the scheduling constraint provides that the UE does not expect to receive a grant scheduling a low priority uplink transmission that overlaps with a previously scheduled high priority uplink transmission.

A method of wireless communication at a base station is described. The method may include transmitting, to a UE, an uplink cancelation indication for a first frequency-time resource, identifying a scheduling constraint that is based on whether the first frequency-time resource overlaps with a second frequency-time resource of an uplink transmission to be scheduled by a grant, and transmitting, after transmission of the uplink cancelation indication, the grant for the uplink transmission in accordance with the scheduling constraint.

An apparatus for wireless communication at a base station is described. The apparatus may include a processor, memory coupled with the processor, and instructions stored in the memory. The instructions may be executable by the processor to cause the apparatus to transmit, to a UE, an uplink cancelation indication for a first frequency-time resource, identify a scheduling constraint that is based on whether the first frequency-time resource overlaps with a second frequency-time resource of an uplink transmission to be scheduled by a grant, and transmit, after transmission of the uplink cancelation indication, the grant for the uplink transmission in accordance with the scheduling constraint.

Another apparatus for wireless communication at a base station is described. The apparatus may include means for transmitting, to a UE, an uplink cancelation indication for a first frequency-time resource, identifying a scheduling constraint that is based on whether the first frequency-time resource overlaps with a second frequency-time resource of an uplink transmission to be scheduled by a grant, and transmitting, after transmission of the uplink cancelation indication, the grant for the uplink transmission in accordance with the scheduling constraint.

A non-transitory computer-readable medium storing code for wireless communication at a base station is described. The code may include instructions executable by a processor to transmit, to a UE, an uplink cancelation indication for a first frequency-time resource, identify a scheduling constraint that is based on whether the first frequency-time resource overlaps with a second frequency-time resource of an uplink transmission to be scheduled by a grant, and transmit, after transmission of the uplink cancelation indication, the grant for the uplink transmission in accordance with the scheduling constraint.

In some examples of the method, apparatuses, and non-transitory computer-readable medium described herein, the scheduling constraint may be satisfied based on the first frequency-time resource being entirely separate in time and frequency than the second frequency-time resource.

DETAILED DESCRIPTION

Figure 1:
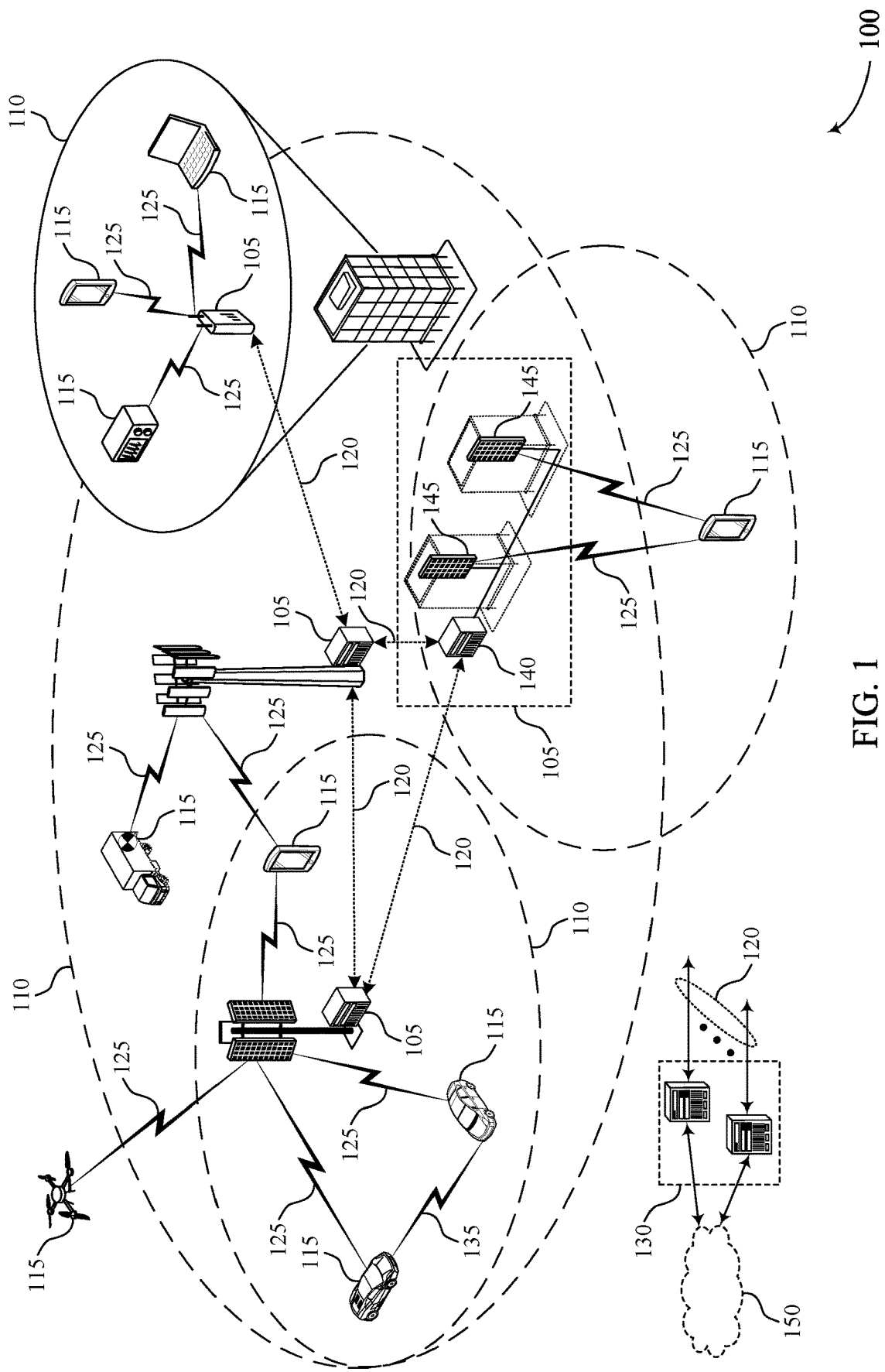
FIG. 1 illustrates an example of a wireless communications system that supports techniques for intra-user equipment (UE) and inter-UE cancelation of overlapping communications in accordance with aspects of the present disclosure.

Some communication systems may support different traffic types (e.g., traffic categories), which may include or refer to communications traffic having different reliability thresholds, different latency thresholds, different services, or various combinations thereof. For example, a wireless communication system may support a first traffic type (e.g., communications type), associated with relatively high reliability targets or thresholds and relatively low latency targets or thresholds, such as an ultra-reliable low-latency communications (URLLC) traffic type. The wireless communication system may also support a second traffic type, associated with relatively low reliability targets or thresholds and relatively long or relaxed latency thresholds, such as an enhanced mobile broadband (eMBB) traffic type. In some cases, to support various system operations (e.g., efficient utilization of wireless communication resources, appropriate allocation or balancing of wireless communication resources, or appropriate support of traffic according to different prioritizations or latency thresholds), a wireless communication system may support dynamic resource sharing between traffic types, such as a dynamic allocation of resources between URLLC communications and eMBB communications, or other communications, according to different traffic types, categories, or other prioritizations.

Generally, techniques for dynamic resource allocation may include cancelation, preemption, or repurposing of previously-allocated uplink resources by a network entity (e.g., such as a base station or other controller or resource allocation authority in communication with a base station). For example, a base station, or other network entity, may allocate or schedule uplink resources (e.g., an initial uplink resource allocation via an initial grant) to UEs, or groups of UEs, and the base station may subsequently reclaim or repurpose the scheduled uplink resources. In order to support such dynamic resource sharing, wireless communications systems may support intra-UE multiplexing and cancelation rules in addition to inter-UE multiplexing and cancelation rules.

For instance, intra-UE multiplexing and cancelation rules may include techniques for UE handling of uplink transmissions, scheduled for the UE, that overlap in time (e.g., such techniques may include uplink control information (UCI) piggybacking, periodic channel state information (P-CSI) dropping, etc.). For example, if a physical uplink control channel (PUCCH) carrying hybrid automatic repeat request (HARQ) feedback scheduled for the UE overlaps with a physical uplink shared channel (PUSCH) scheduled for the UE, the UE may follow intra-UE multiplexing and cancelation rules. If the two overlapping (e.g., colliding) uplink transmissions are of a same priority, the UE may multiplex the PUCCH with the PUSCH (e.g., the UCI of the PUCCH may be piggybacked onto the PUSCH, and the PUSCH may be transmitted). However, if the two overlapping transmissions are of different priorities (e.g., if a high priority PUSCH and a low priority PUSCH overlap), the lower priority uplink transmission may be dropped.

Inter-UE multiplexing and cancelation rules may include techniques for base station handling of uplink transmissions, scheduled for different UEs, that overlap in time (e.g., such techniques may include using an uplink preemption indication (ULPI) or a downlink preemption indication (DLPI) that may correspond to at least a portion of previously-allocated uplink or downlink resources). For example, a base station may allocate uplink resources (e.g., an initial uplink resource allocation) to a UE, and the base station may subsequently issue a preemption indication (e.g., an ULPI or a DLPI) to reclaim or reallocate at least a portion of the previously-allocated uplink resources. UEs may detect such a preemption indication and determine whether or not to proceed with an uplink transmission using their previously-allocated uplink resources (e.g., based on whether or not the preemption indication is directed to the UE, based on resources indicated by the ULPI, etc.). In some examples, a preemption indication may be used to prevent a UE from using at least a portion of previously-allocated uplink resources for an uplink transmission. For example, resources that were originally allocated to one UE for eMBB communications may be reallocated to another UE for URLLC communications (e.g., a reallocation towards more performance-sensitive communications).

However, in some scenarios, such techniques for dynamic resource allocation may be ambiguous or otherwise deficient. As an example, a UE may receive a first grant (e.g., for a low priority PUSCH) followed by a second grant (e.g., for a high priority PUCCH) and, in accordance with the rules mentioned above, the UE may decide to drop one of the scheduled transmissions (e.g., the low priority PUSCH scheduled by the first grant). However, it is also possible that the UE may receive a third grant (e.g., for a high priority PUSCH) which might allow for the previously scheduled high priority PUCCH to be multiplexed with the newly scheduled high priority PUSCH. In so doing, the third grant may remove the condition which caused the UE to elect to drop the low priority PUSCH. For instance, when the high priority PUCCH is piggybacked on the high priority PUSCH, the high priority PUCCH (e.g., which initially caused the UE to determine to drop the low priority PUSCH) may no longer overlap with the low priority PUSCH (e.g., as the UCI of the high priority PUCCH may be piggybacked onto the high priority PUSCH, and the high priority PUSCH may be associated with different resources than the resources of the high priority PUCCH that overlapped with the dropped, low priority PUSCH).

As such, the techniques described herein may provide for one or more scheduling constraints to support efficient utilization of dynamic resource allocation (e.g., to support efficient intra-UE and inter-UE handling of overlapping scheduled transmissions). For example, the described techniques may provide for scheduling constraints that may define how a UE may apply intra-UE and inter-UE multiplexing and cancelation rules in various scenarios. For example, a UE may apply intra-UE cancelation rules (e.g., potentially resulting in a dropped uplink transmission) before inter-UE cancelation rules. In some examples, later-received grants or later-received ULPIs may not change a UE's decision to drop an uplink transmission. As another example of a scheduling constraint, a UE may not expect to receive a grant for an uplink transmission that would arise in subsequent cancelation of that uplink transmission due to a previously-received grant or previously-received ULPI.

Thus, according to these and other examples, various uplink resource allocations may be unambiguously canceled, preempted, or reallocated, thereby supporting efficient dynamic allocation, preemption, and redistribution of uplink resources in a wireless communication system that more-effectively balances the performance and resource utilization of communications according to different priorities. Such may provide for more efficient resource utilization and resource reallocation within wireless communications systems supporting various different service deployments. Further, the described techniques (e.g., the described scheduling constraints) may provide for reduced computational complexity at the UE (e.g., due to the alleviated handling of ambiguous scenarios where a UE may otherwise transition back and forth between determinations of whether to cancel or perform an uplink transmission).

Aspects of the disclosure are initially described in the context of wireless communications systems. Example scheduling diagrams and an example process flow illustrating aspects of the discussed techniques and then described. Aspects of the disclosure are further illustrated by and described with reference to apparatus diagrams, system diagrams, and flowcharts that relate to techniques for intra-UE and inter-UE cancelation of overlapping communications.

FIG. 1 illustrates an example of a wireless communications system 100 that supports techniques for intra-UE and inter-UE cancelation of overlapping communications in accordance with aspects of the present disclosure. The wireless communications system 100 may include one or more base stations 105, one or more UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T\_s=1/((\Delta f\_max \cdot N\_f))$ seconds, where $\Delta f\_max$ may represent the maximum supported subcarrier spacing, and $N\_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., N sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may be configured to support different traffic types (e.g., traffic categories, traffic priorities, service priorities), which may include or refer to communications traffic having different reliability thresholds, different latency thresholds, different services, or various combinations thereof. For example, the wireless communications system 100 may support a first traffic type (e.g., communications type), associated with relatively high reliability targets or thresholds and relatively low latency targets or thresholds, such as a URLLC traffic type. The wireless communications system 100 may also support a second traffic type, associated with relatively low reliability targets or thresholds and relatively long or relaxed latency thresholds, such an an eMBB traffic type.

As an example, a PUSCH or a PUCCH transmission, including repetitions (if any), may be of priority index zero or of priority index one. A transmission of priority index zero may be a low priority transmission, and a transmission of priority index one may be a high priority transmission. If a priority index is not provided to a UE 115 for a PUSCH or a PUCCH transmission, the priority index of the PUSCH or PUCCH transmission may be zero.

In some cases, to support various system operations (e.g., efficient utilization of wireless communication resources, appropriate allocation or balancing of wireless communication resources, or appropriate support of traffic according to different prioritizations or latency thresholds), the wireless communications system 100 may support dynamic resource sharing between traffic types, such as a dynamic allocation of resources between URLLC communications and eMBB communications, or other communications, according to different traffic types, categories, or other prioritizations.

To support various uplink resource allocation techniques, a base station 105 or other network entity (e.g., an entity of the core network 130 or an entity of a distributed base station 105) may allocate uplink resources (e.g., an initial uplink resource allocation) to UEs 115, or groups of UEs 115, for uplink transmissions. In some examples, a base station 105 or other network entity may subsequently determine to perform a reallocation of the previously-allocated uplink resources, which may be triggered, for example, by a determined or detected need, demand, or request to support higher-priority communications. Thus, a base station 105 may transmit a new grant (e.g., to schedule an overlapping transmission on at least a portion of the previously-allocated uplink resources or the base station 105 may transmit an ULPI corresponding to at least a portion of the previously-allocated uplink resources. For example, a base station 105 or other network entity may generate and transmit an ULPI (e.g., which in some cases may be referred to as an uplink cancelation indication (ULCI)) that may correspond to at least a portion of the previously-allocated uplink resources (e.g., as allocated to particular UEs 115). UEs 115 may be configured to monitor for ULPIs, and accordingly may determine, based at least in part on received, detected, or decoded ULPIs, whether or not to proceed with uplink transmissions using their previously-allocated uplink resources.

In some examples, a ULPI may be used to prevent a UE 115 from using at least a portion of previously-allocated uplink resources for an uplink transmission, which may support a dynamic allocation of uplink resources from communications associated with one latency threshold to communications associated with another latency threshold, or some other reallocation based on communications prioritization. For example, resources that were originally allocated to a UE 115 for eMBB communications (e.g., allocated to eMBB UEs, such as UEs 115 configured for eMBB communications) may be reallocated to the same UE 115, or a different UE 115, for URLLC communications (e.g., a reallocation towards more performance-sensitive communications). For example, wireless communications system 100 may support intra-UE dynamic uplink resource allocation (e.g., where a base station 105 may reallocate resources originally allocated to the UE 115 to the same UE) and inter-UE dynamic uplink resource allocation (e.g., where a base station 105 may reallocate resources originally allocated to one UE 115 to a different UE 115). Thus, according to these and other examples, various types of uplink resource allocations may be canceled, preempted, or reallocated, such that the wireless communications system 100 may support a more dynamic redistribution of uplink resources according to different priorities of communications.

As discussed herein, wireless communications system 100 may employ one or more scheduling constraints that may be defined regarding uplink transmissions (e.g., such as overlapping PUSCH and PUCCH transmissions, overlapping PUSCH transmissions, etc.). For example, wireless communications system 100 may support one or more scheduling constraints to support efficient utilization of intra-UE and inter-UE handling of overlapping scheduled transmissions. For instance, wireless communications system 100 may implement scheduling constraints that may define how a UE 115 may apply intra-UE and inter-UE multiplexing and cancelation rules in various scenarios. For example, a UE 115 may apply intra-UE cancelation rules (e.g., potentially resulting in a dropped uplink transmission) before inter-UE cancelation rules. In some examples, later-received grants or later-received ULPIs (e.g., from a base station 105) may not change the UE 115's decision to drop the uplink transmission. As another example of a scheduling constraint, a UE 115 may not expect to receive a grant, from a base station 105, for an uplink transmission that would arise in subsequent cancelation of that uplink transmission due to a grant or ULPI previously received from the base station 105.

Figure 2:
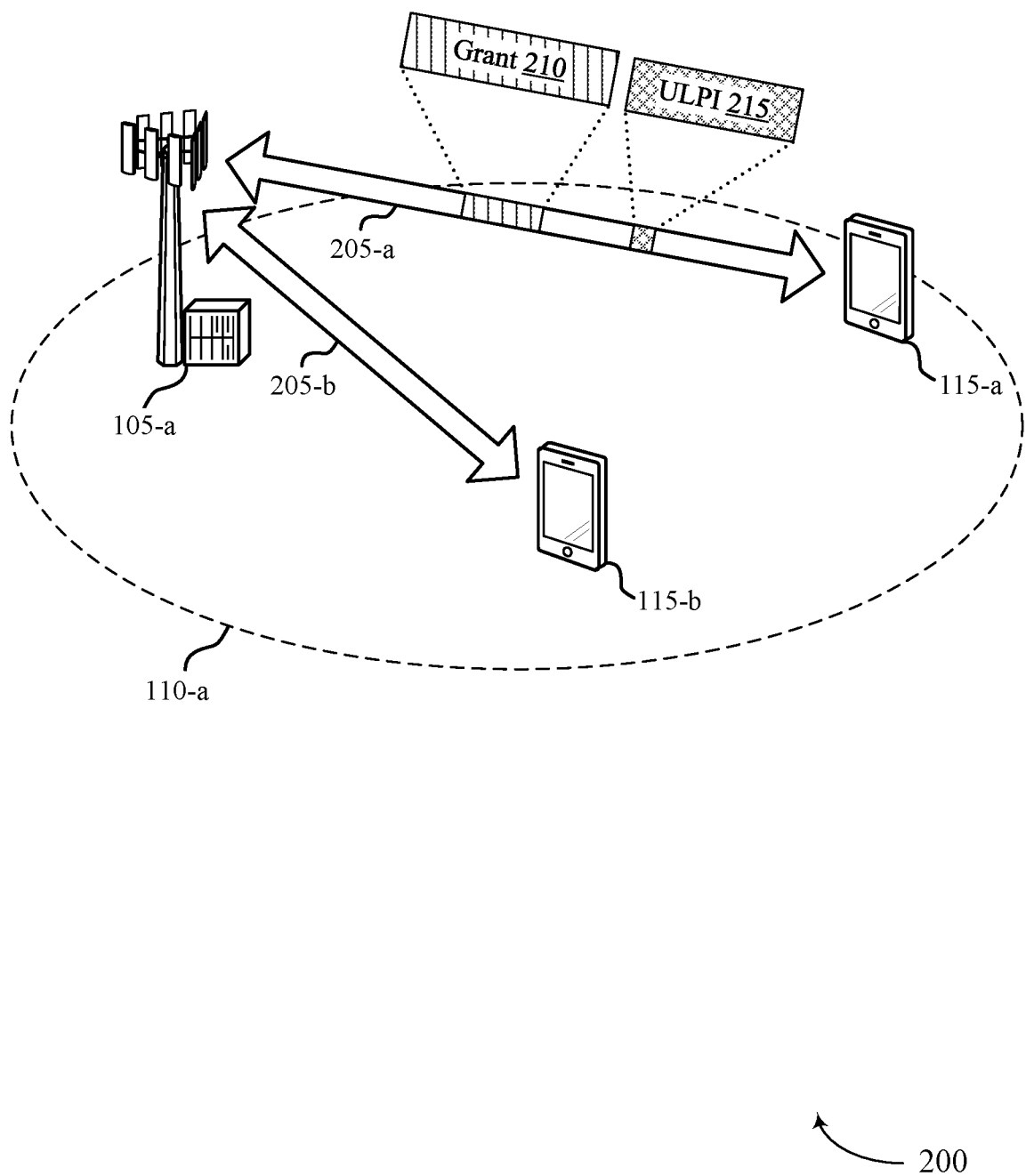
FIG. 2 illustrates an example of a wireless communications system that supports techniques for intra-UE and inter-UE cancelation of overlapping communications in accordance with aspects of the present disclosure.

FIG. 2 illustrates an example of a wireless communications system 200 that supports techniques for intra-UE and inter-UE cancelation of overlapping communications in accordance with aspects of the present disclosure. In some examples, wireless communications system 200 may implement aspects of wireless communications system 100. The wireless communications system 200 may include a base station 105-a that supports communication with multiple UEs (e.g., UE 115-a and UE 115-b) within a supported geographic coverage area 110-a. The base station 105-a may communicate with the UE 115-a on resources of a carrier 205-a, and the base station 105-a may communicate with the UE 115-b on resources of a carrier 205-b. In some examples, the communication may support mission critical applications that include stringent communication performance (e.g., reliability thresholds, latency thresholds) along with communications of other types. Wireless communications system 200 may implement aspects of wireless communications system 100, as described with reference to FIG. 1.

Generally, wireless communication system 200 illustrates an example where base station 105-a may act as a serving or source base station for UE 115-a and UE 115-b. For example, base station 105-a may schedule uplink and/or downlink communications between base station 105-a and UEs 115-a and 115-b. The scheduled communications may utilize dynamically and/or semi-statically configured resources, e.g., such as time, frequency, spatial, and/or code resources. In some aspects, base station 105-a may autonomously schedule such communications and/or allocate appropriate resources, or may do so in conjunction with one or more network entities, such as a core network. The downlink communications may include transmissions from base station 105-a to UE 115-a and/or UE 115-b and the uplink communications may include transmissions from UE 115-a and/or UE 115-b to base station 105-a.

Communications between base station 105-a and UEs 115 may include data and/or control information being communicated. For example, a data transmission may be communicated over a corresponding data channel, such as a physical downlink shared channel (PDSCH) and/or PUSCH. A control transmission may be communicated over a corresponding control channel, such as a physical downlink control channel (PDCCH) and/or PUCCH. Examples of control information being communicated may include, but are not limited to, acknowledgment/negative-acknowledgment (ACK/NACK) feedback, channel state information (CSI), scheduling request (SR), and the like. In the downlink, such control information may be referred to as downlink control information (DCI). In the uplink, such control information may be referred to more generally as uplink control information (UCI).

In some wireless communication systems, UEs 115 may be configured or otherwise scheduled to transmit uplink control information (e.g., ACK/NACK, CSI, SR, etc., communicated in an uplink control transmission) that collides (e.g., overlaps) in the time domain with an uplink data transmission (e.g., a PUSCH transmission). In this situation, UEs 115 may be allowed to piggyback (e.g., multiplex) the uplink control information (e.g., ACK/NACK) into the uplink data transmission (e.g., PUSCH).

In the wireless communications system 200, UE 115-a and UE 115-b may support different service deployments, such as URLLC services and eMBB services. For example, the UE 115-a may support URLLC transmissions to reduce end-to-end latency for data transmissions and receptions associated with the base station 105-a. In some examples, the UE 115-a may correspond to a URLLC UE that supports or is otherwise configured for transmissions, such as periodic transmissions, of relatively small data packets. For example, the UE 115-a may include a URLLC UE that supports operations and data communication associated with factory automation (e.g., automated manufacturing, supply chain management), transport (e.g., vehicle-to-vehicle (V2V) communications, vehicle-to-infrastructure (V21) communications), or electrical power distribution (e.g., power grid networking) within a supported area or locale, among other possible implementations.

Additionally, or alternatively, the UE 115-b may support eMBB transmissions associated with high data rates across wide coverage areas (such as geographic coverage area 110-a) supported by the base station 105-a. In some examples, compared to URLLC communications, eMBB communications may be associated with relatively relaxed (e.g., longer) latency targets or thresholds, lower reliability targets or thresholds, or both. Moreover, one or more of UE 115-a and UE 115-b may support data communications associated with multiple service deployments (such as URLLC and eMBB), as part of an intra-UE or inter-UE operation.

To support the conditions associated with the URLLC and eMBB service deployments, or other types of resource allocation based on communication prioritization, the base station 105-a and the UEs 115-a and 115-b may support various techniques for dynamic uplink resource allocations and uplink transmission cancelation or preemption. For example (e.g., for inter-UE dynamic resource allocation techniques), the base station 105-a may be configured to transmit a ULPI based at least in part on determining a reallocation of uplink resources (e.g., associated with uplink resources allocated to one or both of the UE 115-a or 115-b), and the UEs 115-a and 115-b may monitor for such ULPIs to determine how they should proceed with uplink communications. In other words, the UEs 115 may be notified about canceled uplink resources in the time domain and frequency domain. In various examples, each of the UE 115-a or the UE 115-b may perform uplink communication determinations such as determining whether to perform or proceed with uplink transmissions using at least a portion of their previously-allocated uplink resources, or determining to refrain from using at least a portion of their previously-allocated uplink resources, or determining to await another allocation of uplink resources before initiating or resuming uplink communications, or other determinations.

ULPIs may be signaled by the base station 105-a to UEs 115 (e.g., one or both of the UEs 115-a or 115-b or a group of UEs) according to various techniques. For example, a UE 115 may be configured to monitor for ULPIs according to various signaling by the base station 105-a, such as various types of downlink control signaling, physical channel signaling, cell-specific signaling, and others. In some examples, ULPIs may be conveyed in DCI over a PDCCH, which may support UE-specific ULPIs. In some examples, a UE 115 may be configured (e.g., by the base station 105 a) with a radio network temporary identifier (RNTI) for monitoring a PDCCH that may be carrying ULPIs. In various examples, a UE 115 may be configured with an RNTI that is common between uplink and downlink cancelation or preemption indications, or different between uplink and downlink cancelation or preemption indications. In some examples, ULPIs may be configured or conveyed in a group-common physical downlink control channel (GC-PDCCH) or otherwise conveyed in group-common DCI (GC-DCI), or DCI format 2_1, which may support signaling ULPIs that are relevant to sets of one or more UEs 115, and may reduce signaling overhead as compared to ULPIs that are conveyed in UE-specific signaling. In some examples, ULPIs, or GC-PDCCH or GC-DCI indications, may be configured for UEs 115 configured for particular communications, such as eMBB communications (e.g., configured for eMBB UEs).

Further (e.g., for intra-UE dynamic resource allocation techniques), the base station 105-a may be configured to transmit a grant (e.g., a new grant, a subsequent grant, etc.) based at least in part on determining a reallocation of uplink resources (e.g., associated with uplink resources previously allocated to a particular UE). UEs 115-a and 115-b may monitor for grants to determine how they should proceed with uplink communications. In other words, a UE 115 may receive a grant scheduling an uplink transmission over some resources. In some cases, the UE 115 may receive another grant (e.g., later in time) and be notified that the previously scheduled resources in the time domain and frequency domain overlap with the newly scheduled uplink transmission. In various examples, each of the UE 115-a or the UE 115-b may perform uplink communication determinations such as determining whether to perform or proceed with uplink transmissions using at least a portion of their previously-allocated uplink resources, or determining to refrain from using at least a portion of their previously-allocated uplink resources, or determining to await another allocation of uplink resources before initiating or resuming uplink communications, or other determinations.

In the example of FIG. 2, base station 105-a may transmit grants 210 (e.g., uplink grants 210, downlink grants 210) and ULPIs 215 to UE 115-a and UE 115-b for dynamic resource allocation techniques described herein. As discussed herein, wireless communications system 200 may support services with different reliability/latency requirements (e.g., such as eMBB communications, URLLC, communications, etc.). As such, wireless communications system 200 may dynamically multiplex UEs 115 with different services in the same time-frequency resource to achieve better spectrum utilization (e.g., according to intra-UE multiplexing and cancelation, as well as inter-UE multiplexing and cancelation).

Wireless communications system 200 may support intra-UE multiplexing and cancelation (e.g., dropping) for uplink when two uplink channels (e.g., two scheduled uplink transmissions) collide (e.g., overlap). If two uplink channels of the same priority collide, then the UE 115 may multiplex the payload in one uplink transmission. For example, if PUCCH collides with another PUCCH, a UE 115 may multiplex the UCI payload of the two channels and transmit them in one PUCCH. As another example, if PUSCH collides with another PUCCH, a UE 115 may piggyback the UCI of the PUCCH on the PUSCH transmission and transmit the PUSCH. Alternatively, if two uplink channels of different priorities collide, the UE may drop the channel with the lower priority. For example, for a high priority PUSCH colliding with a low priority PUSCH, the low priority PUSCH is dropped or canceled, and the high priority PUSCH is transmitted.

Further, wireless communications system 200 may support inter-UE multiplexing and cancelation (e.g., dropping) for uplink when two uplink channels collide (e.g., overlap). In other words, in addition to intra-UE multiplexing and cancelation, wireless communications system 200 may support preemption indications (PIs) (e.g., ULPIs and DLPIs) for inter-UE multiplexing and cancelation. PIs may allow base station 105-a to schedule URLLC transmissions on resources that were allocated to eMBB UEs 115 (e.g., base station 105-a may schedule URLLC transmissions for UE 115-a on resources previously allocated for eMBB transmission for UE 115-b). In the uplink, base station 105-a may use ULPI to indicate to the eMBB UEs to cancel part of its transmission (e.g., any or all of a transmission that overlaps with the URLLC transmission from other users). ULPI may be transmitted before the affected eMBB PUSCH transmission. In such scenarios, the eMBB UE may cancel the overlapping part of its transmission after receiving the ULPI, hence not interfering with the URLLC.

For PIs, time and frequency resources may be divided into a X*Y grid, where X represents the frequency domain and Y represents the time domain. The PI may indicate whether a corresponding frequency-time part (e.g., a frequency-time part on the X*Y grid) is preempted or not. For example, each location on the X*Y grid may correspond to a frequency-time part, and a ULPI may include a bit sequence that corresponds to each location on the X*Y grid (e.g., and thus a bit that corresponds to each frequency-time part). If the bit is set to '1' the ULPI may indicate that the corresponding frequency-time part is preempted (e.g., if the bit is set to '0' the ULPI may indicate that the corresponding frequency-time part is available).

A UE 115 may thus receive an ULPI and may compare any uplink transmissions (e.g., any scheduled uplink transmissions) with the ULPI. The UE 115 may thus preempt any uplink transmissions starting from the first overlapping OFDM symbol indicated by the ULPI. In some cases, if there are remaining transmission resources for the UE after preemption, the UE 115 may also cancel the remaining transmission resources (e.g., an ULPI may cause a UE 115 to cancel or drop a transmission, without resume, if the ULPI indicates frequency-time parts that at least partially overlap with the uplink transmission). In some examples, ULPI may only cancel PUSCH and sounding reference signal (SRS) transmissions (e.g., but ULPI may not cancel PUCCH). Further, a UE 115 may or may not adhere to ULPI (e.g., a UE 115 may or may not preempt resources indicated by an ULPI) when the ULPI preempts a high priority transmission (e.g., a high priority PUSCH).

However, in some scenarios, such techniques for dynamic resource allocation may be ambiguous or otherwise deficient. As an example, a UE 115 may receive a first grant 210 (e.g., for a low priority PUSCH) followed by a second grant 210 (e.g., for a high priority PUCCH) and, in accordance with the rules mentioned above, the UE 115 may decide to drop one of the scheduled transmissions (e.g., the low priority PUSCH scheduled by the first grant 210). However, it is also possible that the UE 115 may receive a third grant 210 (e.g., for a high priority PUSCH) which might allow for the previously scheduled high priority PUCCH to be multiplexed with the newly scheduled high priority PUSCH. In so doing, the third grant may remove the condition which caused the UE 115 to elect to drop the low priority PUSCH.

For instance, when the high priority PUCCH is piggybacked on the high priority PUSCH, the high priority PUCCH (e.g., which initially caused the UE 115 to determine to drop the low priority PUSCH) may no longer overlap with the low priority PUSCH (e.g., as the UCI of the high priority PUCCH may be piggybacked onto the high priority PUSCH, and the high priority PUSCH may be associated with different resources than the resources of the high priority PUCCH that overlapped with the dropped low priority PUSCH).

As such, according to the techniques described herein, wireless communications system 200 may implement one or more scheduling constraints to support efficient utilization of dynamic resource allocation (e.g., to support efficient intra-UE and inter-UE handling of overlapping scheduled transmissions which may allow a UE 115 to resolve overlapping between transmissions). For example, the described scheduling constraints may define how a UE 115 may apply intra-UE and inter-UE multiplexing and cancelation rules for various scenarios. For instance, a UE 115 may apply intra-UE cancelation rules (e.g., potentially resulting in a dropped uplink transmission) before inter-UE cancelation rules. In some examples, later-received grants 210 or later-received ULPIs 215 may not change a UE's decision to drop an uplink transmission. As another example of a scheduling constraint, a UE may not expect to receive a grant 210 for an uplink transmission that would arise in subsequent cancelation of that uplink transmission due to a previously-received grant 210 or a previously-received ULPI 215.

Thus, according to these and other examples, various uplink resource allocations may be unambiguously canceled, preempted, or reallocated, thereby supporting efficient dynamic allocation, preemption, and redistribution of uplink resources in wireless communication system 200. Wireless communications system 200 may more-effectively balance the performance and resource utilization of communications according to different priorities. Such may provide for more efficient resource utilization and resource reallocation within wireless communications system 200 supporting various different service deployments. Further, the described techniques (e.g., the described scheduling constraints) may provide for reduced computational complexity at UEs 115 (e.g., due to the alleviated handling of ambiguous scenarios where a UE 115 may otherwise transition back and forth between determinations of whether to cancel or perform an uplink transmission).

Figure 3A:
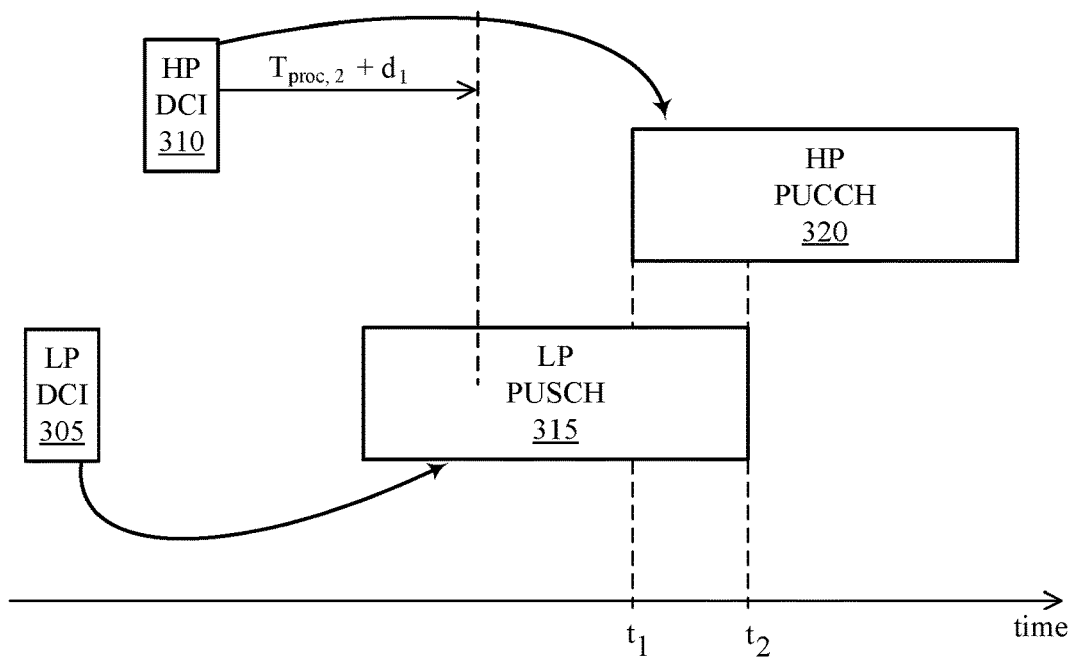
FIGS. 3A and 3B illustrate example scheduling diagrams that support techniques for intra-UE and inter-UE cancelation of overlapping communications in accordance with aspects of the present disclosure.

FIG. 3A illustrates an example of a scheduling diagram 300 that supports techniques for intra-UE and inter-UE cancelation of overlapping communications in accordance with aspects of the present disclosure. In some examples, scheduling diagram 300 may implement aspects of wireless communications system 100 and/or wireless communications system 200. Scheduling diagram 300 may illustrate an example of intra-UE resource cancelation for dynamic resource allocation techniques described herein.

For example, a UE may receive low priority (LP) DCI 305 (e.g., an uplink grant including DCI scheduling a low priority uplink transmission) which may schedule LP PUSCH 315 (e.g., a low priority uplink data transmission). After the LP DCI 305 (e.g., and prior to the LP PUSCH 315), a UE may receive high priority (HP) DCI 310 (e.g., a downlink grant for a high priority downlink transmission along with an associated high priority uplink control channel transmission) and may schedule HP PUCCH 320 that overlaps at least partially in time (e.g., collides) with the previously scheduled LP PUSCH 315 (e.g., from, in the present example, $t_1$ to $t_2$).

Generally, to resolve collisions (or overlapping) between uplink transmissions, a UE may first resolve collisions between uplink transmissions with same priority and then resolve collisions between uplink transmissions with different priorities. Resolving collisions as such, a UE may be left with a single uplink transmission. For instance, by resolving all collisions with the same priority first, a UE may be left with at most two channels (e.g., after resolving all collisions of high priority leaving one high priority channel and resolving all collisions of low priority leaving one low priority channel). Next, the UE may resolve collisions between uplink transmissions with different priorities such that, for example, if two channels remain after the first step, the UE may then resolve the remaining two channels and select the channel with higher priority for transmission.

Further, when a high priority uplink transmission (e.g., HP PUCCH 320) overlaps with a low priority uplink transmission (e.g., LP PUSCH 315) in a slot, the UE may cancel the low priority uplink transmission starting from a deterministic time ($T_{proc,2}+d_1$) after the end of PDCCH scheduling the high priority transmission (e.g., after the end of the HP DCI 310). For example, $T_{proc,2}$ may correspond to a UE processing time capability of a carrier and $d_1$ may be the time duration corresponding to the number (e.g., 0, 1, 2) of symbols reported by UE capability (e.g., note: $d_{1,2}=0$ may be for cancelation). The processing time (e.g., the minimum processing time) of the high priority channel (e.g., of HP PUCCH 320) may be extended by d2 symbols (e.g., where d2 may be the time duration corresponding to a number (e.g., 0, 1, 2) of symbols reported by UE capability). Generally, the overlapping condition may be per repetition of the uplink transmission.

In the example scheduling diagram 300, a UE may partially drop the low priority channel (e.g., the UE may partially drop LP PUSCH 315 after $T_{proc,2}+d_1$ from the end of HP DCI 310 scheduling the HP PUCCH 320). The UE may then transmit the HP PUCCH 320 based on the dropping of the overlapping LP PUSCH 315. However, as discussed herein, in some cases such techniques for dynamic resource allocation may be ambiguous or otherwise deficient without the scheduling constraints described herein (e.g., as described in more detail here, for example, with reference to example scheduling diagrams 301, 400, 500, and 501).

Figure 3B:
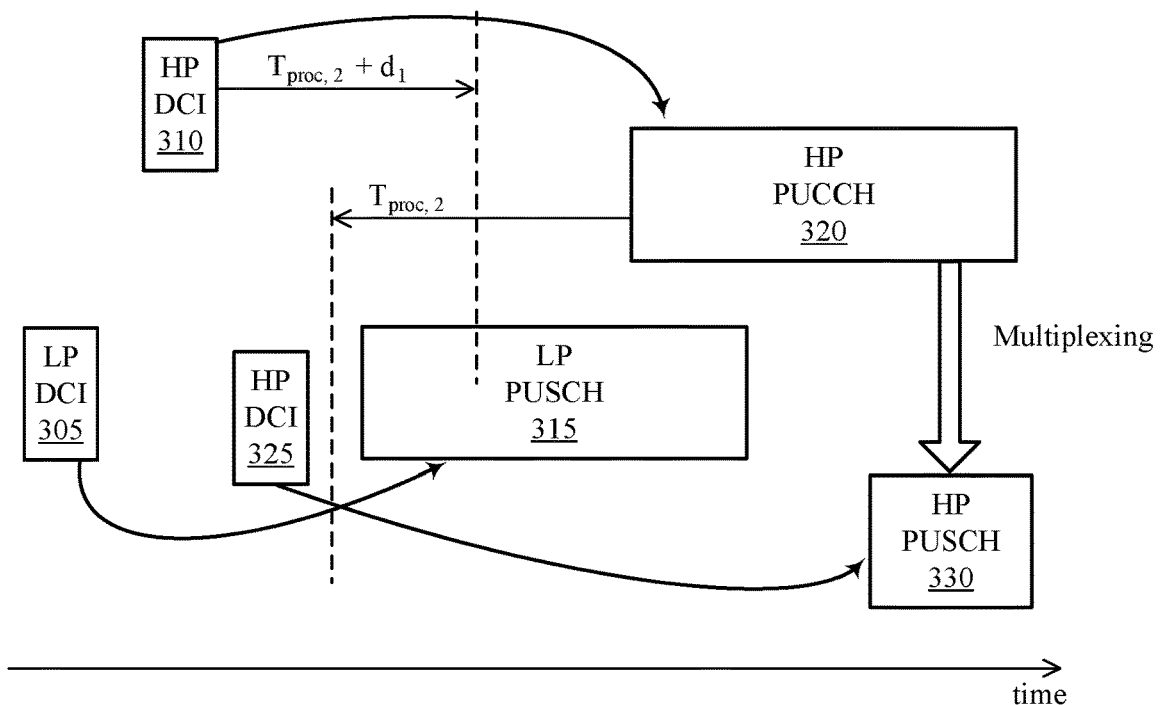

FIG. 3B illustrates an example of a scheduling diagram 301 that supports techniques for intra-UE and inter-UE cancelation of overlapping communications in accordance with aspects of the present disclosure. In some examples, scheduling diagram 301 may implement aspects of wireless communications system 100 and/or wireless communications system 200. Scheduling diagram 301 may illustrate an example of a cancelation determination permanency scheduling constraint in accordance with aspects of the techniques described herein. For example, in some scenarios, a cancelation determination permanency scheduling constraint may avoid intra-UE multiplexing and cancelation ambiguity, reduce computational complexity at the UE, etc., and may generally provide for more efficient dynamic resource allocation within wireless communications systems.

For example, a UE may receive LP DCI 305 (e.g., an uplink grant including DCI scheduling a low priority uplink transmission) which may schedule LP PUSCH 315 (e.g., a low priority uplink data transmission). After the LP DCI 305 (e.g., and prior to the LP PUSCH 315), a UE may receive HP DCI 310 (e.g., a downlink grant for a high priority downlink transmission along with an associated high priority uplink control channel transmission) and may schedule HP PUCCH 320 that overlaps at least partially in time (e.g., collides) with the previously scheduled LP PUSCH 315. As such, the UE may initially determine to drop the LP PUSCH 315 and transmit the HP PUCCH 320 (e.g., as described with reference to example scheduling diagram 300). That is, the UE may operate in accordance with a scheduling constraint that may indicate that the UE is to prioritize the HP PUCCH 320 over the LP PUSCH 315 (e.g., transmit the high priority uplink transmission and cancel the low priority uplink transmission).

However, in some cases, the UE may then receive an additional grant (e.g., HP DCI 325) scheduling an additional uplink transmission (e.g., scheduling HP PUSCH 330) prior to when the UE drops the LP PUSCH 315 (e.g., but after the UE has already made the decision to drop the LP PUSCH 315 at a time $T_{proc,2}+d_1$ after the received HP DCI 310). In such scenarios and in similar scenarios, without the one or more scheduling constraints described herein, the UE may need to first handle the two overlapping transmissions with the same priority (e.g., HP PUCCH 320 and HP PUSCH 330) according to intra-UE multiplexing and cancelation techniques described herein (e.g., according to intra-UE multiplexing and cancelation techniques without the described cancelation determination permanency scheduling constraint). That is, when resolving HP PUCCH 320 and HP PUSCH 330, the UE may determine to piggyback UCI of the HP PUCCH 320 on the HP PUSCH 330 and transmit the HP PUSCH 330. In other words, the UE may operate in accordance with a scheduling constraint that may indicate that the UE is to piggyback UCI of the HP PUCCH 320 on the HP PUSCH 330 (e.g., transmit the high priority uplink data transmission and cancel the high priority uplink control transmission). As such, HP PUCCH 320 may no longer overlap or collide with LP PUSCH 315. However, as discussed, the UE may have previously determined to cancel or drop the LP PUSCH 315 based on the two grants (e.g., LP DCI 305 and HP DCI 310) received prior to the additional grant (e.g., HP DCI 325).

Once a UE makes such a cancelation decision (e.g., for LP PUSCH 315), it may be computationally complex, time consuming, etc. to revert such a decision. In other words, it may be burdensome (e.g., in terms of computational capability, power consumption, etc.) on the UE to undo a cancelation determination and instead revert back to transmitting the uplink transmission (e.g., the LP PUSCH 315). However, according to conventional techniques for intra-UE multiplexing and cancelation for dynamic resource allocation (e.g., according to techniques without the described scheduling constraints), a base station may still expect to receive LP PUSCH 315 (e.g., as, in accordance with the UE handling same priority transmissions before different priority transmissions for all overlapped transmissions, LP PUSCH 315 does not overlap with HP PUSCH 330 that includes HP PUCCH 320 piggybacking and HP PUCCH 320 cancelation). As such, the UE may problematically revert its determination to cancel LP PUSCH 315 and proceed to transmit the LP PUSCH 315 (e.g., which may be inefficient or, in some cases, not possible), or the UE may not transmit LP PUSCH 315 even though a base station may expect the transmission (e.g., which may result in inefficient use of system resources).

The one or more scheduling constraints described herein may generally improve dynamic resource allocation. For example, wireless communications systems may implement a cancelation determination permanency scheduling constraint, such that once a cancelation determination is made the determination to cancel the transmission is maintained. In one aspect, once a UE resolves overlapping between uplink transmissions with different priorities in accordance with a first scheduling constraint, the UE may resolve overlapping between uplink transmissions with the same priority in accordance with a second scheduling constraint. Thus, the second scheduling constraint may refer to a scheduling constraint used to resolve overlapping between uplink transmissions with the same priority, or the second scheduling constraint may refer to the cancelation determination permanency scheduling constraint which may indicate that a UE is to maintain a decision to cancel a transmission once the decision is made. For instance, when a UE receives a second grant (e.g., HP DCI 310), the UE does not know that there will be an additional grant (e.g., HP DCI 325) in the future. Therefore, to avoid problematic scenarios (e.g., as discussed above) that may result in burdensome computational complexity at the UE, inefficient resource utilization (e.g., if the UE cannot transmit the LP PUSCH 315 that a base station is expecting), etc., the scheduling constraint (e.g., the cancelation determination permanency scheduling constraint) may be implemented as described herein.

A scheduling constraint (e.g., a cancelation determination permanency scheduling constraint) may be set by wireless communications systems to configure UEs to not look ahead or not make decisions based on future transmissions (e.g., based on future grants, such as based on possible HP DCI 325 at the time of reception of HP DCI 310). That is, when a UE determines to cancel a low priority transmission (e.g., LP PUSCH 315) due to conflict with a high priority transmission (e.g., HP PUCCH 320) scheduled by a PDCCH (e.g., HP DCI 310), the UE may not consider any other PDCCHs that is received after the end of the first PDCCH (e.g., the UE may determine to cancel LP PUSCH 315 after receiving HP DCI 310, without later considering HP DCI 325). In other words, once a decision to cancel a transmission (e.g., LP PUSCH 315) is made, the UE may not change its mind and un-cancel the transmission (e.g., LP PUSCH 315). Thus, the scheduling constraint may provide that the UE is allowed to resolve conflicts (or overlapping) between uplink transmissions associated with different priorities before (or after) resolving conflicts between uplink transmissions associated with the same priority. Note that, in this case, the second PDCCH (e.g., HP DCI 325) may be either a PDCCH scheduling another high priority transmission or a group-common PDCCH (e.g., an ULPI, or slot format indicator (SFI)).

For example, if a UE determines to transmit a first PUCCH of larger priority index in response to a first PDCCH (e.g., and the first PUCCH overlaps with a second PUCCH or a PUSCH of smaller priority index) and/or a PUSCH of larger priority index scheduled by a second PDCCH after the first PDCCH (e.g., and the UE would multiplex the UCI of the first PUCCH on the PUSCH of larger priority index), then the UE may cancel the second PUCCH or the PUSCH of smaller priority index starting from at least $T_{proc,2}+d_1$ symbols after the end of the last symbol of the first PDCCH.

Such a scheduling constraint may avoid potentially ambiguous situations by UEs not looking ahead, or by UEs resolving overlapping transmissions based on presently known information without considering potential changes that may arise from additional grants that have not been received (e.g., that may or may not be transmitted to the UE). As such, wireless communications systems may more efficiently utilize resources (e.g., and may more efficiently conduct dynamic resource allocation techniques) when implementing scheduling constraints (e.g., such as the described cancelation determination permanency scheduling constraint). For instance, upon initial transmission of LP DCI 305 and subsequent transmission of HP DCI 310, a base station may become aware that the UE will drop LP PUSCH 315. In scenarios where the base station still transmits HP DCI 325 at a later time, the base station may acknowledge the cancelation determination permanency scheduling constraint and may identify that the cancelation of LP PUSCH 315 will be maintained by the UE (e.g., such that the base station may know not to expect LP PUSCH 315, and such that the base station may reallocate or otherwise reuse resources associated with dropped LP PUSCH 315, which may improve spectral efficiency, reduce latency, etc.).

It should be noted that the grants described above (one grant including HP DCI 310 and a second grant including HP DCI 325) may be assumed to be in different PDCCHs (e.g., such that after receipt of a PDCCH including HP DCI 310, the UE determines to cancel LP PUSCH 315 prior to any receipt of a subsequent PDCCH including the HP DCI 325). In a scenario where the HP DCI 310 and HP DCI 325 are received in a single PDCCH, such ambiguity of future HP PUSCH 330 scheduling may not arise as the HP DCI 310 and HP DCI 325 are received in a single PDCCH (e.g., at the same time). In such a scenario, the UE may resolve HP PUCCH 320 and HP PUSCH 330 first and proceed to transmit both LP PUSCH 315 and HP PUSCH 330 (e.g., with HP PUCCH 320 piggybacking on HP PUSCH 330). As such, generally as used herein, an additional grant may refer to a grant received in a PDCCH monitoring occasion later in time than the PDCCH monitoring occasion that includes a grant resulting in a multiplexing or cancelation determination.

Further, it should be noted that the described scheduling constraint (e.g., the described cancelation determination permanency scheduling constraint) does not result in total ignorance of any additional grants received after a cancelation decision has been made in accordance with the cancelation determination permanency scheduling constraint. As used herein, a UE may "discard" an additional grant in regards to the cancelation decision, however the additional grant may still be observed for other future transmissions. For instance, in the example scheduling diagram 301, the UE may discard the HP DCI 325 in terms of any scheduling decisions pertaining to the already determined cancelation of LP PUSCH 315. However, the UE may still decode the HP DCI 325 (e.g., the additional grant) and deal with any overlapping transmissions accordingly.

That is, after a UE initially received LP DCI 305 and then subsequently receives HP DCI 310, the UE may determine to cancel LP PUSCH 315. Upon receipt of an additional grant (e.g., HP DCI 325), the UE may discard (e.g., ignore, not consider, etc.) the ramifications or impacts of the additional grant on the already established scheduling decisions (e.g., on the decision to drop LP PUSCH 315). However, the UE may still process the additional grant (e.g., HP DCI 325) and may proceed according to dynamic resource allocation techniques described herein (e.g., after dropping LP PUSCH 315, the UE may identify overlap between HP PUCCH 320 and HP PUSCH 330, multiplex UCI of HP PUCCH 320 on to HP PUSCH 330, and transmit the HP PUSCH 330 with the piggybacking). In other words, upon a decision or determination to cancel a transmission (e.g., a low priority transmission), the UE may not take into account (e.g., the UE may discard as far as any present scheduling decisions are concerned) any additional grants (e.g., in subsequent PDCCH) that may or may not be received prior to the dropping of the low priority transmission. However, the UE still honors the additional grant to resolve subsequent collisions (e.g., between the first uplink transmission, such as HP PUCCH 320, and additional uplink transmissions, such as HP PUSCH 330).

In some implementations of the described cancelation determination permanency scheduling constraint, wireless communications systems (e.g., UEs and base stations) may define such scheduling constraints as error cases. For example, a UE may not expect to be scheduled by a first PDCCH (e.g., a PDCCH including HP DCI 310) to cancel an uplink transmission (e.g., LP PUSCH 315), and then to receive a second PDCCH (e.g., a PDCCH including HP DCI 325) after the first PDCCH, where the second PDCCH changes the cancelation behavior. In other words, in some cases, wireless communications systems may implement the cancelation determination permanency scheduling constraint in the form of not allowing such scenarios to be configured (e.g., in the form of triggering an error case when a PDCCH changes the cancelation behavior caused by a previous PDCCH conveyed earlier in time).

Figure 4:
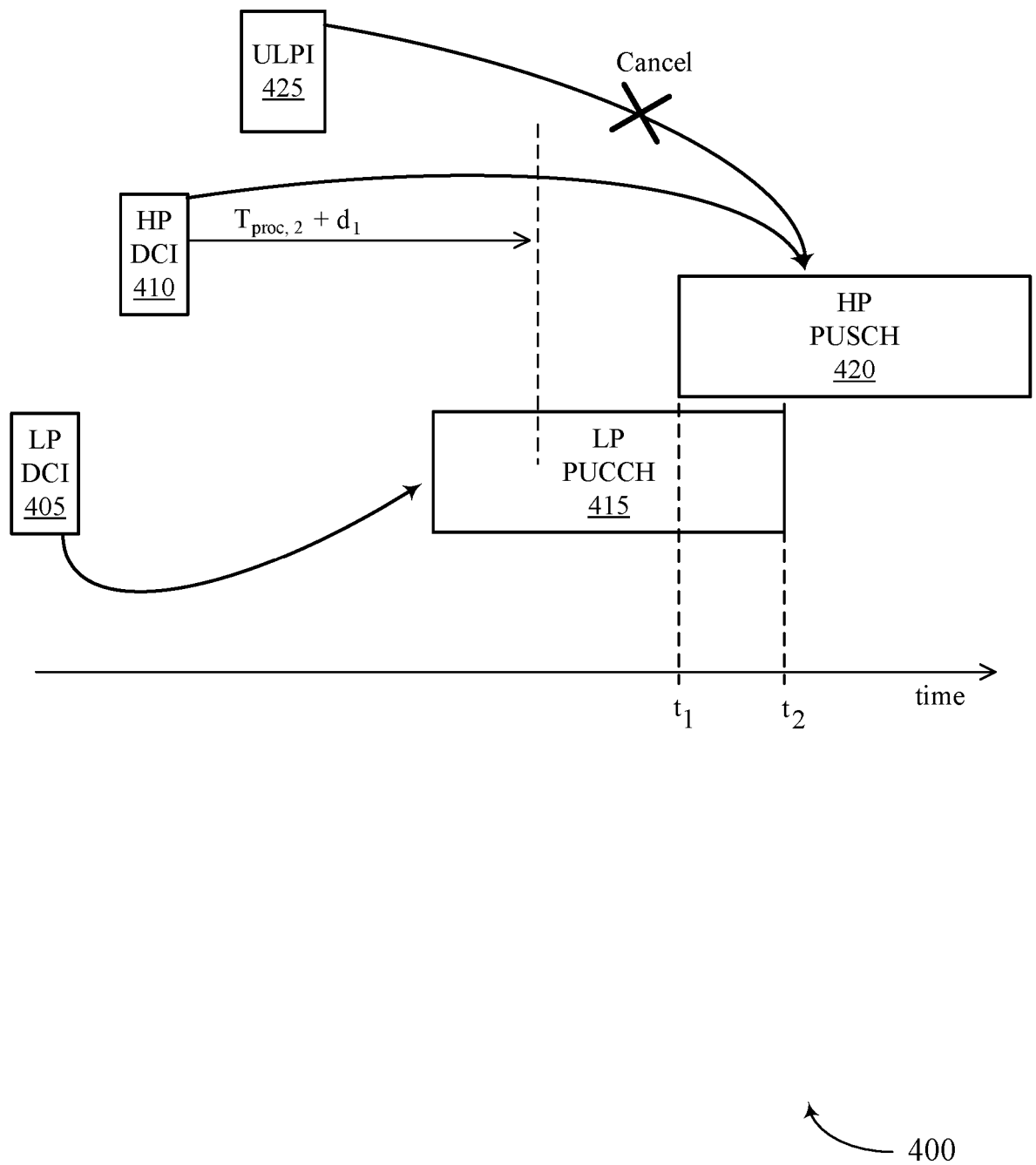
FIG. 4 illustrates an example of a scheduling diagram that supports techniques for intra-UE and inter-UE cancelation of overlapping communications in accordance with aspects of the present disclosure.

FIG. 4 illustrates an example of a scheduling diagram 400 that supports techniques for intra-UE and inter-UE cancelation of overlapping communications in accordance with aspects of the present disclosure. In some examples, scheduling diagram 400 may implement aspects of wireless communications system 100, wireless communications system 200, scheduling diagram 300, and/or scheduling diagram 301. Scheduling diagram 400 may illustrate an example of an intra-UE/inter-UE ordering scheduling constraint in accordance with aspects of the techniques described herein. For example, in some scenarios, an intra-UE/inter-UE ordering scheduling constraint may avoid multiplexing and cancelation ambiguity, reduce computational complexity at the UE, etc., and may generally provide for more efficient dynamic resource allocation within wireless communications systems.

For example, a UE may receive a first grant (e.g., a grant including LP DCI 405) that may schedule a first uplink transmission (e.g., LP PUCCH 415). After the LP DCI 405, the UE may receive a second grant (e.g., HP DCI 410) that may schedule a second uplink transmission (e.g., HP PUSCH 420). Therefore, HP DCI 410 may schedule HP PUSCH 420 that overlaps at least partially in time (e.g., collides) with the previously scheduled LP PUCCH 415 (e.g., from, in the present example, $t_1$ to $t_2$). As such, the UE may initially determine to drop the LP PUCCH 415 and transmit the HP PUSCH 420.

However, in some cases, the UE may then receive an additional indication (e.g., ULPI 425) which may indicate a frequency-time part that at least partially overlaps with HP PUSCH 420 (e.g., but after the UE has already made the decision to drop the LP PUCCH 415 at a time $T_{proc,2}+d_1$ after the received HP DCI 410). In such scenarios and in similar scenarios, without the one or more scheduling constraints described herein, the UE may determine to drop the low priority uplink transmission and may later, upon receipt of the ULPI 425, identify the overlap with the low priority uplink transmission no longer exists and try to un-cancel the dropped low priority uplink transmission.

That is, ULPI 425 may preempt a frequency-time part that at least partially overlaps with HP PUSCH 420 such that a UE may cancel HP PUSCH 420. As such, the overlap or collision between HP PUSCH 420 and LP PUCCH 415 may no longer be present. As discussed herein, once a UE makes such a cancelation decision (e.g., for LP PUCCH 415), it may be computationally complex, time consuming, etc. to revert such a decision. In other words, it may be burdensome (e.g., in terms of computational capability, power consumption, etc.) on the UE to undo a cancelation determination and instead revert back to transmitting the uplink transmission (e.g., the LP PUCCH 415). However, according to conventional techniques for dynamic resource allocation (e.g., according to techniques without the described scheduling constraints), a base station may still expect to receive LP PUCCH 415 (e.g., as after ULPI 425, the LP PUCCH 415 does not overlap with canceled HP PUSCH 420). As such, the UE may problematically revert its determination to cancel LP PUCCH 415 and proceed to transmit the LP PUCCH 415 (e.g., which may be inefficient or, in some cases, not possible), or the UE may not transmit LP PUCCH 415 even though a base station may expect the transmission (e.g., which may result in inefficient use of system resources).

The one or more scheduling constraints described herein may generally improve dynamic resource allocation. For example, wireless communications systems may implement an intra-UE/inter-UE ordering scheduling constraint, such that a UE always applies PIs after intra-UE multiplexing and dropping/cancelation has been performed. The UE may perform dropping/cancelation in accordance with a PI (e.g., after receiving DCI with DCI format 2_4) on uplink transmissions determined from performing intra-UE multiplexing and dropping/cancelation. For instance, when a UE resolves overlapping transmissions, the UE may first resolve intra-UE collisions and then resolve inter-UE collisions (e.g., resolve any received PIs). In other words, the decision to resolve intra-UE overlapping uplink channels may not be impacted by the ULPI. Therefore, to avoid problematic scenarios (e.g., as discussed above) that may result in burdensome computational complexity at the UE, inefficient resource utilization (e.g., if the UE cannot transmit the LP PUCCH 415 that a base station is expecting), etc., the scheduling constraint (e.g., the intra-UE/inter-UE ordering scheduling constraint) may be implemented as described herein.

For instance, if a UE would transmit multiple overlapping PUCCHs and PUSCHs or SRSs or multiple overlapping PUSCHs and SRSs, and if the UE detects a DCI (e.g., a DCI format 2_4, an ULPI, etc.) to cancel at least one of the PUSCH transmissions or SRS transmissions, the UE behavior to resolve the overlapping among the multiple overlapping PUCCHs, PUSCHs and SRSs may not change due to detection of DCI (e.g., DCI format 2_4).

Such a scheduling constraint may avoid potentially ambiguous situations where a UE and/or base station may be unaware of whether or not a UE will be able to transmit an uplink transmission previously canceled (e.g., due to timing of grants and/or PIs, such as due to the timing of ULPI 425 after HP DCI 410 in the example of FIG. 4). As such, wireless communications systems may more efficiently utilize resources (e.g., and may more efficiently conduct dynamic resource allocation techniques) when implementing scheduling constraints (e.g., such as the described intra-UE/inter-UE ordering scheduling constraint). For instance, upon initial transmission of LP DCI 405 and subsequent transmission of HP DCI 410, a base station may become aware that the UE will drop LP PUCCH 415 in accordance with the handling of intra-UE multiplexing/cancelation prior to any inter-UE multiplexing/cancelation. In other words, a base station may be aware that the UE will drop LP PUCCH 415 after receipt of HP DCI 410 regardless of any subsequent PIs transmitted by the base station (e.g., as the UE will handle intra-UE multiplexing/cancelation first in accordance with the intra-UE/inter-UE ordering scheduling constraint).

In scenarios where the base station transmits additional or subsequent PIs at a later time (e.g., such as ULPI 425 after HP DCI 410 and LP DCI 405), the base station may acknowledge the intra-UE/inter-UE ordering scheduling constraint and may identify that the cancelation of LP PUCCH 415 will be performed by the UE regardless based on intra-UE multiplexing/cancelation (e.g., such that the base station may know not to expect LP PUCCH 415, and such that the base station may reallocate or otherwise reuse resources associated with dropped LP PUCCH 415, which may improve spectral efficiency, reduce latency, etc.).

Figure 5A:
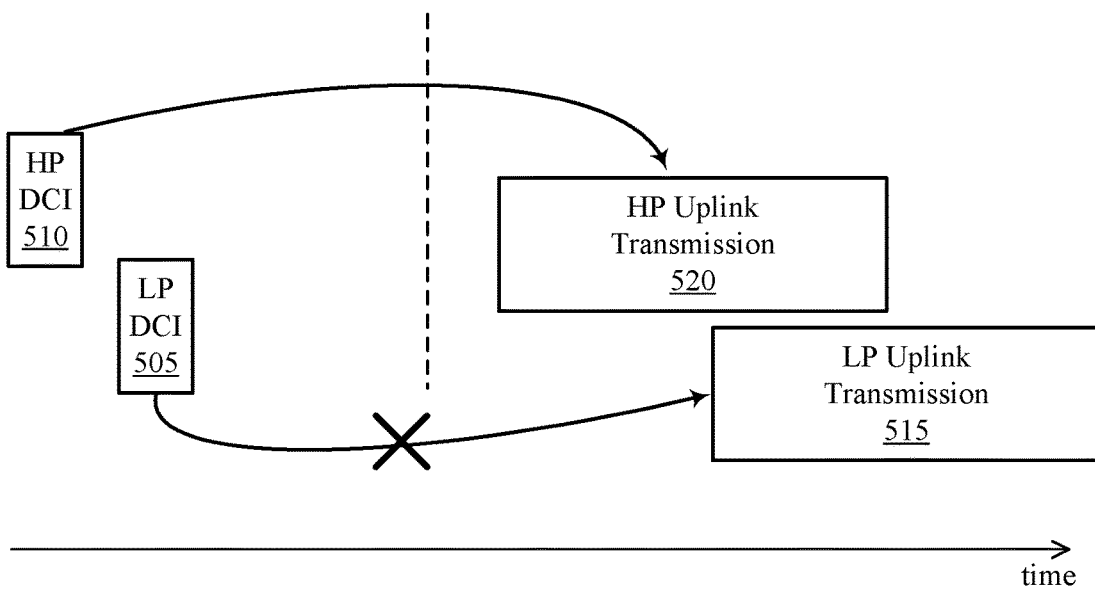
FIGS. 5A and 5B illustrate example scheduling diagrams that support techniques for intra-UE and inter-UE cancelation of overlapping communications in accordance with aspects of the present disclosure.

FIG. 5A illustrates an example of a scheduling diagram 500 that supports techniques for intra-UE and inter-UE cancelation of overlapping communications in accordance with aspects of the present disclosure. In some examples, scheduling diagram 500 may implement aspects of wireless communications system 100, wireless communications system 200, scheduling diagram 300, scheduling diagram 301, and/or scheduling diagram 400. Scheduling diagram 500 may illustrate an example of a prior allocation knowledge scheduling constraint in accordance with aspects of the techniques described herein. For example, in some scenarios, a prior allocation knowledge scheduling constraint may reduce unnecessary overhead, avoid multiplexing and cancelation ambiguity, reduce computational complexity at the UE, etc., and may generally provide for more efficient dynamic resource allocation within wireless communications systems.

For example, a UE may receive a first grant (e.g., HP DCI 510) scheduling a first transmission (e.g., an HP uplink transmission 520). In such scenarios, according to the described prior allocation knowledge scheduling constraint, there may be only a few cases where the UE may expect to receive a subsequent (e.g., a second) grant (e.g., LP DCI 505) scheduling a second transmission (e.g., an LP uplink transmission 515) that overlaps with the initially scheduled HP uplink transmission 520. For instance, in cases where an HP DCI 510 is a dynamic grant for a dynamic resource allocation, base station transmission of an LP DCI 505 to schedule an LP uplink transmission 515 may waste overhead resources and may be otherwise inefficient as the UE may already be known to cancel the LP uplink transmission 515 on behalf of the overlapped HP uplink transmission 520 (e.g., which the base station may already have been aware of due to the earlier transmission of the HP DCI 510). As such, in accordance with the prior allocation knowledge scheduling constraint, a UE may not expect to be dynamically configured to transmit a low priority uplink transmission that overlaps with a previously dynamically scheduled (e.g., dynamically configured) high priority uplink transmission.

Generally, the prior allocation knowledge scheduling constraint may provide for a base station being constrained or prohibited from scheduling a transmission that it knows will be canceled by the UE (e.g., from scheduling a low priority transmission that overlaps with a previously dynamically configured high priority transmission). Such may reduce unnecessary overhead (e.g., of base station signaling of LP DCI 505 that will not be scheduled by a UE), reduce unnecessary decoding and power consumption by a UE (e.g., unnecessary decoding of LP DCI 505 by a UE), etc.

As an example, in some cases, a base station may schedule a UE to transmit HARQ-ACK information in response to a PDSCH reception without a corresponding PDCCH (e.g., a semi-persistently scheduled (SPS) PDSCH), or the base station may schedule the UE to transmit a PUSCH with one or more semi-persistent channel state information (CSI) reports. In such cases, the UE may always transmit the HARQ-ACK information and the CSI reports, and, as such, the base station may avoid scheduling low priority uplink transmissions that overlap with previously scheduled high priority uplink transmissions. Thus, the prior allocation knowledge scheduling constraint may indicate that the UE does not expect to be scheduled for a low priority uplink transmission that overlaps with a previously scheduled HARQ-ACK transmission or CSI transmission. In some aspects, the HARQ-ACK for SPS PDSCH and the semi-persistent CSI reports on PUSCH may be scheduled or activated by DCI (e.g., activation DCI), and the UE may not expect to receive a low priority grant after the activation DCI (e.g., where the low priority grant schedules a low priority uplink transmission overlapping the HARQ-ACK or CSI report transmission).

However, the prior allocation knowledge scheduling constraint may provide for some scenarios where transmission of a low priority grant subsequent to a high priority grant may be efficient. For example, if the high priority uplink transmission (e.g., HP uplink transmission 520) is not dynamically configured (e.g., is RRC configured), the base station may transmit a low priority grant that may schedule a transmission that overlaps with the high priority uplink transmission (e.g., as the UE may or may not use the HP uplink transmission 520 when it is not dynamically configured). For instance, in cases where HP uplink transmission 520 is a high priority SR transmission or a high priority uplink configured grant transmission, the UE may or may not have new data in order to use the HP uplink transmission 520. For instance, if the HP uplink transmission 520 is a high priority SR transmission and the UE has no new data to transmit (e.g., if the UE has a high priority data buffer status below some threshold), the UE may skip or otherwise drop the HP transmission 520 regardless of whether another transmission is overlapping or not. As such, from the base station perspective, the high priority transmission (e.g., HP uplink transmission 520) may, in some cases, not be transmitted by the UE (e.g., if there is no HP data generated by the UE).

Therefore, in such scenarios where the UE is known to potentially skip the HP uplink transmission 520 (e.g., when HP uplink transmission 520 is not dynamically configured), the prior allocation knowledge scheduling constraint may still allow for base station transmission of an additional grant (e.g., LP DCI 505) that schedules a second transmission that at least partially overlaps with the HP uplink transmission 520. In some cases, the UE may have HP data and may thus cancel or drop the LP uplink transmission 515. In other cases, the UE buffer status for HP data may be below a threshold and the UE may thus perform the LP uplink transmission 515 (e.g., and skip or cancel the HP uplink transmission 520).

Figure 5B:
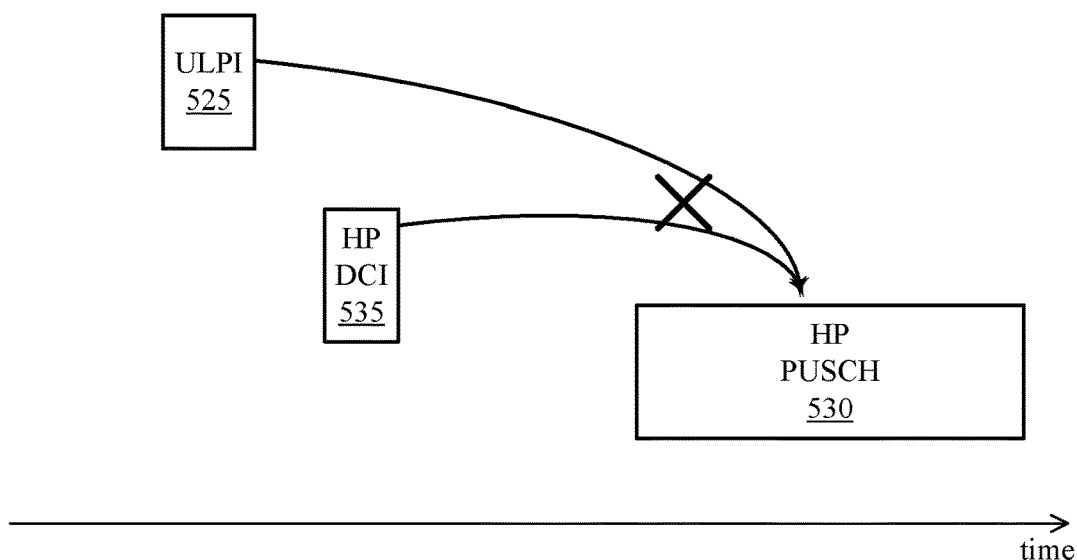

FIG. 5B illustrates an example of a scheduling diagram 501 that supports techniques for intra-UE and inter-UE cancelation of overlapping communications in accordance with aspects of the present disclosure. In some examples, scheduling diagram 501 may implement aspects of wireless communications system 100, wireless communications system 200, scheduling diagram 300, scheduling diagram 301, scheduling diagram 400, and/or scheduling diagram 500. Scheduling diagram 501 may illustrate another example of a prior allocation knowledge scheduling constraint in accordance with aspects of the techniques described herein. For example, in some scenarios, a prior allocation knowledge scheduling constraint may reduce unnecessary overhead, avoid multiplexing and cancelation ambiguity, reduce computational complexity at the UE, etc., and may generally provide for more efficient dynamic resource allocation within wireless communications systems.

For example, a UE may receive a PI (e.g., ULPI 525) preempting one or more frequency-time parts. According to the prior allocation knowledge scheduling constraint described herein, the UE may not expect to be scheduled by an additional grant (e.g., HP DCI 535) that schedules a PUSCH/SRS (e.g., HP PUSCH 530) on a resource (e.g., symbols) if any part of the resource (e.g., any of the symbols) is indicated as unavailable by the previously scheduled ULPI 525. In other words, upon transmission of ULPI 525, a base station is not expected to schedule a transmission over any resources (e.g., or frequency-time parts) overlapping with any of the one or more frequency-time parts indicated by the ULPI 525. For example, a base station may not send the scheduling grant in the same PDCCH monitoring occasion as the ULPI or after the PDCCH monitoring occasion where the UE detects the ULPI. In other words, the base station may schedule the transmission prior to transmission of ULPI, but not at the same time or after the transmission of ULPI.

Generally, the prior allocation knowledge scheduling constraint may provide for a base station being constrained or prohibited from scheduling a transmission that it knows will be canceled by the UE (e.g., from scheduling a transmission that overlaps with resources indicated as unavailable by a previously transmitted PI). Such may reduce unnecessary overhead (e.g., of base station signaling HP DCI 535 that will not be scheduled by a UE), reduce unnecessary decoding and power consumption by a UE (e.g., of unnecessary decoding of HP DCI 535 by a UE), etc. As such, wireless communications systems may more efficiently utilize resources (e.g., and may more efficiently conduct dynamic resource allocation techniques) when implementing scheduling constraints (e.g., such as the described prior allocation knowledge scheduling constraint).

Figure 6:
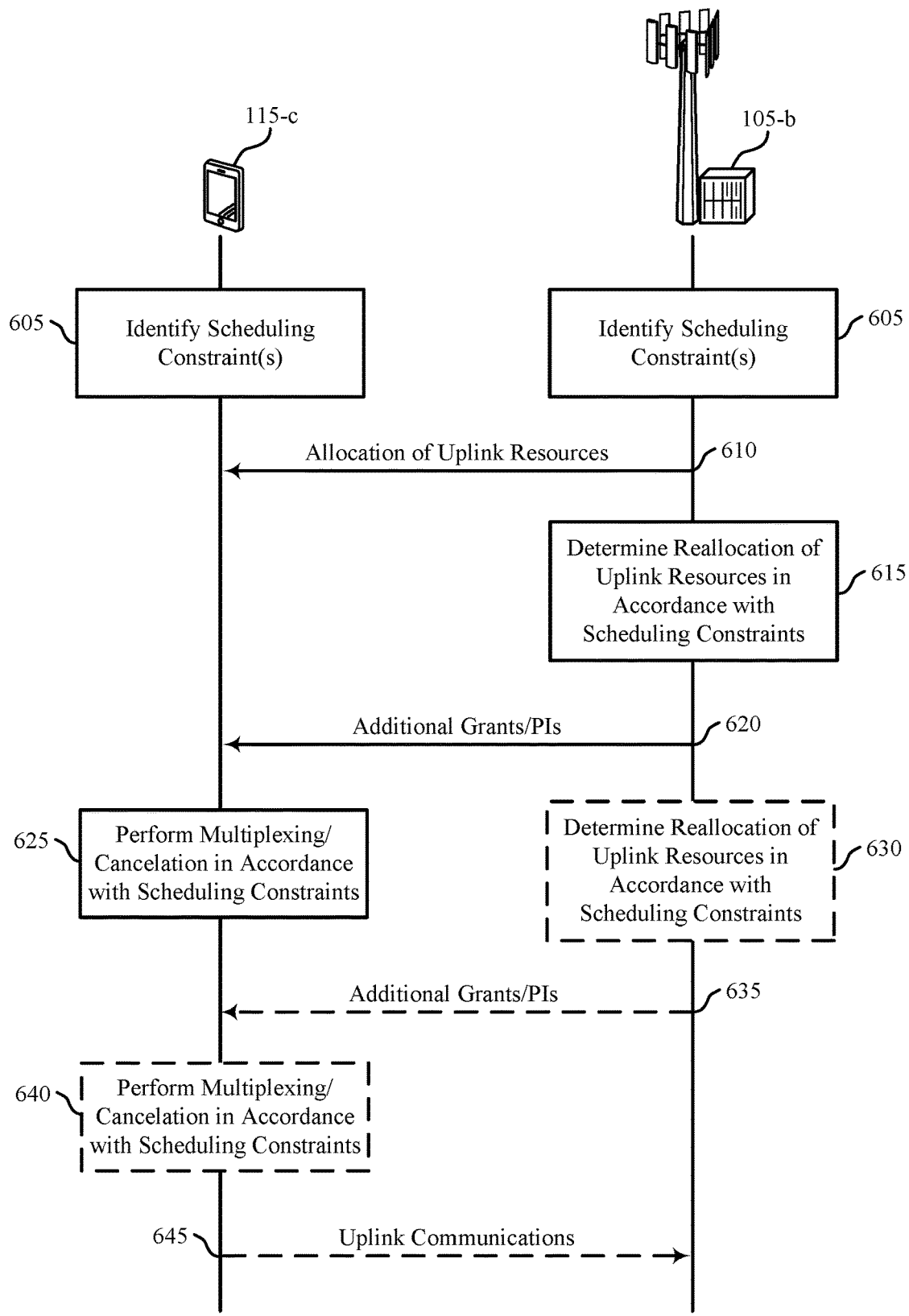
FIG. 6 illustrates an example of a process flow that supports techniques for intra-UE and inter-UE cancelation of overlapping communications in accordance with aspects of the present disclosure.

FIG. 6 illustrates an example of a process flow 600 that supports techniques for intra-UE and inter-UE cancelation of overlapping communications in accordance with aspects of the present disclosure. In some examples, process flow 600 may implement aspects of wireless communications system 100, wireless communications system 200, scheduling diagram 300, scheduling diagram 301, scheduling diagram 400, scheduling diagram 500, and/or scheduling diagram 501. Process flow 600 may be implemented by a UE 115-*c* and a base station 105-*b*, which may be examples of a UE 115 and a base station 105 described with reference to FIGS. 1-5. In the following description of the process flow 600, the operations between UE 115-*c* and base station 105-*b* may be transmitted in a different order than the order shown, or the operations performed by base station 105-*b* and UE 115-*c* may be performed in different orders or at different times. Certain operations may also be left out of the process flow 600, or other operations may be added to the process flow 600. It is to be understood that while base station 105-*b* and UE 115-*c* are shown performing a number of the operations of process flow 600, any wireless device may perform the operations shown.

At 605, UE 115-*c* and base station 105-*c* may identify one or more scheduling constraints described herein. For example, wireless communications systems may preconfigure or specify one or more scheduling constraints described herein.

At 610, base station 105-*b* may transmit an uplink allocation of resources. For instance, base station 105-*b* may transmit a first grant (e.g., LP DCI, HP DCI, etc.) for a first uplink transmission (e.g., LP PUCCH, LP PUSCH, HP PUCCH, HP PUSCH, etc.) scheduled for transmission by the UE in a first TTI (e.g., scheduled for transmission by the UE in some frequency-time resources). For instance, base station 105-*b* may transmit a first grant for a low priority uplink transmission by the UE scheduled over some set of resources.

At 615, base station 105-*b* may determine a reallocation of uplink resources (e.g., in accordance with one or more scheduling constraints described herein). For example, base station 105-*b* may determine to reallocate at least partial resources scheduled by the grant transmitted at 610. As an example, in cases where the first grant transmitted at 610 is for a low priority transmission, the base station 105-*b* may determine to reclaim and/or reallocate the set of resources indicated by the first grant (e.g., to be reallocated for a high priority transmission for UE 115-*c*, to be reallocated for a high priority transmission for a different UE 115, etc.).

At 620, base station 105-*b* may transmit a second grant and/or a PI to UE 115-*c* based on the determination at 615. For example, in cases where the resources indicated by the first grant (at 610) are reallocated for the UE 115-*c*, the base station 105-*b* may transmit a second grant for a second transmission (e.g., high priority transmission) that at least partially overlaps with the resources indicated by the first grant. In cases where the resources indicated by the first grant (at 610) are reallocated for a different UE, the base station 105-*b* may transmit a PI (e.g., an ULPI) indicating one or more frequency-time parts that at least partially overlap with the resources indicated by the first grant in order to preempt the first uplink transmission and reclaim the first set of resources by the base station 105-*b*.

At 625, UE 115-*c* may, in some scenarios, perform multiplexing and/or canceling operations in accordance with one or more scheduling constraints described herein.

At 630, in some cases, base station 105-*b* may determine a reallocation of uplink resources (e.g., in accordance with one or more scheduling constraints described herein). For example, base station 105-*b* may determine to reallocate at least partial resources scheduled by the grants transmitted at 610 and/or 620. As an example, the base station 105-*b* may determine to reclaim and/or reallocate the set of resources indicated by the grants transmitted at 610 and/or 620 (e.g., to be reallocated for a high priority transmission for UE 115-*c*, to be reallocated for a high priority transmission for a different UE 115, etc.).

At 635, base station 105-*b* may transmit an additional grant (e.g., a third grant) or a PI to UE 115-*c* based on the determination at 630. For example, in cases where the resources indicated by the grants transmitted at 610 and/or 620 are reallocated for the UE 115-*c*, the base station 105-*b* may transmit an additional grant for a third transmission (e.g., an additional high priority transmission) that at least partially overlaps with the resources indicated by the grants transmitted at 610 and/or 620. In cases where the resources indicated by the grants transmitted at 610 and/or 620 are reallocated for a different UE, the base station 105-*b* may transmit a PI (e.g., an ULPI) indicating one or more frequency-time parts that at least partially overlap with the resources indicated by the grants transmitted at 610 and/or 620 in order to preempt the first and/or second uplink transmissions and reclaim the resources by the base station 105-*b*.

At 640, UE 115-*c* may, in some scenarios, perform multiplexing and/or canceling operations in accordance with one or more scheduling constraints described herein. At 645, UE 115-*c* may, in some cases, transmit uplink communications to the base station 105-*b* (e.g., based at least in part on the multiplexing and/or cancelation operations performed at 625 and/or 640). In some cases, UE 115-*c* may transmit an HP PUSCH with piggybacked UCI from an HP PUCCH, the UE 115-*c* may transmit an LP uplink transmission, the UE may cancel all transmissions and transmit nothing at all, etc. (e.g., as discussed in accordance with the various examples described herein).

As described herein, UE 115-*c* may perform multiplexing and/or canceling operations at 625 and 640 in accordance with one or more scheduling constraints. For example, in cases where the first transmission (e.g., scheduled by the first grant received at 610) comprises a low priority transmission and the second transmission (e.g., scheduled by a second grant received at 620) comprises a high priority transmission, the UE 115-*c* may cancel the low priority transmission at 625 according to the cancelation determination permanency scheduling constraint described herein (e.g., as discussed in more detail herein, for example, with reference to FIG. 3B). In cases where the base station 105-*b* transmits an additional grant or PI at 635 that may result in the first and second transmissions no longer overlapping, the UE 115-*c* may maintain the determination (at 625) to cancel the low priority transmission (e.g., an additional grant received at 635 may be discarded in terms of the determination to cancel the low priority transmission).

In other examples, in cases where the first transmission (e.g., scheduled by the first grant received at 610) comprises a low priority transmission and the second transmission (e.g., scheduled by a second grant received at 620) comprises a high priority transmission, the UE 115-*c* may cancel the low priority transmission at 620 according to the intra-UE/inter-UE ordering scheduling constraint described herein (e.g., as discussed in more detail herein, for example, with reference to FIG. 4). In cases where the base station 105-*b* transmits PI at 635 that may cancel the high priority transmission and result in the low priority transmission and high priority transmission no longer overlapping, the UE 115-*c* may have already canceled the low priority transmission and may subsequently cancel the high priority transmission as preempted in accordance with the intra-UE/inter-UE ordering scheduling constraint.

As yet another example, at 605, 615, and 630, base station 105-*b* may generally adhere to the one or more scheduling constraints described herein. For example, prior allocation knowledge scheduling constraints described herein (e.g., with reference to FIGS. 5A and 5B) may provide for base station 105-*b* being constrained or prohibited from scheduling some transmissions that base station 105-*b* knows will be canceled by the UE 115-*c* (e.g., from scheduling a low priority transmission that overlaps with a previously dynamically configured high priority transmission). Such may reduce unnecessary overhead (e.g., of base station 105-*b* signaling of grants for transmissions that will not be scheduled by a UE 115-*c*), reduce unnecessary decoding and power consumption by a UE 115-*c*, etc.

Figure 7:
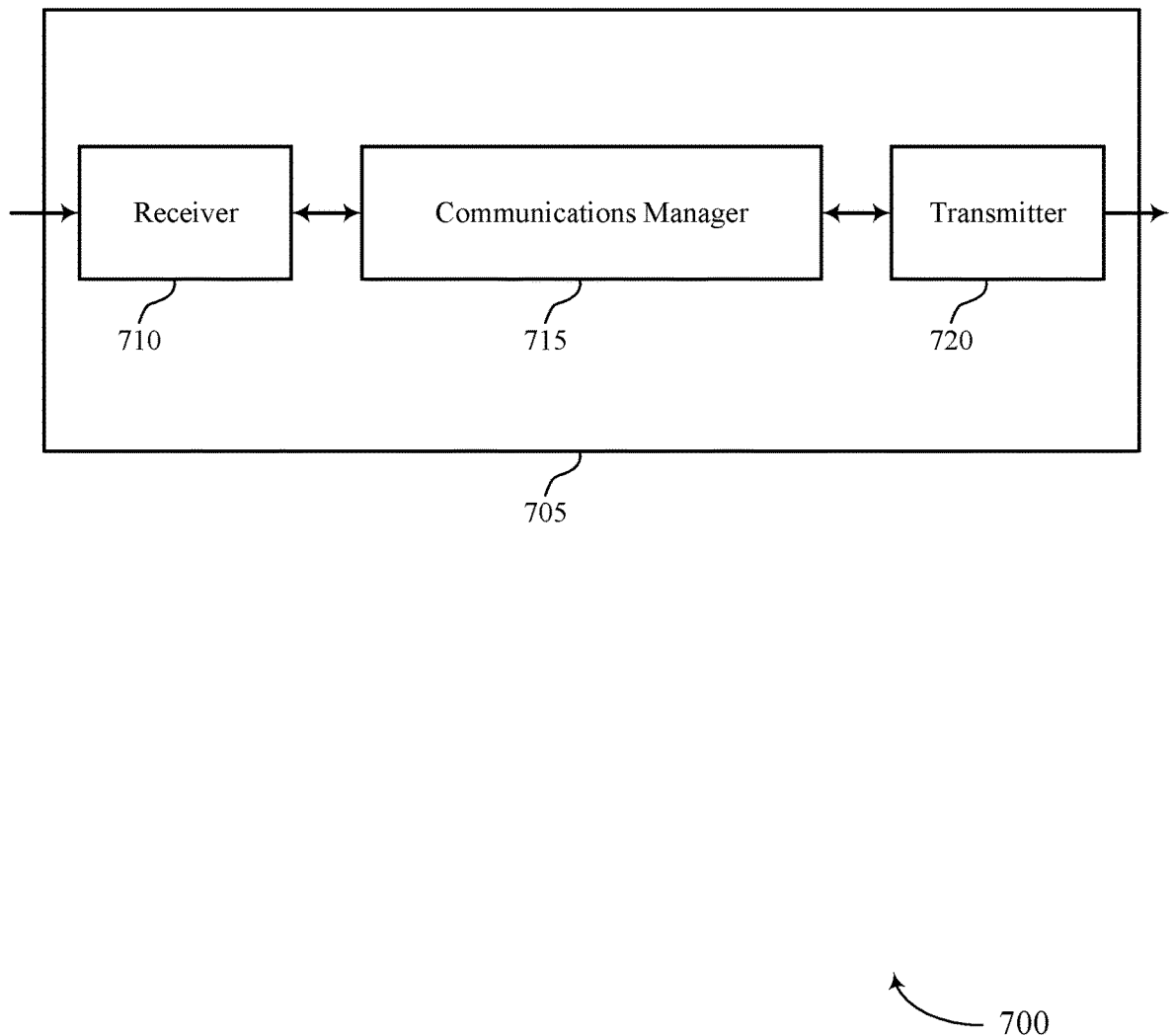
FIGS. 7 and 8 show block diagrams of devices that support techniques for intra-UE and inter-UE cancelation of overlapping communications in accordance with aspects of the present disclosure.

FIG. 7 shows a block diagram 700 of a device 705 that supports techniques for intra-UE and inter-UE cancelation of overlapping communications in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to techniques for intra-UE and inter-UE cancelation of overlapping communications, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive a first grant for a first uplink transmission scheduled for transmission by the UE, identify that the first uplink transmission at least partially overlaps with a second uplink transmission also scheduled for transmission by the UE, determine to drop the second uplink transmission based on a first scheduling constraint to resolve overlapping between the first uplink transmission and the second uplink transmission, where the first scheduling constraint is based at least in part on a first priority of the first uplink transmission being greater than a second priority of the second uplink transmission, and transmit uplink data transmissions in accordance with a second scheduling constraint, where the second scheduling constraint relates to an additional uplink transmission scheduled by an additional grant received after the first grant and scheduled to at least partially overlap with the first uplink transmission, and where the second scheduling constraint is evaluated after satisfaction of the first scheduling constraint to resolve overlapping between the additional uplink transmission and the first uplink transmission after resolving overlapping between the first uplink transmission and the second uplink transmission.

The communications manager 715 may also identify that a first uplink transmission scheduled for transmission by the UE at least partially overlaps with a second uplink transmission also scheduled for transmission by the UE, receive an uplink cancelation indication for a frequency-time resource that at least partially overlaps with the first uplink transmission, determine to drop the second uplink transmission based on a scheduling constraint to resolve overlapping between the first uplink transmission and the second uplink transmission, where the scheduling constraint is based at least in part on a first priority of the first uplink transmission being greater than a second priority of the second uplink transmission, and apply the uplink cancelation indication to the first uplink transmission after determining that the scheduling constraint is satisfied.

The communications manager 715 may also receive a first grant for a first uplink transmission scheduled for transmission by the UE, receive, after receipt of the first grant, a second grant for a second uplink transmission scheduled for transmission by the UE, determine that the first uplink transmission and the second uplink transmission are scheduled so as to satisfy a scheduling constraint that is based on a first priority of the first uplink transmission being greater than a second priority of the second uplink transmission, the scheduling constraint further based on whether the first uplink transmission overlaps with the second uplink transmission, and transmit the first uplink transmission or the second uplink transmission based on satisfaction of the scheduling constraint.

The communications manager 715 may also receive an uplink cancelation indication for a first frequency-time resource, receive, after receipt of the uplink cancelation indication, a grant for an uplink transmission scheduled for transmission by the UE in a second frequency-time resource, determine that the uplink transmission is scheduled so as to satisfy a scheduling constraint that is based on whether the first frequency-time resource overlaps with the second frequency-time resource, and determine to preempt the first frequency-time resource and transmit the uplink transmission based on satisfaction of the scheduling constraint.

The communications manager 715 may be an example of aspects of the communications manager 1010 described herein. The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
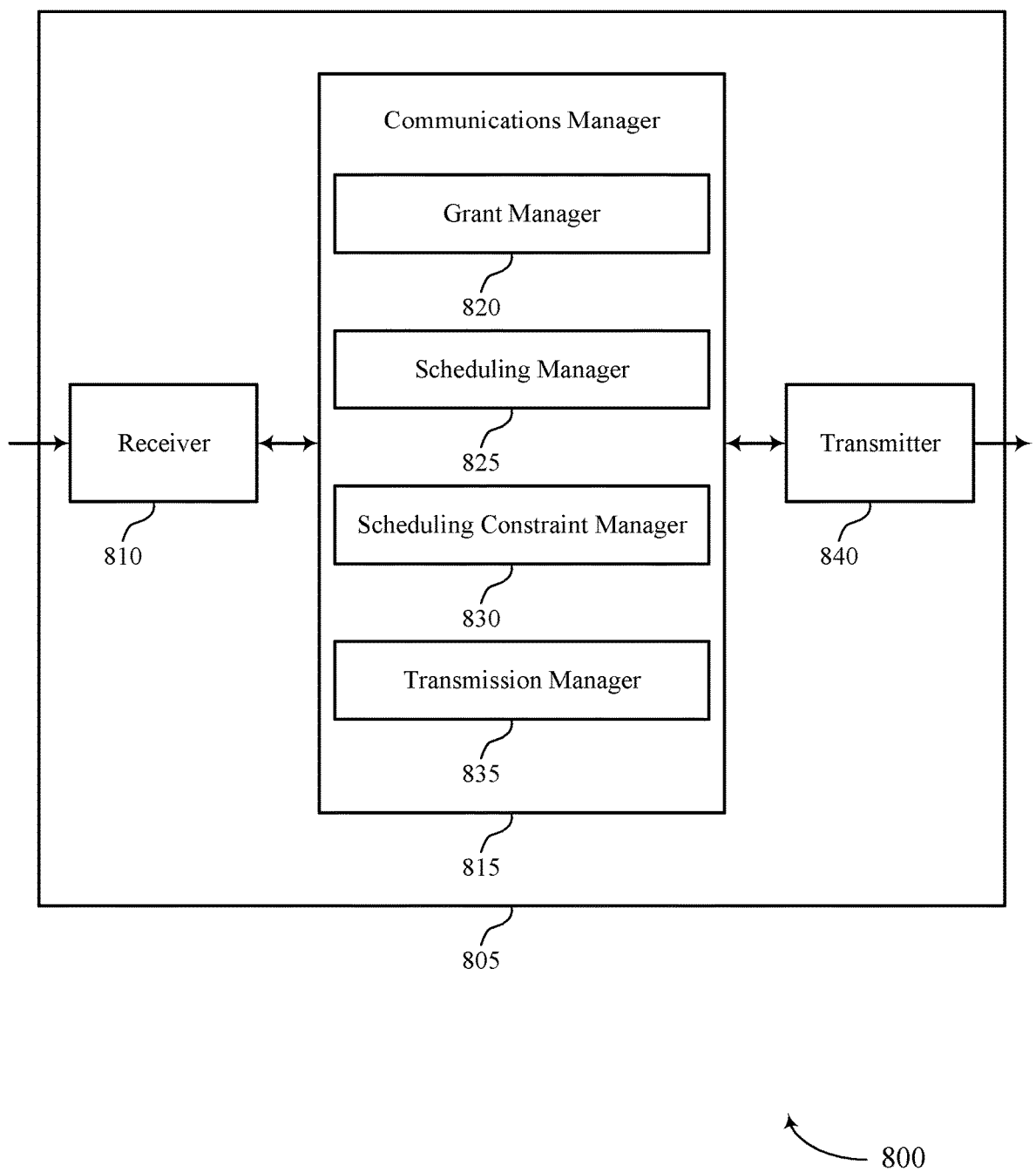

FIG. 8 shows a block diagram 800 of a device 805 that supports techniques for intra-UE and inter-UE cancelation of overlapping communications in accordance with aspects of the present disclosure. The device 805 may be an example of aspects of a device 705, or a UE 115 as described herein. The device 805 may include a receiver 810, a communications manager 815, and a transmitter 840. The device 805 may also include a processor. Each of these components may be in communication with one another (e.g., via one or more buses).

The receiver 810 may receive information such as packets, user data, or control information associated with various information channels (e.g., control channels, data channels, and information related to techniques for intra-UE and inter-UE cancelation of overlapping communications, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a grant manager 820, a scheduling manager 825, a scheduling constraint manager 830, and a transmission manager 835. The communications manager 815 may be an example of aspects of the communications manager 1010 described herein.

The grant manager 820 may receive a first grant for a first uplink transmission scheduled for transmission by the UE. The scheduling manager 825 may identify that the first uplink transmission at least partially overlaps with a second uplink transmission also scheduled for transmission by the UE. The scheduling constraint manager 830 may determine to drop the second uplink transmission based on a first scheduling constraint to resolve overlapping between the first uplink transmission and the second uplink transmission, where the first scheduling constraint is based at least in part on a first priority of the first uplink transmission being greater than a second priority of the second uplink transmission. The transmission manager 835 may transmit uplink data transmissions in accordance with a second scheduling constraint, where the second scheduling constraint relates to an additional uplink transmission scheduled by an additional grant received after the first grant and scheduled to at least partially overlap with the first uplink transmission, and where the second scheduling constraint is evaluated after satisfaction of the first scheduling constraint to resolve overlapping between the additional uplink transmission and the first uplink transmission after resolving overlapping between the first uplink transmission and the second uplink transmission.

The scheduling manager 825 may identify that a first uplink transmission scheduled for transmission by the UE at least partially overlaps with a second uplink transmission also scheduled for transmission by the UE. The scheduling manager 825 may receive an uplink cancelation indication for a frequency-time resource that at least partially overlaps with the first uplink transmission. The scheduling constraint manager 830 may determine to drop the second uplink transmission based on a scheduling constraint to resolve overlapping between the first uplink transmission and the second uplink transmission, where the scheduling constraint is based at least in part on a first priority of the first uplink transmission being greater than a second priority of the second uplink transmission and apply the uplink cancelation indication to the first uplink transmission after determining that the scheduling constraint is satisfied.

The grant manager 820 may receive a first grant for a first uplink transmission scheduled for transmission by the UE and receive, after receipt of the first grant, a second grant for a second uplink transmission scheduled for transmission by the UE. The scheduling constraint manager 830 may determine that the first uplink transmission and the second uplink transmission are scheduled so as to satisfy a scheduling constraint that is based on a first priority of the first uplink transmission being greater than a second priority of the second uplink transmission, the scheduling constraint further based on whether the first uplink transmission overlaps with the second uplink transmission. The transmission manager 835 may transmit the first uplink transmission or the second uplink transmission based on satisfaction of the scheduling constraint.

The scheduling manager 825 may receive an uplink cancelation indication for a first frequency-time resource. The grant manager 820 may receive, after receipt of the uplink cancelation indication, a grant for an uplink transmission scheduled for transmission by the UE in a second frequency-time resource. The scheduling constraint manager 830 may determine that the uplink transmission is scheduled so as to satisfy a scheduling constraint that is based on whether the first frequency-time resource overlaps with the second frequency-time resource and determine to preempt the first frequency-time resource and transmit the uplink transmission based on satisfaction of the scheduling constraint.

The transmitter 840 may transmit signals generated by other components of the device 805. In some examples, the transmitter 840 may be collocated with a receiver 810 in a transceiver module. For example, the transmitter 840 may be an example of aspects of the transceiver 1020 described with reference to FIG. 10. The transmitter 840 may utilize a single antenna or a set of antennas.

Figure 9:
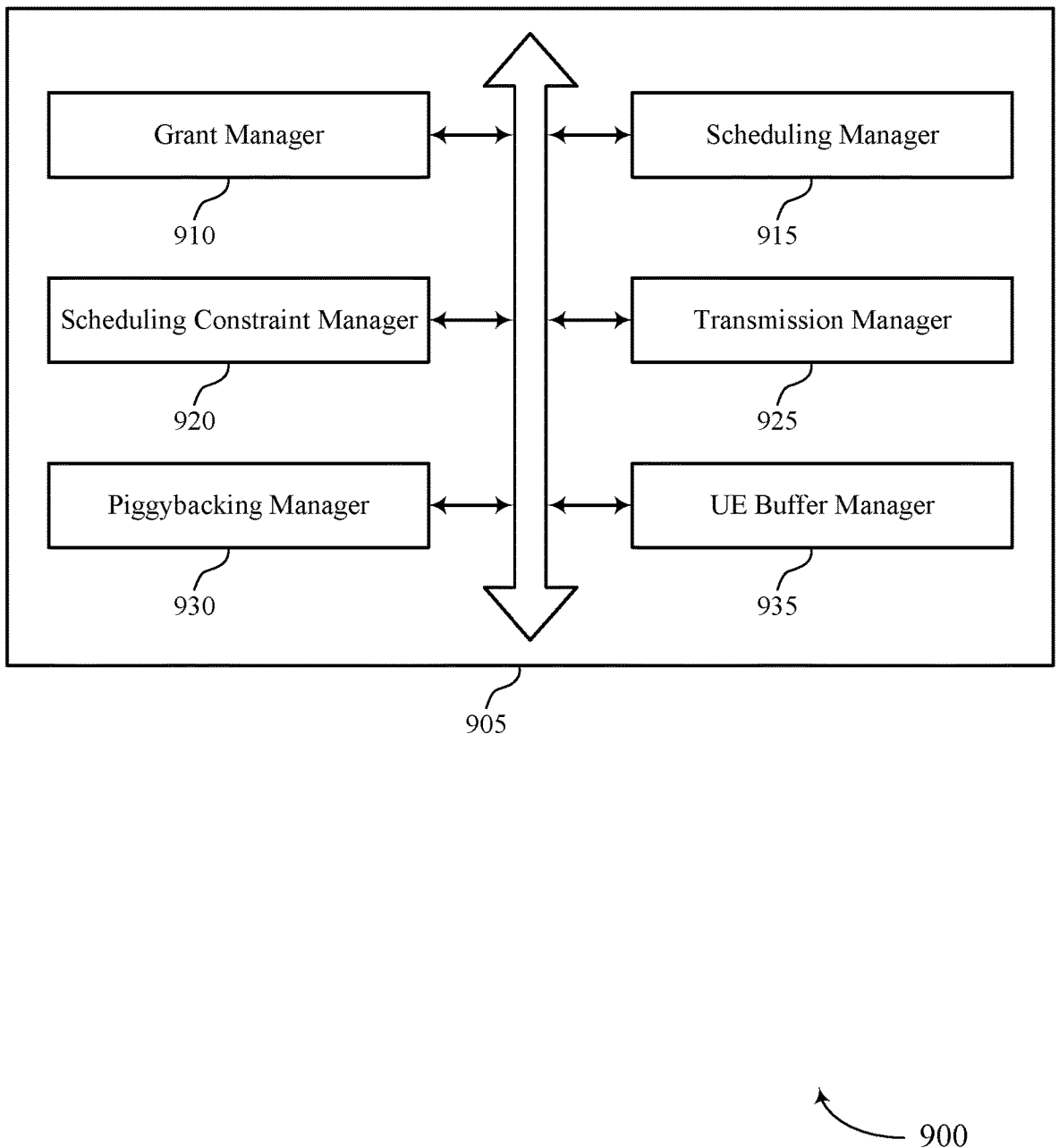
FIG. 9 shows a block diagram of a communications manager that supports techniques for intra-UE and inter-UE cancelation of overlapping communications in accordance with aspects of the present disclosure.

FIG. 9 shows a block diagram 900 of a communications manager 905 that supports techniques for intra-UE and inter-UE cancelation of overlapping communications in accordance with aspects of the present disclosure. The communications manager 905 may be an example of aspects of a communications manager 715, a communications manager 815, or a communications manager 1010 described herein. The communications manager 905 may include a grant manager 910, a scheduling manager 915, a scheduling constraint manager 920, a transmission manager 925, a piggybacking manager 930, and an UE buffer manager 935. Each of these modules may communicate, directly or indirectly, with one another (e.g., via one or more buses).

The grant manager 910 may receive a first grant for a first uplink transmission scheduled for transmission by the UE. The scheduling manager 915 may identify that the first uplink transmission at least partially overlaps with a second uplink transmission also scheduled for transmission by the UE. The scheduling constraint manager 920 may determine to drop the second uplink transmission based on a first scheduling constraint to resolve overlapping between the first uplink transmission and the second uplink transmission, where the first scheduling constraint is based at least in part on a first priority of the first uplink transmission being greater than a second priority of the second uplink transmission. The transmission manager 925 may transmit uplink data transmissions in accordance with a second scheduling constraint, where the second scheduling constraint relates to an additional uplink transmission scheduled by an additional grant received after the first grant and scheduled to at least partially overlap with the first uplink transmission, and where the second scheduling constraint is evaluated after satisfaction of the first scheduling constraint to resolve overlapping between the additional uplink transmission and the first uplink transmission after resolving overlapping between the first uplink transmission and the second uplink transmission.

In some examples, the grant manager 910 may receive the additional grant. In some examples, the scheduling constraint manager 920 may ignore the received additional grant based on the second scheduling constraint until overlapping between the first uplink transmission and the second uplink transmission is received, where the second uplink transmission is dropped based on the ignoring. In some examples, the grant manager 910 may receive the additional grant for the additional uplink transmission scheduled for transmission by the UE. In some examples, the scheduling constraint manager 920 may determine to drop the first uplink transmission based on the additional uplink transmission at least partially overlapping with the first uplink transmission, where the second uplink transmission and the additional uplink transmission are non-overlapping.

The piggybacking manager 930 may piggyback at least a portion of the first uplink transmission on to the additional uplink transmission based on the determination to drop the first uplink transmission. In some examples, the transmission manager 925 may transmit the additional uplink transmission and the piggybacked portion of the first uplink transmission, where the determination to drop the second uplink transmission is maintained based on the second scheduling constraint.

In some cases, the first uplink transmission includes a high priority uplink control channel transmission or a high priority uplink shared channel transmission. In some cases, the second uplink transmission includes a low priority uplink control channel transmission, a low priority uplink shared channel transmission, or a sounding reference signal transmission. In some cases, the additional uplink transmission includes an additional high priority uplink transmission. In some cases, the additional grant includes a group-common grant, an uplink cancelation indication, or a slot format indicator.

In some aspects, the scheduling manager 915 may identify that a first uplink transmission scheduled for transmission by the UE at least partially overlaps with a second uplink transmission also scheduled for transmission by the UE. In some examples, the scheduling manager 915 may receive an uplink cancelation indication for a frequency-time resource that at least partially overlaps with the first uplink transmission. In some examples, the scheduling constraint manager 920 may determine to drop the second uplink transmission based on a scheduling constraint to resolve overlapping between the first uplink transmission and the second uplink transmission, where the scheduling constraint is based at least in part on a first priority of the first uplink transmission being greater than a second priority of the second uplink transmission. In some examples, the scheduling constraint manager 920 may apply the uplink cancelation indication to the first uplink transmission after determining that the scheduling constraint is satisfied.

In some examples, the scheduling constraint manager 920 may determine to drop the first uplink transmission based on the frequency-time resource at least partially overlapping with the first uplink transmission. In some examples, the scheduling constraint manager 920 may determine to transmit the first uplink transmission even though the frequency-time resource at least partially overlaps with the first uplink transmission. In some cases, the first uplink transmission includes a high priority uplink control channel transmission or a high priority uplink shared channel transmission. In some cases, the second uplink transmission includes a low priority uplink control channel transmission, a low priority uplink shared channel transmission, or a sounding reference signal transmission.

In some aspects, the grant manager 910 may receive a first grant for a first uplink transmission scheduled for transmission by the UE. In some examples, the grant manager 910 may receive, after receipt of the first grant, a second grant for a second uplink transmission scheduled for transmission by the UE. In some examples, the scheduling constraint manager 920 may determine that the first uplink transmission and the second uplink transmission are scheduled so as to satisfy a scheduling constraint that is based on a first priority of the first uplink transmission being greater than a second priority of the second uplink transmission, the scheduling constraint further based on whether the first uplink transmission overlaps with the second uplink transmission. In some examples, the transmission manager 925 may transmit the first uplink transmission or the second uplink transmission based on satisfaction of the scheduling constraint.

In some examples, the transmission manager 925 may transmit the first uplink transmission. The UE buffer manager 935 may identify that the UE has data to be included in the first uplink transmission, where the first uplink transmission is transmitted based on the UE having data to be included in the first uplink transmission. In some examples, the scheduling constraint manager 920 may discard the received second grant based on the scheduling constraint, where the first uplink transmission is transmitted based on the discarding. In some cases, the first grant includes a dynamic high priority grant. In some examples, the transmission manager 925 may transmit the second uplink transmission.

In some examples, the UE buffer manager 935 may determine to skip the first uplink transmission based on a buffer status of the UE being below a threshold, where the second uplink transmission is transmitted based on the determination to skip the first uplink transmission. In some cases, the first uplink transmission includes a high priority scheduling request or a high priority uplink configured grant transmission. In some cases, the scheduling constraint is satisfied based on the first uplink transmission and the second uplink transmission being non-overlapping. In some cases, the first uplink transmission comprises a hybrid automatic repeat request acknowledgment transmission or a channel state information transmission. In some cases, the scheduling constraint provides that the UE does not expect to receive a grant scheduling a low priority uplink transmission that overlaps with a previously scheduled high priority uplink transmission.

In some aspects, the scheduling manager 915 may receive an uplink cancelation indication for a first frequency-time resource. In some examples, the grant manager 910 may receive, after receipt of the uplink cancelation indication, a grant for an uplink transmission scheduled for transmission by the UE in a second frequency-time resource. In some examples, the scheduling constraint manager 920 may determine that the uplink transmission is scheduled so as to satisfy a scheduling constraint that is based on whether the first frequency-time resource overlaps with the second frequency-time resource. In some examples, the scheduling constraint manager 920 may determine to preempt the first frequency-time resource and transmit the uplink transmission based on satisfaction of the scheduling constraint.

In some cases, the scheduling constraint is satisfied based on the first frequency-time resource being entirely separate in time and frequency than the second frequency-time resource.

Figure 10:
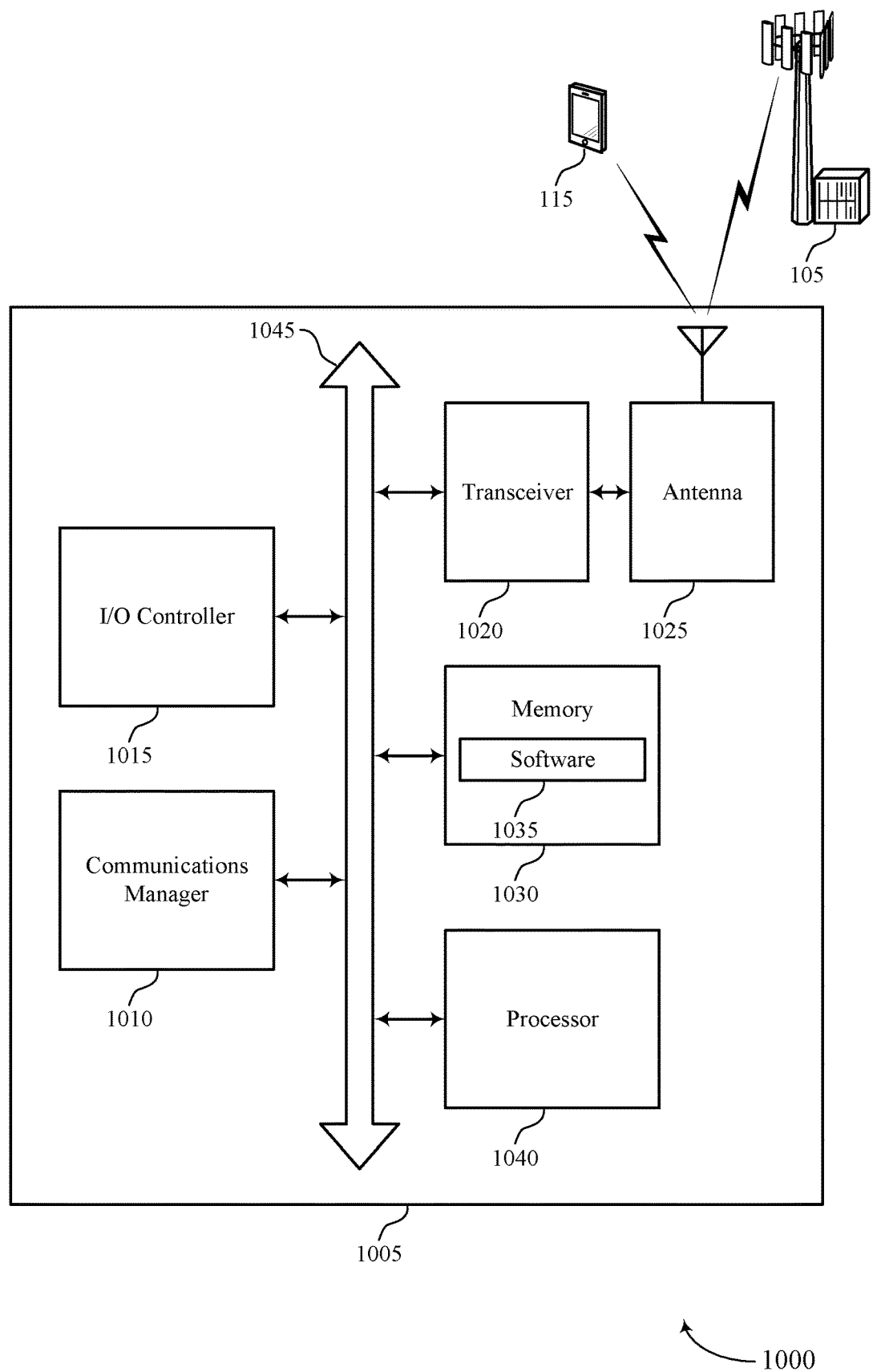
FIG. 10 shows a diagram of a system including a device that supports techniques for intra-UE and inter-UE cancelation of overlapping communications in accordance with aspects of the present disclosure.

FIG. 10 shows a diagram of a system 1000 including a device 1005 that supports techniques for intra-UE and inter-UE cancelation of overlapping communications in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive a first grant for a first uplink transmission scheduled for transmission by the UE, identify that the first uplink transmission at least partially overlaps with a second uplink transmission also scheduled for transmission by the UE, determine to drop the second uplink transmission based on a first scheduling constraint to resolve overlapping between the first uplink transmission and the second uplink transmission, where the first scheduling constraint is based at least in part on a first priority of the first uplink transmission being greater than a second priority of the second uplink transmission, and transmit uplink data transmissions in accordance with a second scheduling constraint, where the second scheduling constraint relates to an additional uplink transmission scheduled by an additional grant received after the first grant and scheduled to at least partially overlap with the first uplink transmission, and where the second scheduling constraint is evaluated after satisfaction of the first scheduling constraint to resolve overlapping between the additional uplink transmission and the first uplink transmission after resolving overlapping between the first uplink transmission and the second uplink transmission.

The communications manager 1010 may also identify that a first uplink transmission scheduled for transmission by the UE at least partially overlaps with a second uplink transmission also scheduled for transmission by the UE, receive an uplink cancelation indication for a frequency-time resource that at least partially overlaps with the first uplink transmission, determine to drop the second uplink transmission based on a scheduling constraint to resolve overlapping between the first uplink transmission and the second uplink transmission, where the scheduling constraint is based at least in part on a first priority of the first uplink transmission being greater than a second priority of the second uplink transmission, and apply the uplink cancelation indication to the first uplink transmission after determining that the scheduling constraint is satisfied.

The communications manager 1010 may also receive a first grant for a first uplink transmission scheduled for transmission by the UE, receive, after receipt of the first grant, a second grant for a second uplink transmission scheduled for transmission by the UE, determine that the first uplink transmission and the second uplink transmission are scheduled so as to satisfy a scheduling constraint that is based on a first priority of the first uplink transmission being greater than a second priority of the second uplink transmission, the scheduling constraint further based on whether the first uplink transmission overlaps with the second uplink transmission, and transmit the first uplink transmission or the second uplink transmission based on satisfaction of the scheduling constraint.

The communications manager 1010 may also receive an uplink cancelation indication for a first frequency-time resource, receive, after receipt of the uplink cancelation indication, a grant for an uplink transmission scheduled for transmission by the UE in a second frequency-time resource, determine that the uplink transmission is scheduled so as to satisfy a scheduling constraint that is based on whether the first frequency-time resource overlaps with the second frequency-time resource, and determine to preempt the first frequency-time resource and transmit the uplink transmission based on satisfaction of the scheduling constraint.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM and ROM. The memory 1030 may store computer-readable, computer-executable code or software 1035 including instructions that, when executed, cause the processor to perform various functions described herein. In some cases, the memory 1030 may contain, among other things, a basic input/output system (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for intra-UE and inter-UE cancelation of overlapping communications).

The software 1035 may include instructions to implement aspects of the present disclosure, including instructions to support wireless communications. The software 1035 may be stored in a non-transitory computer-readable medium such as system memory or other type of memory. In some cases, the software 1035 may not be directly executable by the processor 1040 but may cause a computer (e.g., when compiled and executed) to perform functions described herein.

Figure 11:
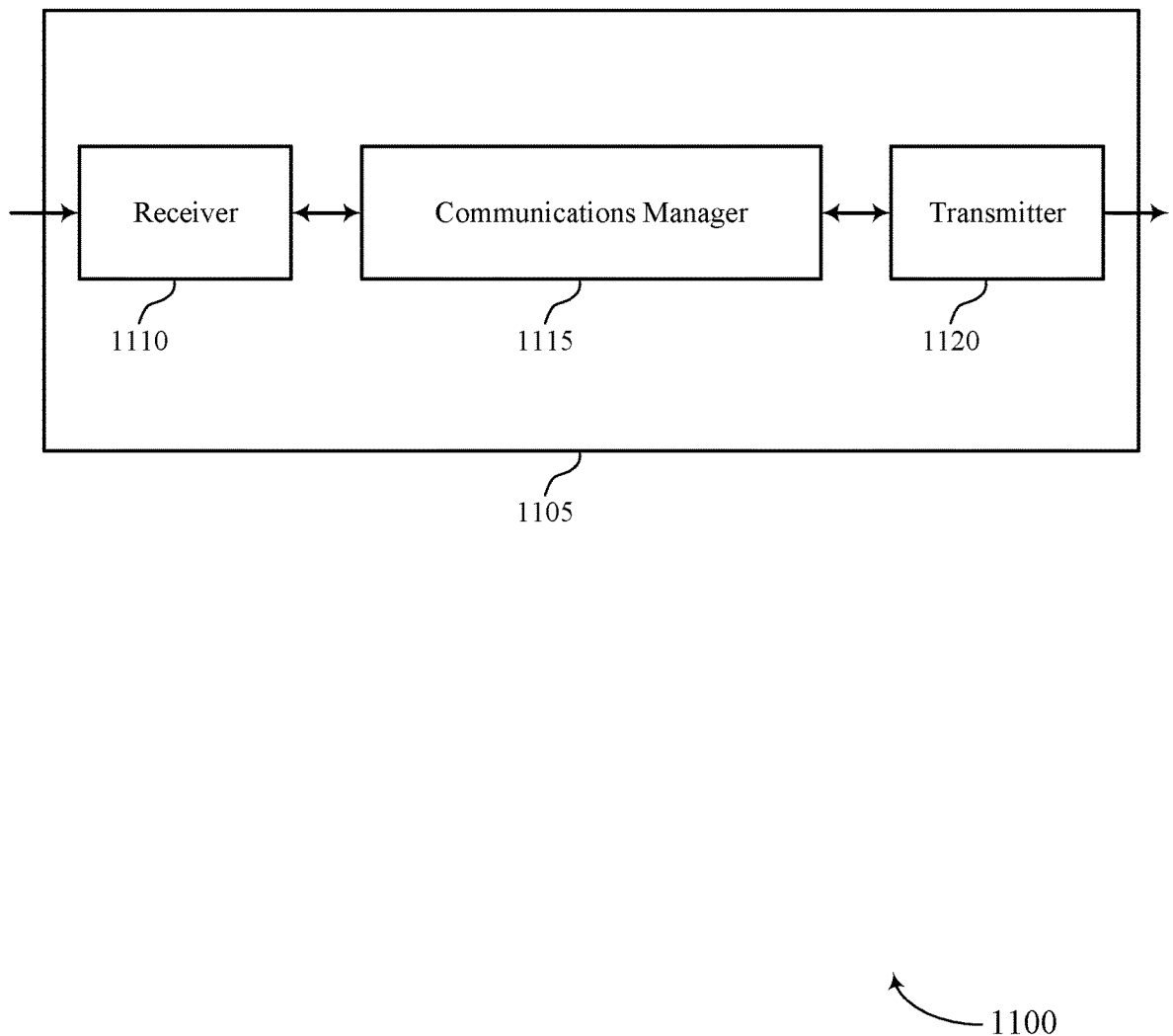
FIGS. 11 and 12 show block diagrams of devices that support techniques for intra-UE and inter-UE cancelation of overlapping communications in accordance with aspects of the present disclosure.

FIG. 11 shows a block diagram 1100 of a device 1105 that supports techniques for intra-UE and inter-UE cancelation of overlapping communications in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to techniques for intra-UE and inter-UE cancelation of overlapping communications, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may transmit a first grant for a first uplink transmission scheduled for transmission by a UE, identify that the first uplink transmission at least partially overlaps with a second uplink transmission also scheduled for transmission by the UE, determine the second uplink transmission will be dropped by the UE based on a first scheduling constraint to resolve overlapping between the first uplink transmission and the second uplink transmission, where the first scheduling constraint is based at least in part on a first priority of the first uplink transmission being greater than a second priority of the second uplink transmission, and transmit, after the first grant, an additional grant in accordance with a second scheduling constraint, where the second scheduling constraint relates to an additional uplink transmission scheduled by the additional grant and scheduled to at least partially overlap with the first uplink transmission, and where the second scheduling constraint is evaluated after satisfaction of the first scheduling constraint to resolve overlapping between the additional uplink transmission and the first uplink transmission after resolving overlapping between the first uplink transmission and the second uplink transmission.

The communications manager 1115 may also identify that a first uplink transmission scheduled for transmission by a UE at least partially overlaps with a second uplink transmission also scheduled for transmission by the UE, transmit an uplink cancelation indication for a frequency-time resource that at least partially overlaps with the first uplink transmission, the second uplink transmission, or both, determine the second uplink transmission will be dropped by the UE based on a first scheduling constraint to resolve overlapping between the first uplink transmission and the second uplink transmission, where the first scheduling constraint is based at least in part on a first priority of the first uplink transmission being greater than a second priority of the second uplink transmission, and receive the first uplink transmission in accordance with a second scheduling constraint, where the second scheduling constraint is evaluated after satisfaction of the first scheduling constraint, and where the second scheduling constraint relates to the frequency-time resource at least partially overlapping with the first uplink transmission, the second uplink transmission, or both.

The communications manager 1115 may also transmit a first grant for a first uplink transmission scheduled for transmission by a UE, transmit, after the first grant, the second grant in accordance with the scheduling constraint, and identify a scheduling constraint based on a first priority of the first uplink transmission being greater than a second priority of a second uplink transmission to be scheduled by a second grant transmitted after the first grant.

The communications manager 1115 may also transmit, to a UE, an uplink cancelation indication for a first frequency-time resource, identify a scheduling constraint that is based on whether the first frequency-time resource overlaps with a second frequency-time resource of an uplink transmission to be scheduled by a grant, and transmit, after transmission of the uplink cancelation indication, the grant for the uplink transmission in accordance with the scheduling constraint.

The communications manager 1115 may be an example of aspects of the communications manager 1410 described herein. The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
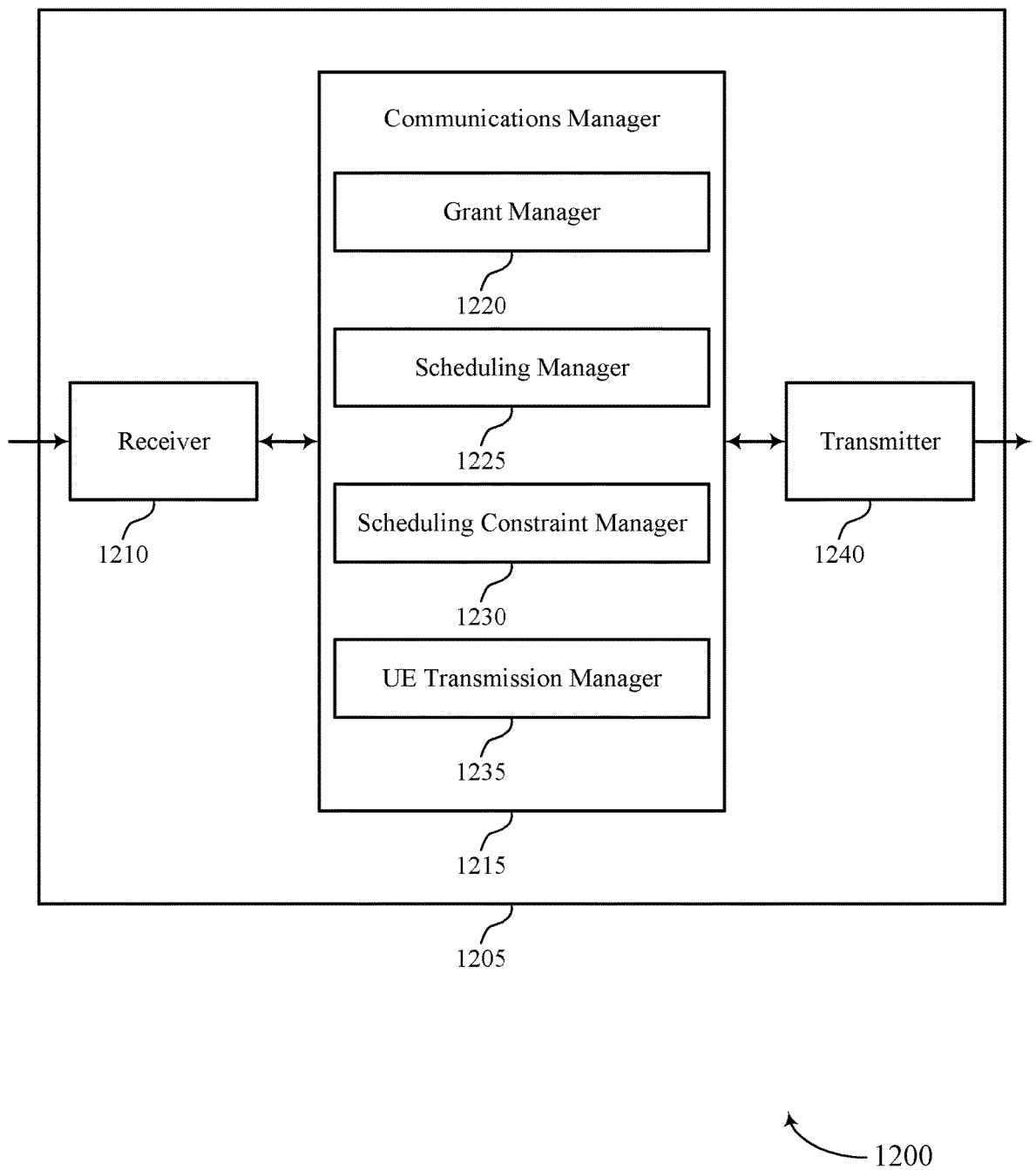

FIG. 12 shows a block diagram 1200 of a device 1205 that supports techniques for intra-UE and inter-UE cancelation of overlapping communications in accordance with aspects of the present disclosure. The device 1205 may be an example of aspects of a device 1105, or a base station 105 as described herein. The device 1205 may include a receiver 1210, a communications manager 1215, and a transmitter 1240. The device 1205 may also include a processor. Each of these components may be in communication with one another (e.g., via one or more buses).

The receiver 1210 may receive information such as packets, user data, or control information associated with various information channels (e.g., control channels, data channels, and information related to techniques for intra-UE and inter-UE cancelation of overlapping communications, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a grant manager 1220, a scheduling manager 1225, a scheduling constraint manager 1230, and an UE transmission manager 1235. The communications manager 1215 may be an example of aspects of the communications manager 1410 described herein.

The grant manager 1220 may transmit a first grant for a first uplink transmission scheduled for transmission by a UE. The scheduling manager 1225 may identify that the first uplink transmission at least partially overlaps with a second uplink transmission also scheduled for transmission by the UE. The scheduling constraint manager 1230 may determine the second uplink transmission will be dropped by the UE based on a first scheduling constraint to resolve overlapping between the first uplink transmission and the second uplink transmission, where the first scheduling constraint is based at least in part on a first priority of the first uplink transmission being greater than a second priority of the second uplink transmission. The grant manager 1220 may transmit, after the first grant, an additional grant in accordance with a second scheduling constraint, where the second scheduling constraint relates to an additional uplink transmission scheduled by the additional grant and scheduled to at least partially overlap with the first uplink transmission, and where the second scheduling constraint is evaluated after satisfaction of the first scheduling constraint to resolve overlapping between the additional uplink transmission and the first uplink transmission after resolving overlapping between the first uplink transmission and the second uplink transmission.

The scheduling manager 1225 may identify that a first uplink transmission scheduled for transmission by a UE at least partially overlaps with a second uplink transmission also scheduled for transmission by the UE. The scheduling manager 1225 may transmit an uplink cancelation indication for a frequency-time resource that at least partially overlaps with the first uplink transmission, the second uplink transmission, or both. The scheduling constraint manager 1230 may determine the second uplink transmission will be dropped by the UE based on a first scheduling constraint to resolve overlapping between the first uplink transmission and the second uplink transmission, where the first scheduling constraint is based at least in part on a first priority of the first uplink transmission being greater than a second priority of the second uplink transmission. The UE transmission manager 1235 may receive the first uplink transmission in accordance with a second scheduling constraint, where the second scheduling constraint is evaluated after satisfaction of the first scheduling constraint, and where the second scheduling constraint relates to the frequency-time resource at least partially overlapping with the first uplink transmission, the second uplink transmission, or both.

The grant manager 1220 may transmit a first grant for a first uplink transmission scheduled for transmission by a UE. The scheduling constraint manager 1230 may identify a scheduling constraint based on a first priority of the first uplink transmission being greater than a second priority of a second uplink transmission to be scheduled by a second grant transmitted after the first grant. The grant manager 1220 may transmit, after the first grant, the second grant in accordance with the scheduling constraint.

The scheduling manager 1225 may transmit, to a UE, an uplink cancelation indication for a first frequency-time resource. The scheduling constraint manager 1230 may identify a scheduling constraint that is based on whether the first frequency-time resource overlaps with a second frequency-time resource of an uplink transmission to be scheduled by a grant. The grant manager 1220 may transmit, after transmission of the uplink cancelation indication, the grant for the uplink transmission in accordance with the scheduling constraint.

The transmitter 1240 may transmit signals generated by other components of the device 1205. In some examples, the transmitter 1240 may be collocated with a receiver 1210 in a transceiver module. For example, the transmitter 1240 may be an example of aspects of the transceiver 1420 described with reference to FIG. 14. The transmitter 1240 may utilize a single antenna or a set of antennas.

Figure 13:
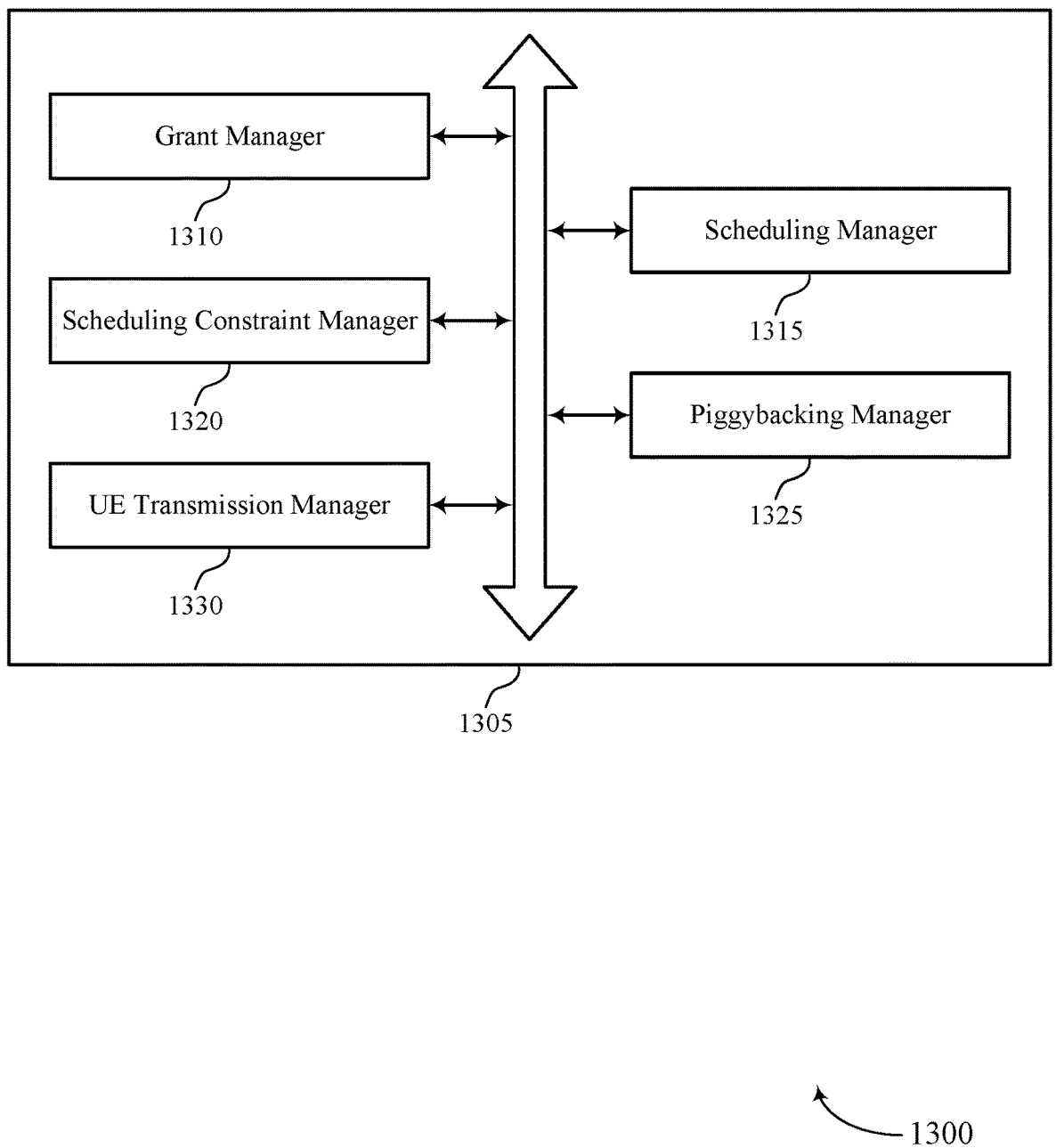
FIG. 13 shows a block diagram of a communications manager that supports techniques for intra-UE and inter-UE cancelation of overlapping communications in accordance with aspects of the present disclosure.

FIG. 13 shows a block diagram 1300 of a communications manager 1305 that supports techniques for intra-UE and inter-UE cancelation of overlapping communications in accordance with aspects of the present disclosure. The communications manager 1305 may be an example of aspects of a communications manager 1115, a communications manager 1215, or a communications manager 1410 described herein. The communications manager 1305 may include a grant manager 1310, a scheduling manager 1315, a scheduling constraint manager 1320, a piggybacking manager 1325, and an UE transmission manager 1330. Each of these modules may communicate, directly or indirectly, with one another (e.g., via one or more buses).

The grant manager 1310 may transmit a first grant for a first uplink transmission scheduled for transmission by a UE. The scheduling manager 1315 may identify that the first uplink transmission at least partially overlaps with a second uplink transmission also scheduled for transmission by the UE. The scheduling constraint manager 1320 may determine the second uplink transmission will be dropped by the UE based on a first scheduling constraint to resolve overlapping between the first uplink transmission and the second uplink transmission, where the first scheduling constraint is based at least in part on a first priority of the first uplink transmission being greater than a second priority of the second uplink transmission. In some examples, the grant manager 1310 may transmit, after the first grant, an additional grant in accordance with a second scheduling constraint, where the second scheduling constraint relates to an additional uplink transmission scheduled by the additional grant and scheduled to at least partially overlap with the first uplink transmission, and where the second scheduling constraint is evaluated after satisfaction of the first scheduling constraint to resolve overlapping between the additional uplink transmission and the first uplink transmission after resolving overlapping between the first uplink transmission and the second uplink transmission.

In some examples, the scheduling constraint manager 1320 may determine the transmitted additional grant will be ignored by the UE based on the second scheduling constraint until overlapping between the first uplink transmission and the second uplink transmission is resolved, where the second uplink transmission is dropped based on the ignoring. In some examples, the scheduling manager 1315 may determine the first uplink transmission will be dropped by the UE based on transmitting the additional grant. The piggybacking manager 1325 may receive the additional uplink transmission and a piggybacked portion of the first uplink transmission. In some cases, the first uplink transmission includes a high priority uplink control channel transmission or a high priority uplink shared channel transmission. In some cases, the second uplink transmission includes a low priority uplink control channel transmission, a low priority uplink shared channel transmission, or a sounding reference signal transmission. In some cases, the additional uplink transmission includes an additional high priority uplink transmission. In some cases, the additional grant includes a group-common grant, an uplink cancelation indication, or a slot format indicator.

In some aspects, the scheduling manager 1315 may identify that a first uplink transmission scheduled for transmission by a UE at least partially overlaps with a second uplink transmission also scheduled for transmission by the UE. In some examples, the scheduling manager 1315 may transmit an uplink cancelation indication for a frequency-time resource that at least partially overlaps with the first uplink transmission, the second uplink transmission, or both. In some examples, the scheduling constraint manager 1320 may determine the second uplink transmission will be dropped by the UE based on a first scheduling constraint to resolve overlapping between the first uplink transmission and the second uplink transmission, where the first scheduling constraint is based at least in part on a first priority of the first uplink transmission being greater than a second priority of the second uplink transmission. The UE transmission manager 1330 may receive the first uplink transmission in accordance with a second scheduling constraint, where the second scheduling constraint is evaluated after satisfaction of the first scheduling constraint, and where the second scheduling constraint relates to the frequency-time resource at least partially overlapping with the first uplink transmission, the second uplink transmission, or both.

In some examples, the scheduling constraint manager 1320 may determine the first uplink transmission will be dropped by the UE based on the frequency-time resource at least partially overlapping with the first uplink transmission. In some examples, the UE transmission manager 1330 may receive the first uplink transmission based on the frequency-time resource at least partially overlapping with the second uplink transmission. In some cases, the first uplink transmission includes a high priority uplink control channel transmission or a high priority uplink shared channel transmission. In some cases, the second uplink transmission includes a low priority uplink control channel transmission, a low priority uplink shared channel transmission, or a sounding reference signal transmission.

In some aspects, the grant manager 1310 may transmit a first grant for a first uplink transmission scheduled for transmission by a UE. In some examples, the scheduling constraint manager 1320 may identify a scheduling constraint based on a first priority of the first uplink transmission being greater than a second priority of a second uplink transmission to be scheduled by a second grant transmitted after the first grant. In some examples, the grant manager 1310 may transmit, after the first grant, the second grant in accordance with the scheduling constraint.

In some examples, the UE transmission manager 1330 may receive the first uplink transmission based on the transmitted first grant. In some cases, the first grant includes a dynamic high priority grant. In some examples, the UE transmission manager 1330 may receive the second uplink transmission based on the transmitted additional grant. In some cases, the first uplink transmission includes a high priority scheduling request or a high priority uplink configured grant transmission.

In some examples, the scheduling constraint manager 1320 may determine the UE skipped the first uplink transmission based on receiving the second uplink transmission, where the determination that the UE skipped the first uplink transmission is based on a buffer status of the UE being below a threshold. In some cases, the scheduling constraint further relates to the second uplink transmission scheduled to overlap with the first uplink transmission.

In some cases, the first uplink transmission comprises a hybrid automatic repeat request acknowledgment transmission or a channel state information transmission. In some cases, the scheduling constraint provides that the UE does not expect to receive a grant scheduling a low priority uplink transmission that overlaps with a previously scheduled high priority uplink transmission.

In some aspects, the scheduling manager 1315 may transmit, to a UE, an uplink cancelation indication for a first frequency-time resource. In some examples, the scheduling constraint manager 1320 may identify a scheduling constraint that is based on whether the first frequency-time resource overlaps with a second frequency-time resource of an uplink transmission to be scheduled by a grant. In some examples, the grant manager 1310 may transmit, after transmission of the uplink cancelation indication, the grant for the uplink transmission in accordance with the scheduling constraint.

In some cases, the scheduling constraint is satisfied based on the first frequency-time resource being entirely separate in time and frequency than the second frequency-time resource.

Figure 14:
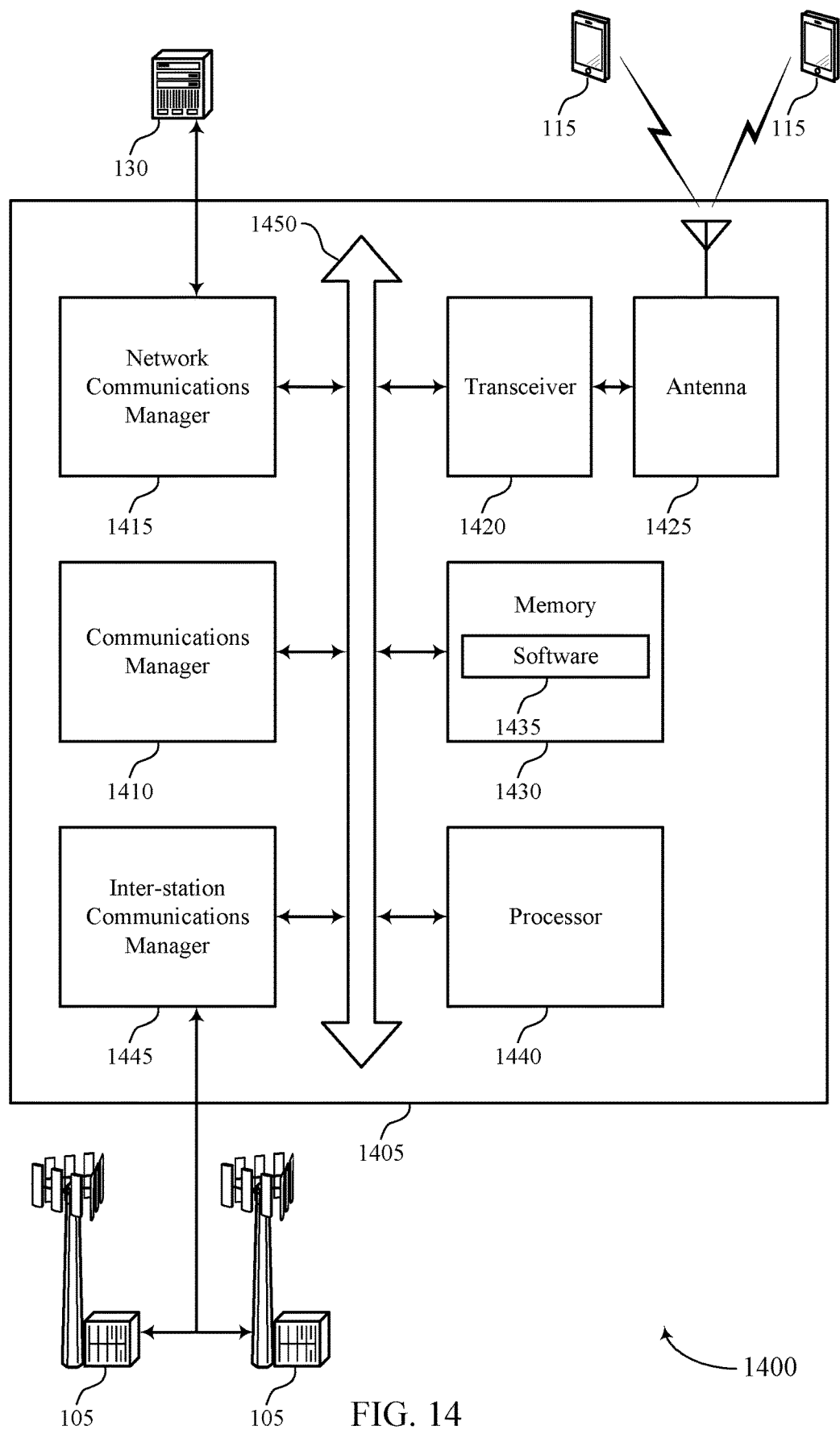
FIG. 14 shows a diagram of a system including a device that supports techniques for intra-UE and inter-UE cancelation of overlapping communications in accordance with aspects of the present disclosure.

FIG. 14 shows a diagram of a system 1400 including a device 1405 that supports techniques for intra-UE and inter-UE cancelation of overlapping communications in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may transmit a first grant for a first uplink transmission scheduled for transmission by a UE, identify that the first uplink transmission at least partially overlaps with a second uplink transmission also scheduled for transmission by the UE, determine the second uplink transmission will be dropped by the UE based on a first scheduling constraint to resolve overlapping between the first uplink transmission and the second uplink transmission, where the first scheduling constraint is based at least in part on a first priority of the first uplink transmission being greater than a second priority of the second uplink transmission, and transmit, after the first grant, an additional grant in accordance with a second scheduling constraint, where the second scheduling constraint relates to an additional uplink transmission scheduled by the additional grant and scheduled to at least partially overlap with the first uplink transmission, and where the second scheduling constraint is evaluated after satisfaction of the first scheduling constraint to resolve overlapping between the additional uplink transmission and the first uplink transmission after resolving overlapping between the first uplink transmission and the second uplink transmission.

The communications manager 1410 may also identify that a first uplink transmission scheduled for transmission by a UE at least partially overlaps with a second uplink transmission also scheduled for transmission by the UE, transmit an uplink cancelation indication for a frequency-time resource that at least partially overlaps with the first uplink transmission, the second uplink transmission, or both, determine the second uplink transmission will be dropped by the UE based on a first scheduling constraint to resolve overlapping between the first uplink transmission and the second uplink transmission, where the first scheduling constraint is based at least in part on a first priority of the first uplink transmission being greater than a second priority of the second uplink transmission, and receive the first uplink transmission in accordance with a second scheduling constraint, where the second scheduling constraint is evaluated after satisfaction of the first scheduling constraint, and where the second scheduling constraint relates to the frequency-time resource at least partially overlapping with the first uplink transmission, the second uplink transmission, or both.

The communications manager 1410 may also transmit a first grant for a first uplink transmission scheduled for transmission by a UE, transmit, after the first grant, the second grant in accordance with the scheduling constraint, and identify a scheduling constraint based on a first priority of the first uplink transmission being greater than a second priority of a second uplink transmission to be scheduled by a second grant transmitted after the first grant.

The communications manager 1410 may also transmit, to a UE, an uplink cancelation indication for a first frequency-time resource, identify a scheduling constraint that is based on whether the first frequency-time resource overlaps with a second frequency-time resource of an uplink transmission to be scheduled by a grant, and transmit, after transmission of the uplink cancelation indication, the grant for the uplink transmission in accordance with the scheduling constraint.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code or software 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting techniques for intra-UE and inter-UE cancelation of overlapping communications).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The software 1435 may include instructions to implement aspects of the present disclosure, including instructions to support wireless communications. The software 1435 may be stored in a non-transitory computer-readable medium such as system memory or other type of memory. In some cases, the software 1435 may not be directly executable by the processor 1440 but may cause a computer (e.g., when compiled and executed) to perform functions described herein.

Figure 15:
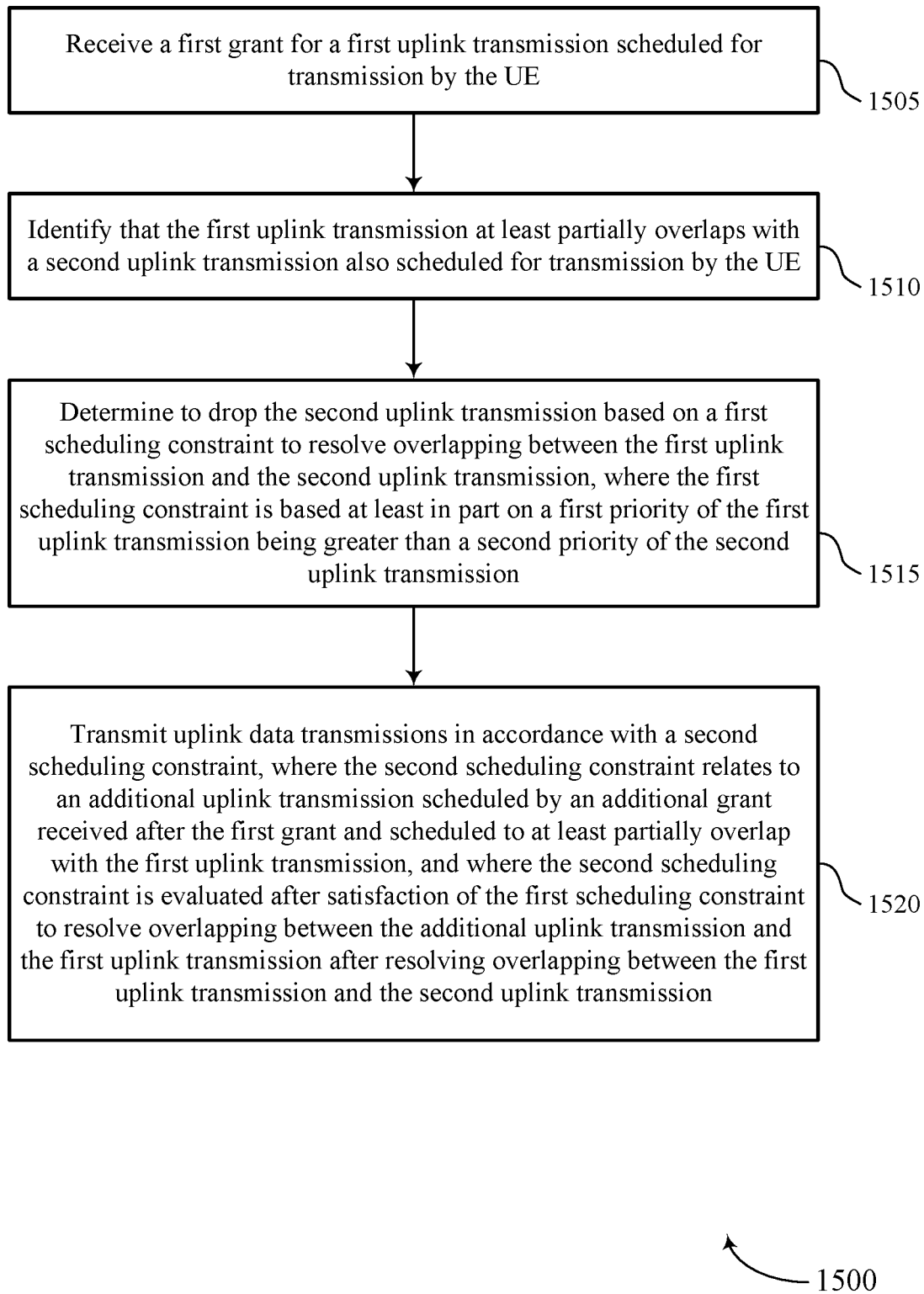
FIGS. 15 through 22 show flowcharts illustrating methods that support techniques for intra-UE and inter-UE cancelation of overlapping communications in accordance with aspects of the present disclosure.

FIG. 15 shows a flowchart illustrating a method 1500 that supports techniques for intra-UE and inter-UE cancelation of overlapping communications in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally, or alternatively, a UE may perform aspects of the functions described below using special-purpose hardware.

At 1505, the UE may receive a first grant for a first uplink transmission scheduled for transmission by the UE. The operations of 1505 may be performed according to the methods described herein. In some examples, aspects of the operations of 1505 may be performed by a grant manager as described with reference to FIGS. 7 through 10.

At 1510, the UE may identify that the first uplink transmission at least partially overlaps with a second uplink transmission also scheduled for transmission by the UE. The operations of 1510 may be performed according to the methods described herein. In some examples, aspects of the operations of 1510 may be performed by a scheduling manager as described with reference to FIGS. 7 through 10.

At 1515, the UE may determine to drop the second uplink transmission based on a first scheduling constraint to resolve overlapping between the first uplink transmission and the second uplink transmission, where the first scheduling constraint is based at least in part on a first priority of the first uplink transmission being greater than a second priority of the second uplink transmission. The operations of 1515 may be performed according to the methods described herein. In some examples, aspects of the operations of 1515 may be performed by a scheduling constraint manager as described with reference to FIGS. 7 through 10.

At 1520, the UE may transmit uplink data transmissions in accordance with a second scheduling constraint, where the second scheduling constraint relates to an additional uplink transmission scheduled by an additional grant received after the first grant and scheduled to at least partially overlap with the first uplink transmission, and where the second scheduling constraint is evaluated after satisfaction of the first scheduling constraint to resolve overlapping between the additional uplink transmission and the first uplink transmission after resolving overlapping between the first uplink transmission and the second uplink transmission. The operations of 1520 may be performed according to the methods described herein. In some examples, aspects of the operations of 1520 may be performed by a transmission manager as described with reference to FIGS. 7 through 10.

Figure 16:
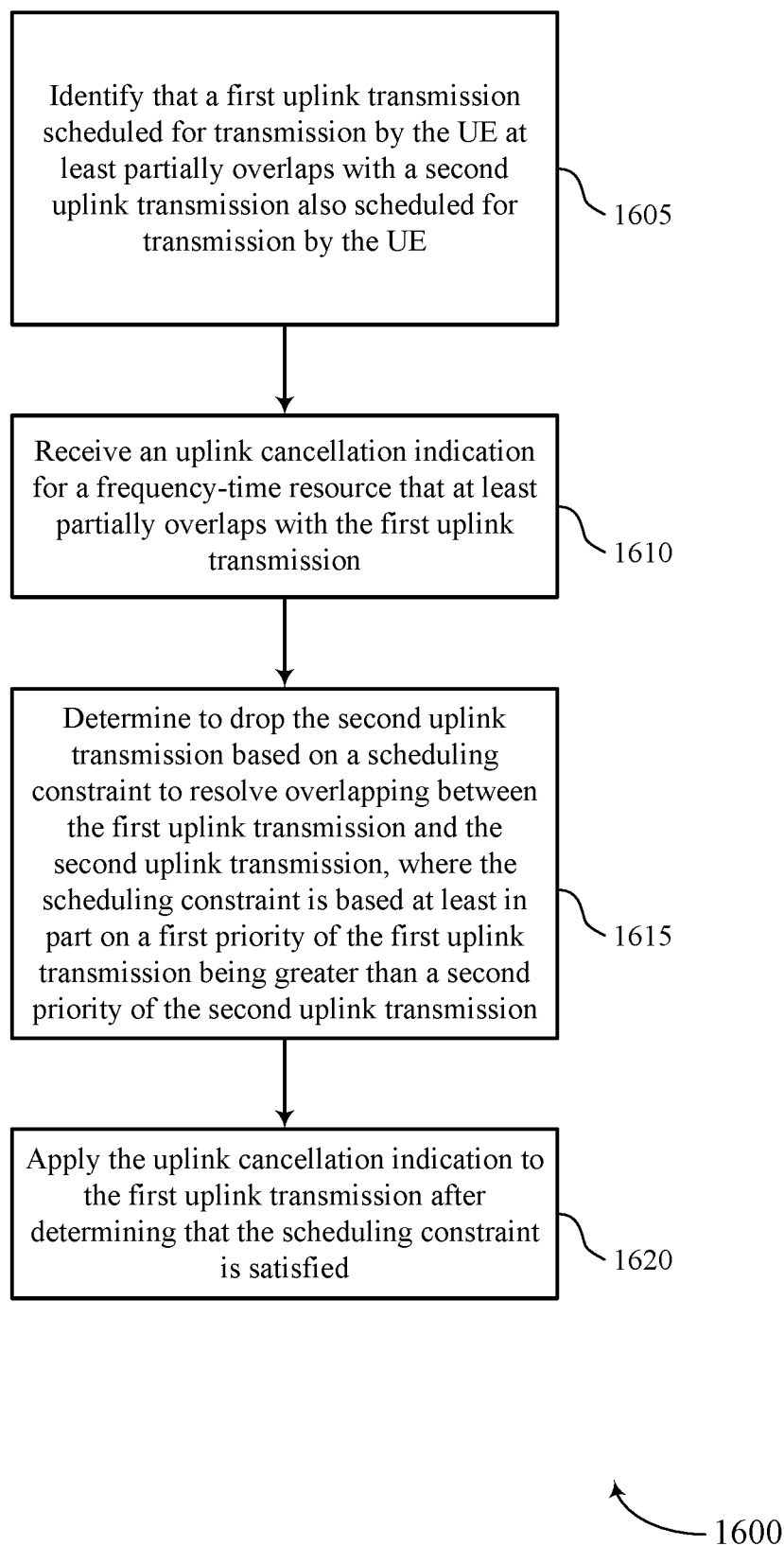

FIG. 16 shows a flowchart illustrating a method 1600 that supports techniques for intra-UE and inter-UE cancelation of overlapping communications in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally, or alternatively, a UE may perform aspects of the functions described below using special-purpose hardware.

At 1605, the UE may identify that a first uplink transmission scheduled for transmission by the UE at least partially overlaps with a second uplink transmission also scheduled for transmission by the UE. The operations of 1605 may be performed according to the methods described herein. In some examples, aspects of the operations of 1605 may be performed by a scheduling manager as described with reference to FIGS. 7 through 10.

At 1610, the UE may receive an uplink cancelation indication for a frequency-time resource that at least partially overlaps with the first uplink transmission. The operations of 1610 may be performed according to the methods described herein. In some examples, aspects of the operations of 1610 may be performed by a scheduling manager as described with reference to FIGS. 7 through 10.

At 1615, the UE may determine to drop the second uplink transmission based on a scheduling constraint to resolve overlapping between the first uplink transmission and the second uplink transmission, where the scheduling constraint is based at least in part on a first priority of the first uplink transmission being greater than a second priority of the second uplink transmission. The operations of 1615 may be performed according to the methods described herein. In some examples, aspects of the operations of 1615 may be performed by a scheduling constraint manager as described with reference to FIGS. 7 through 10.

At 1620, the UE may apply the uplink cancelation indication to the first uplink transmission after determining that the scheduling constraint is satisfied. The operations of 1620 may be performed according to the methods described herein. In some examples, aspects of the operations of 1620 may be performed by a scheduling constraint manager as described with reference to FIGS. 7 through 10.

Figure 17:
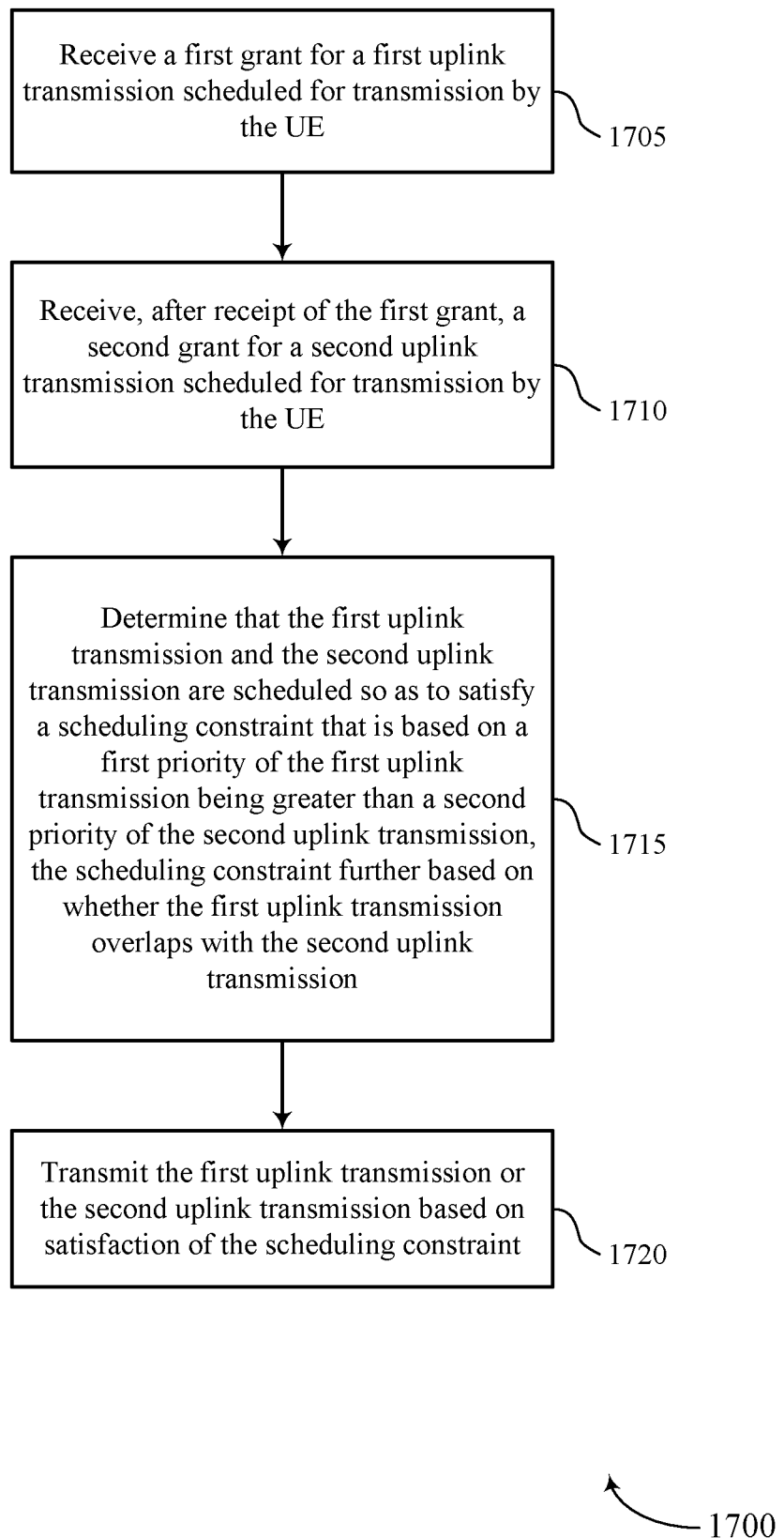

FIG. 17 shows a flowchart illustrating a method 1700 that supports techniques for intra-UE and inter-UE cancelation of overlapping communications in accordance with aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described below. Additionally, or alternatively, a UE may perform aspects of the functions described below using special-purpose hardware.

At 1705, the UE may receive a first grant for a first uplink transmission scheduled for transmission by the UE. The operations of 1705 may be performed according to the methods described herein. In some examples, aspects of the operations of 1705 may be performed by a grant manager as described with reference to FIGS. 7 through 10.

At 1710, the UE may receive, after receipt of the first grant, a second grant for a second uplink transmission scheduled for transmission by the UE. The operations of 1710 may be performed according to the methods described herein. In some examples, aspects of the operations of 1710 may be performed by a grant manager as described with reference to FIGS. 7 through 10.

At 1715, the UE may determine that the first uplink transmission and the second uplink transmission are scheduled so as to satisfy a scheduling constraint that is based on a first priority of the first uplink transmission being greater than a second priority of the second uplink transmission, the scheduling constraint further based on whether the first uplink transmission overlaps with the second uplink transmission. The operations of 1715 may be performed according to the methods described herein. In some examples, aspects of the operations of 1715 may be performed by a scheduling constraint manager as described with reference to FIGS. 7 through 10.

At 1720, the UE may transmit the first uplink transmission or the second uplink transmission based on satisfaction of the scheduling constraint. The operations of 1720 may be performed according to the methods described herein. In some examples, aspects of the operations of 1720 may be performed by a transmission manager as described with reference to FIGS. 7 through 10.

Figure 18:
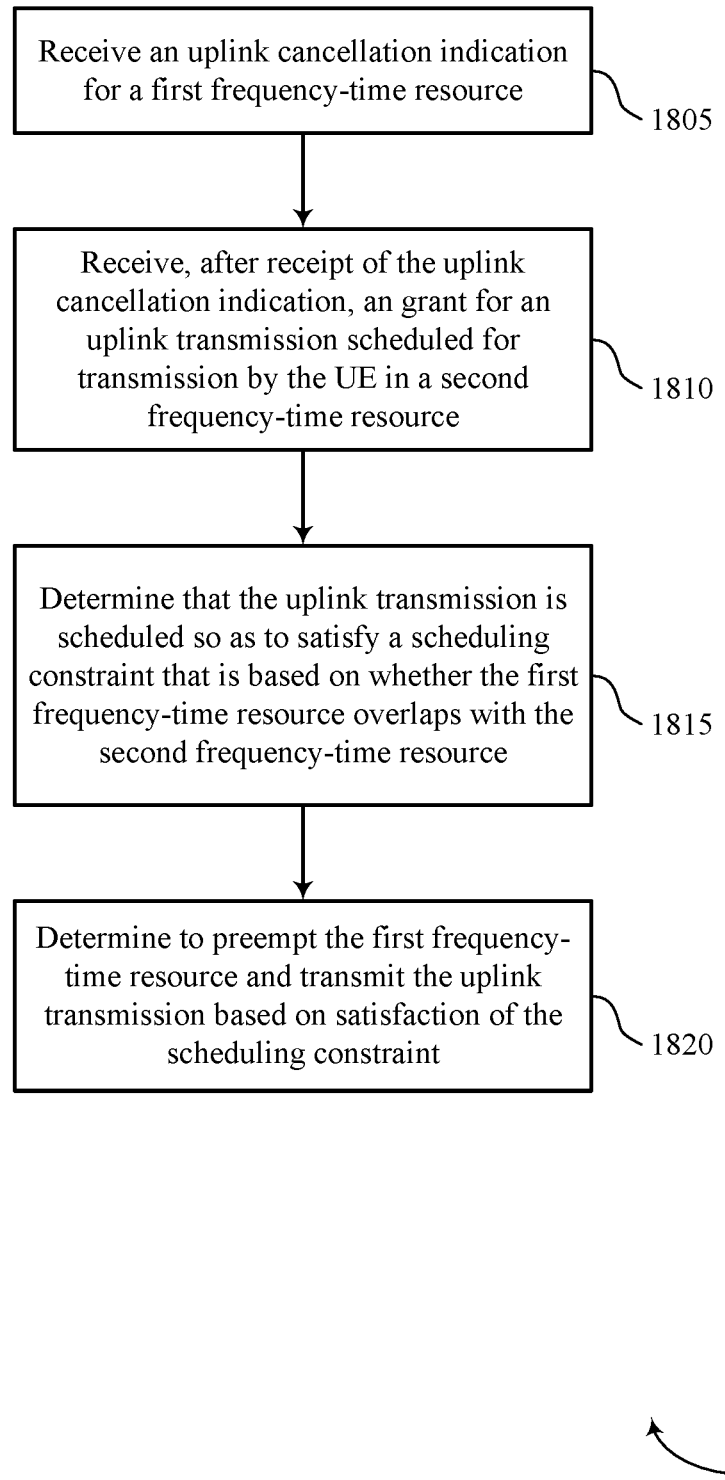

FIG. 18 shows a flowchart illustrating a method 1800 that supports techniques for intra-UE and inter-UE cancelation of overlapping communications in accordance with aspects of the present disclosure. The operations of method 1800 may be implemented by a UE 115 or its components as described herein. For example, the operations of method 1800 may be performed by a communications manager as described with reference to FIGS. 7 through 10. In some examples, a UE may execute a set of instructions to control the functional elements of the UE to perform the functions described below. Additionally, or alternatively, a UE may perform aspects of the functions described below using special-purpose hardware.

At 1805, the UE may receive an uplink cancelation indication for a first frequency-time resource. The operations of 1805 may be performed according to the methods described herein. In some examples, aspects of the operations of 1805 may be performed by a scheduling manager as described with reference to FIGS. 7 through 10.

At 1810, the UE may receive, after receipt of the uplink cancelation indication, a grant for an uplink transmission scheduled for transmission by the UE in a second frequency-time resource. The operations of 1810 may be performed according to the methods described herein. In some examples, aspects of the operations of 1810 may be performed by a grant manager as described with reference to FIGS. 7 through 10.

At 1815, the UE may determine that the uplink transmission is scheduled so as to satisfy a scheduling constraint that is based on whether the first frequency-time resource overlaps with the second frequency-time resource. The operations of 1815 may be performed according to the methods described herein. In some examples, aspects of the operations of 1815 may be performed by a scheduling constraint manager as described with reference to FIGS. 7 through 10.

At 1820, the UE may determine to preempt the first frequency-time resource and transmit the uplink transmission based on satisfaction of the scheduling constraint. The operations of 1820 may be performed according to the methods described herein. In some examples, aspects of the operations of 1820 may be performed by a scheduling constraint manager as described with reference to FIGS. 7 through 10.

Figure 19:
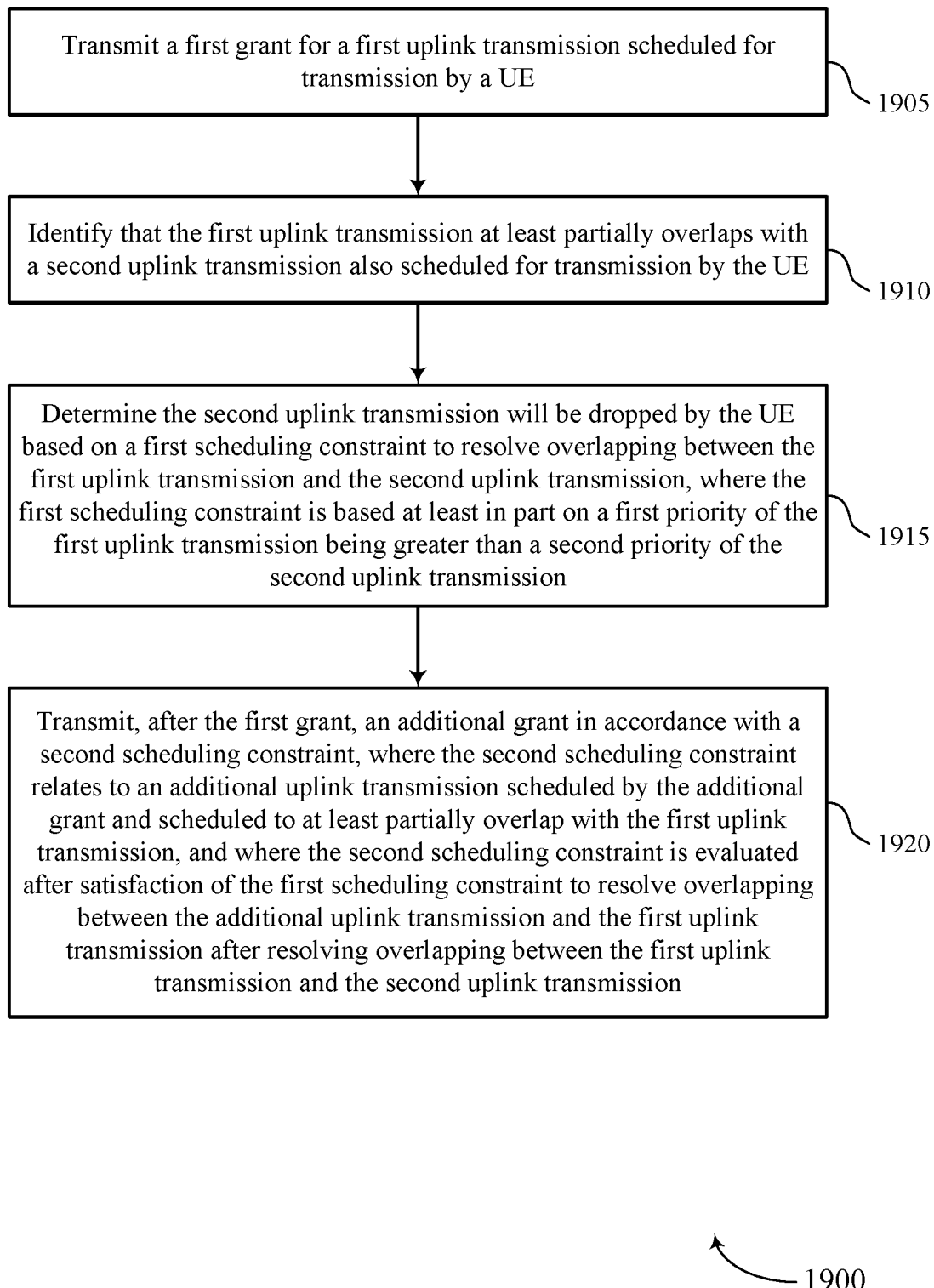

FIG. 19 shows a flowchart illustrating a method 1900 that supports techniques for intra-UE and inter-UE cancelation of overlapping communications in accordance with aspects of the present disclosure. The operations of method 1900 may be implemented by a base station 105 or its components as described herein. For example, the operations of method 1900 may be performed by a communications manager as described with reference to FIGS. 11 through 14. In some examples, a base station may execute a set of instructions to control the functional elements of the base station to perform the functions described below. Additionally, or alternatively, a base station may perform aspects of the functions described below using special-purpose hardware.

At 1905, the base station may transmit a first grant for a first uplink transmission scheduled for transmission by a UE. The operations of 1905 may be performed according to the methods described herein. In some examples, aspects of the operations of 1905 may be performed by a grant manager as described with reference to FIGS. 11 through 14.

At 1910, the base station may identify that the first uplink transmission at least partially overlaps with a second uplink transmission also scheduled for transmission by the UE. The operations of 1910 may be performed according to the methods described herein. In some examples, aspects of the operations of 1910 may be performed by a scheduling manager as described with reference to FIGS. 11 through 14.

At 1915, the base station may determine the second uplink transmission will be dropped by the UE based on a first scheduling constraint to resolve overlapping between the first uplink transmission and the second uplink transmission, where the first scheduling constraint is based at least in part on a first priority of the first uplink transmission being greater than a second priority of the second uplink transmission. The operations of 1915 may be performed according to the methods described herein. In some examples, aspects of the operations of 1915 may be performed by a scheduling constraint manager as described with reference to FIGS. 11 through 14.

At 1920, the base station may transmit, after the first grant, an additional grant in accordance with a second scheduling constraint, where the second scheduling constraint relates to an additional uplink transmission scheduled by the additional grant and scheduled to at least partially overlap with the first uplink transmission, and where the second scheduling constraint is evaluated after satisfaction of the first scheduling constraint to resolve overlapping between the additional uplink transmission and the first uplink transmission after resolving overlapping between the first uplink transmission and the second uplink transmission. The operations of 1920 may be performed according to the methods described herein. In some examples, aspects of the operations of 1920 may be performed by a grant manager as described with reference to FIGS. 11 through 14.

Figure 20:
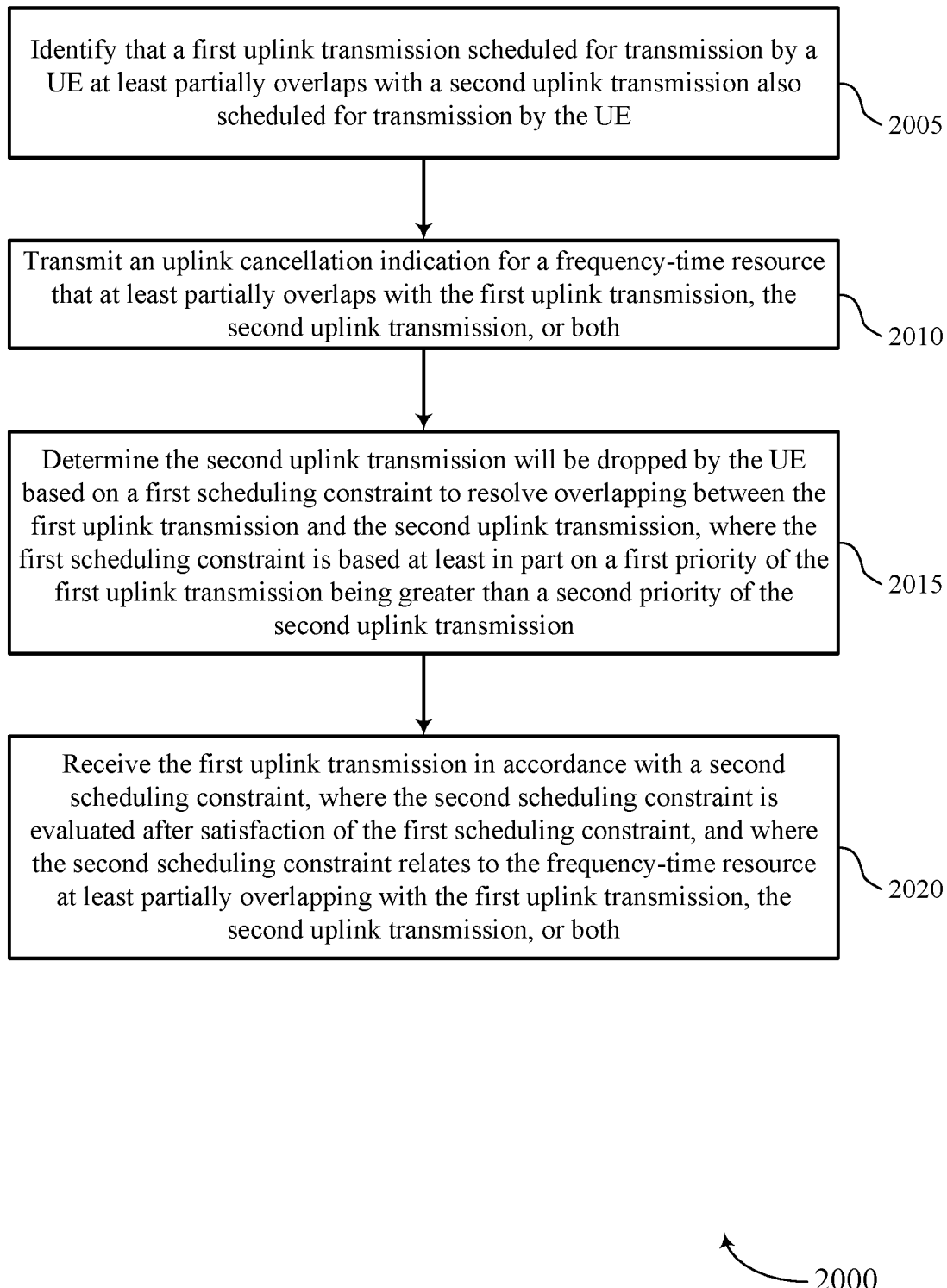

FIG. 20 shows a flowchart illustrating a method 2000 that supports techniques for intra-UE and inter-UE cancelation of overlapping communications in accordance with aspects of the present disclosure. The operations of method 2000 may be implemented by a base station 105 or its components as described herein. For example, the operations of method 2000 may be performed by a communications manager as described with reference to FIGS. 11 through 14. In some examples, a base station may execute a set of instructions to control the functional elements of the base station to perform the functions described below. Additionally, or alternatively, a base station may perform aspects of the functions described below using special-purpose hardware.

At 2005, the base station may identify that a first uplink transmission scheduled for transmission by a UE at least partially overlaps with a second uplink transmission also scheduled for transmission by the UE. The operations of 2005 may be performed according to the methods described herein. In some examples, aspects of the operations of 2005 may be performed by a scheduling manager as described with reference to FIGS. 11 through 14.

At 2010, the base station may transmit an uplink cancelation indication for a frequency-time resource that at least partially overlaps with the first uplink transmission, the second uplink transmission, or both. The operations of 2010 may be performed according to the methods described herein. In some examples, aspects of the operations of 2010 may be performed by a scheduling manager as described with reference to FIGS. 11 through 14.

At 2015, the base station may determine the second uplink transmission will be dropped by the UE based on a first scheduling constraint to resolve overlapping between the first uplink transmission and the second uplink transmission, where the first scheduling constraint is based at least in part on a first priority of the first uplink transmission being greater than a second priority of the second uplink transmission. The operations of 2015 may be performed according to the methods described herein. In some examples, aspects of the operations of 2015 may be performed by a scheduling constraint manager as described with reference to FIGS. 11 through 14.

At 2020, the base station may receive the first uplink transmission in accordance with a second scheduling constraint, where the second scheduling constraint is evaluated after satisfaction of the first scheduling constraint, and where the second scheduling constraint relates to the frequency-time resource at least partially overlapping with the first uplink transmission, the second uplink transmission, or both. The operations of 2020 may be performed according to the methods described herein. In some examples, aspects of the operations of 2020 may be performed by an UE transmission manager as described with reference to FIGS. 11 through 14.

Figure 21:
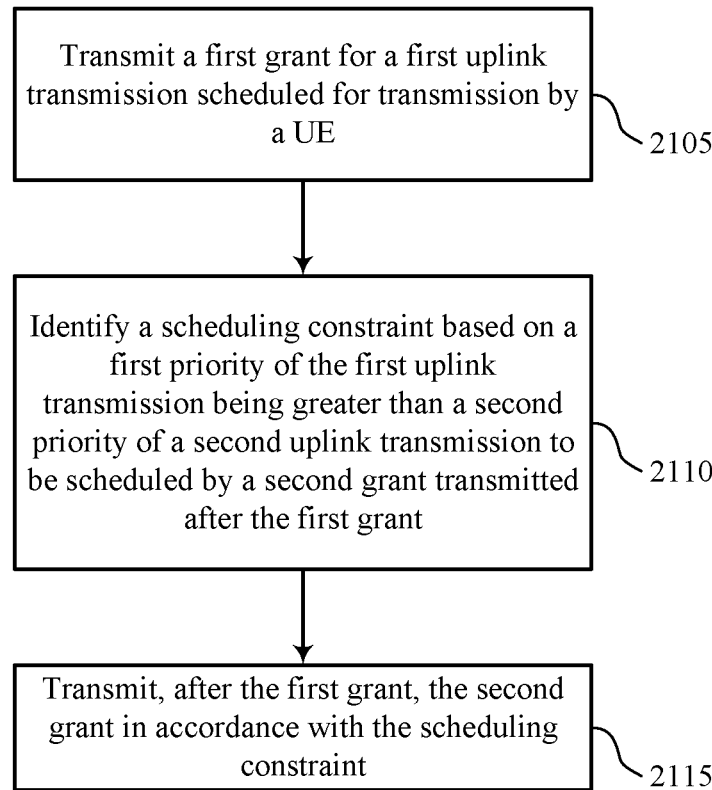

FIG. 21 shows a flowchart illustrating a method 2100 that supports techniques for intra-UE and inter-UE cancelation of overlapping communications in accordance with aspects of the present disclosure. The operations of method 2100 may be implemented by a base station 105 or its components as described herein. For example, the operations of method 2100 may be performed by a communications manager as described with reference to FIGS. 11 through 14. In some examples, a base station may execute a set of instructions to control the functional elements of the base station to perform the functions described below. Additionally, or alternatively, a base station may perform aspects of the functions described below using special-purpose hardware.

At 2105, the base station may transmit a first grant for a first uplink transmission scheduled for transmission by a UE. The operations of 2105 may be performed according to the methods described herein. In some examples, aspects of the operations of 2105 may be performed by a grant manager as described with reference to FIGS. 11 through 14.

At 2110, the base station may identify a scheduling constraint based on a first priority of the first uplink transmission being greater than a second priority of a second uplink transmission to be scheduled by a second grant transmitted after the first grant. The operations of 2110 may be performed according to the methods described herein. In some examples, aspects of the operations of 2110 may be performed by a scheduling constraint manager as described with reference to FIGS. 11 through 14.

At 2115, the base station may transmit, after the first grant, the second grant in accordance with the scheduling constraint. The operations of 2115 may be performed according to the methods described herein. In some examples, aspects of the operations of 2115 may be performed by a grant manager as described with reference to FIGS. 11 through 14.

Figure 22:
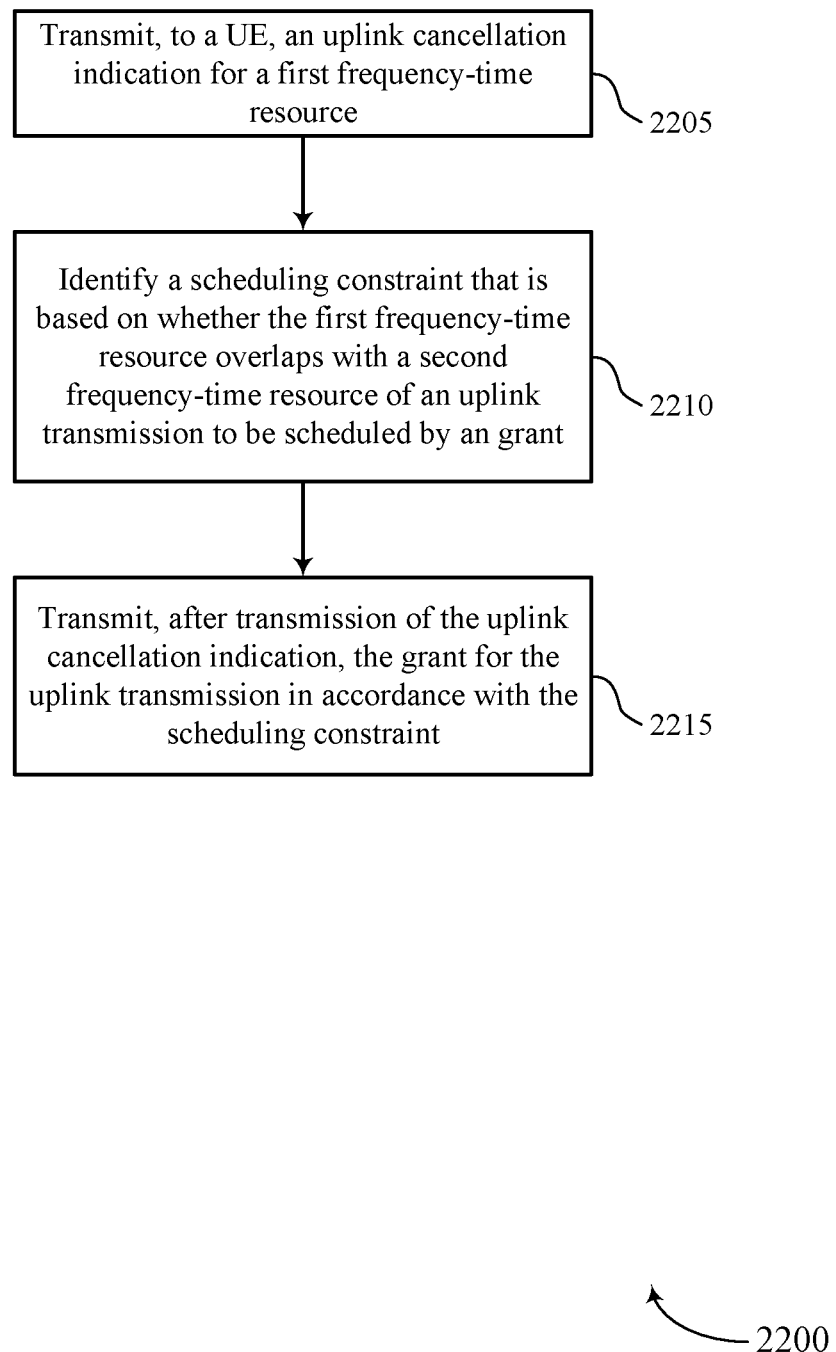

FIG. 22 shows a flowchart illustrating a method 2200 that supports techniques for intra-UE and inter-UE cancelation of overlapping communications in accordance with aspects of the present disclosure. The operations of method 2200 may be implemented by a base station 105 or its components as described herein. For example, the operations of method 2200 may be performed by a communications manager as described with reference to FIGS. 11 through 14. In some examples, a base station may execute a set of instructions to control the functional elements of the base station to perform the functions described below. Additionally, or alternatively, a base station may perform aspects of the functions described below using special-purpose hardware.

At 2205, the base station may transmit, to a UE, an uplink cancelation indication for a first frequency-time resource. The operations of 2205 may be performed according to the methods described herein. In some examples, aspects of the operations of 2205 may be performed by a scheduling manager as described with reference to FIGS. 11 through 14.

At 2210, the base station may identify a scheduling constraint that is based on whether the first frequency-time resource overlaps with a second frequency-time resource of an uplink transmission to be scheduled by a grant. The operations of 2210 may be performed according to the methods described herein. In some examples, aspects of the operations of 2210 may be performed by a scheduling constraint manager as described with reference to FIGS. 11 through 14.

At 2215, the base station may transmit, after transmission of the uplink cancelation indication, the grant for the uplink transmission in accordance with the scheduling constraint. The operations of 2215 may be performed according to the methods described herein. In some examples, aspects of the operations of 2215 may be performed by a grant manager as described with reference to FIGS. 11 through 14.

The following provides an overview of aspects of the present disclosure:

Aspect 1: A method for wireless communication at a UE, comprising: receiving a first grant for a first uplink transmission scheduled for transmission by the UE; identifying that the first uplink transmission at least partially overlaps with a second uplink transmission also scheduled for transmission by the UE; determining to drop the second uplink transmission based at least in part on a first scheduling constraint to resolve overlapping between the first uplink transmission and the second uplink transmission, wherein the first scheduling constraint is based at least in part on a first priority of the first uplink transmission being greater than a second priority of the second uplink transmission; and transmitting uplink data transmissions in accordance with a second scheduling constraint, wherein the second scheduling constraint relates to an additional uplink transmission scheduled by an additional grant received after the first grant and scheduled to at least partially overlap with the first uplink transmission, and wherein the second scheduling constraint is evaluated after satisfaction of the first scheduling constraint to resolve overlapping between the additional uplink transmission and the first uplink transmission after resolving overlapping between the first uplink transmission and the second uplink transmission.

Aspect 2: The method of aspect 1, further comprising: receiving the additional grant; and ignoring the received additional grant based at least in part on the second scheduling constraint until overlapping between the first uplink transmission and the second uplink transmission is resolved, wherein the second uplink transmission is dropped based at least in part on the ignoring.

Aspect 3: The method of any of aspects 1 through 2, further comprising: receiving the additional grant for the additional uplink transmission scheduled for transmission by the UE; and determining to drop the first uplink transmission based at least in part on the additional uplink transmission at least partially overlapping with the first uplink transmission, wherein the second uplink transmission and the additional uplink transmission are non-overlapping.

Aspect 4: The method of aspect 3, wherein transmitting the uplink data transmissions in accordance with the second scheduling constraint comprises: piggybacking at least a portion of the first uplink transmission on to the additional uplink transmission based at least in part on the determination to drop the first uplink transmission; and transmitting the additional uplink transmission and the piggybacked portion of the first uplink transmission, wherein the determination to drop the second uplink transmission is maintained based at least in part on the second scheduling constraint.

Aspect 5: The method of any of aspects 1 through 4, wherein the first uplink transmission comprises a high priority uplink control channel transmission or a high priority uplink shared channel transmission.

Aspect 6: The method of any of aspects 1 through 5, wherein the second uplink transmission comprises a low priority uplink control channel transmission, a low priority uplink shared channel transmission, or a sounding reference signal transmission.

Aspect 7: The method of any of aspects 1 through 6, wherein the additional uplink transmission comprises an additional high priority uplink transmission.

Aspect 8: The method of any of aspects 1 through 7, wherein the additional grant comprises a group-common grant, an uplink cancelation indication, or a slot format indicator.

Aspect 9: A method for wireless communication at a UE, comprising: identifying that a first uplink transmission scheduled for transmission by the UE at least partially overlaps with a second uplink transmission also scheduled for transmission by the UE; receiving an uplink cancelation indication for a frequency-time resource that at least partially overlaps with the first uplink transmission; determining to drop the second uplink transmission based at least in part on a scheduling constraint to resolve overlapping between the first uplink transmission and the second uplink transmission, wherein the scheduling constraint is based at least in part on a first priority of the first uplink transmission being greater than a second priority of the second uplink transmission; and applying the uplink cancelation indication to the first uplink transmission after determining that the scheduling constraint is satisfied.

Aspect 10: The method of aspect 9, wherein applying the uplink cancelation indication to the first uplink transmission comprises: determining to drop the first uplink transmission based at least in part on the frequency-time resource at least partially overlapping with the first uplink transmission.

Aspect 11: The method of any of aspects 9 through 10, wherein applying the uplink cancelation indication to the first uplink transmission comprises: determining to transmit the first uplink transmission even though the frequency-time resource at least partially overlaps with the first uplink transmission.

Aspect 12: The method of any of aspects 9 through 11, wherein the first uplink transmission comprises a high priority uplink control channel transmission or a high priority uplink shared channel transmission.

Aspect 13: The method of any of aspects 9 through 12, wherein the second uplink transmission comprises a low priority uplink control channel transmission, a low priority uplink shared channel transmission, or a sounding reference signal transmission.

Aspect 14: A method for wireless communication at a UE, comprising: receiving a first grant for a first uplink transmission scheduled for transmission by the UE; receiving, after receipt of the first grant, a second grant for a second uplink transmission scheduled for transmission by the UE; determining that the first uplink transmission and the second uplink transmission are scheduled so as to satisfy a scheduling constraint that is based at least in part on a first priority of the first uplink transmission being greater than a second priority of the second uplink transmission, the scheduling constraint further based on whether the first uplink transmission overlaps with the second uplink transmission; and transmitting the first uplink transmission or the second uplink transmission based at least in part on satisfaction of the scheduling constraint.

Aspect 15: The method of aspect 14, wherein transmitting the first uplink transmission or the second uplink transmission based at least in part on satisfaction of the scheduling constraint comprises: transmitting the first uplink transmission.

Aspect 16: The method of aspect 15, further comprising: identifying that the UE has data to be included in the first uplink transmission, wherein the first uplink transmission is transmitted based at least in part on the UE having data to be included in the first uplink transmission.

Aspect 17: The method of any of aspects 15 through 16, further comprising: discarding the received second grant based at least in part on the scheduling constraint, wherein the first uplink transmission is transmitted based at least in part on the discarding.

Aspect 18: The method of any of aspects 15 through 17, wherein the first grant comprises a dynamic high priority grant.

Aspect 19: The method of any of aspects 14 through 18, wherein transmitting the first uplink transmission or the second uplink transmission based at least in part on satisfaction of the scheduling constraint comprises: transmitting the second uplink transmission.

Aspect 20: The method of aspect 19, further comprising: determining to skip the first uplink transmission based at least in part on a buffer status of the UE being below a threshold, wherein the second uplink transmission is transmitted based at least in part on the determination to skip the first uplink transmission.

Aspect 21: The method of aspect 20, wherein the first uplink transmission comprises a high priority scheduling request or a high priority uplink configured grant transmission.

Aspect 22: The method of any of aspects 14 through 21, wherein the scheduling constraint is satisfied based at least in part on the first uplink transmission and the second uplink transmission being non-overlapping.

Aspect 23: The method of any of aspects 14 through 22, wherein the first uplink transmission comprises a hybrid automatic repeat request acknowledgment transmission or a channel state information transmission.

Aspect 24: The method of any of aspects 14 through 23, wherein the scheduling constraint provides that the UE does not expect to receive a grant scheduling a low priority uplink transmission that overlaps with a previously scheduled high priority uplink transmission.

Aspect 25: A method for wireless communication at a UE, comprising: receiving an uplink cancelation indication for a first frequency-time resource; receiving, after receipt of the uplink cancelation indication, a grant for an uplink transmission scheduled for transmission by the UE in a second frequency-time resource; determining that the uplink transmission is scheduled so as to satisfy a scheduling constraint that is based at least in part on whether the first frequency-time resource overlaps with the second frequency-time resource; and determining to preempt the first frequency-time resource and transmit the uplink transmission based at least in part on satisfaction of the scheduling constraint.

Aspect 26: The method of aspect 25, wherein the scheduling constraint is satisfied based at least in part on the first frequency-time resource being entirely separate in time and frequency than the second frequency-time resource.

Aspect 27: A method for wireless communication at a base station, comprising: transmitting a first grant for a first uplink transmission scheduled for transmission by a UE; identifying that the first uplink transmission at least partially overlaps with a second uplink transmission also scheduled for transmission by the UE; determining the second uplink transmission will be dropped by the UE based at least in part on a first scheduling constraint to resolve overlapping between the first uplink transmission and the second uplink transmission, wherein the first scheduling constraint is based at least in part on a first priority of the first uplink transmission being greater than a second priority of the second uplink transmission; and transmitting, after the first grant, an additional grant in accordance with a second scheduling constraint, wherein the second scheduling constraint relates to an additional uplink transmission scheduled by the additional grant and scheduled to at least partially overlap with the first uplink transmission, and wherein the second scheduling constraint is evaluated after satisfaction of the first scheduling constraint to resolve overlapping between the additional uplink transmission and the first uplink transmission after resolving overlapping between the first uplink transmission and the second uplink transmission.

Aspect 28: The method of aspect 27, further comprising: determining the transmitted additional grant will be ignored by the UE based at least in part on the second scheduling constraint until overlapping between the first uplink transmission and the second uplink transmission is resolved, wherein the second uplink transmission is dropped based at least in part on the ignoring.

Aspect 29: The method of any of aspects 27 through 28, further comprising: determining the first uplink transmission will be dropped by the UE based at least in part on transmitting the additional grant.

Aspect 30: The method of aspect 29, further comprising: receiving the additional uplink transmission and a piggybacked portion of the first uplink transmission.

Aspect 31: The method of any of aspects 27 through 30, wherein the first uplink transmission comprises a high priority uplink control channel transmission or a high priority uplink shared channel transmission.

Aspect 32: The method of any of aspects 27 through 31, wherein the second uplink transmission comprises a low priority uplink control channel transmission, a low priority uplink shared channel transmission, or a sounding reference signal transmission.

Aspect 33: The method of any of aspects 27 through 32, wherein the additional uplink transmission comprises an additional high priority uplink transmission.

Aspect 34: The method of any of aspects 27 through 33, wherein the additional grant comprises a group-common grant, an uplink cancelation indication, or a slot format indicator.

Aspect 35: A method for wireless communication at a base station, comprising: identifying that a first uplink transmission scheduled for transmission by a UE at least partially overlaps with a second uplink transmission also scheduled for transmission by the UE; transmitting an uplink cancelation indication for a frequency-time resource that at least partially overlaps with the first uplink transmission, the second uplink transmission, or both; determining the second uplink transmission will be dropped by the UE based at least in part on a first scheduling constraint to resolve overlapping between the first uplink transmission and the second uplink transmission, wherein the first scheduling constraint is based at least in part on a first priority of the first uplink transmission being greater than a second priority of the second uplink transmission; and receiving the first uplink transmission in accordance with a second scheduling constraint, wherein the second scheduling constraint is evaluated after satisfaction of the first scheduling constraint, and wherein the second scheduling constraint relates to the frequency-time resource at least partially overlapping with the first uplink transmission, the second uplink transmission, or both.

Aspect 36: The method of aspect 35, wherein receiving the first uplink transmission in accordance with the second scheduling constraint comprises: determining the first uplink transmission will be dropped by the UE based at least in part on the frequency-time resource at least partially overlapping with the first uplink transmission.

Aspect 37: The method of any of aspects 35 through 36, wherein receiving the first uplink transmission in accordance with the second scheduling constraint comprises: receiving the first uplink transmission based at least in part on the frequency-time resource at least partially overlapping with the second uplink transmission.

Aspect 38: The method of any of aspects 35 through 37, wherein the first uplink transmission comprises a high priority uplink control channel transmission or a high priority uplink shared channel transmission.

Aspect 39: The method of any of aspects 35 through 38, wherein the second uplink transmission comprises a low priority uplink control channel transmission, a low priority uplink shared channel transmission, or a sounding reference signal transmission.

Aspect 40: A method for wireless communication at a base station, comprising: transmitting a first grant for a first uplink transmission scheduled for transmission by a UE; identifying a scheduling constraint based at least in part on a first priority of the first uplink transmission being greater than a second priority of a second uplink transmission to be scheduled by a second grant transmitted after the first grant; and transmitting, after the first grant, the second grant in accordance with the scheduling constraint.

Aspect 41: The method of aspect 40, further comprising: receiving the first uplink transmission based at least in part on the transmitted first grant.

Aspect 42: The method of aspect 41, wherein the first grant comprises a dynamic high priority grant.

Aspect 43: The method of any of aspects 40 through 42, further comprising: receiving the second uplink transmission based at least in part on the transmitted additional grant.

Aspect 44: The method of aspect 43, wherein the first uplink transmission comprises a high priority scheduling request or a high priority uplink configured grant transmission.

Aspect 45: The method of any of aspects 43 through 44, further comprising: determining the UE skipped the first uplink transmission based at least in part on receiving the second uplink transmission, wherein the determination that the UE skipped the first uplink transmission is based at least in part on a buffer status of the UE being below a threshold.

Aspect 46: The method of any of aspects 40 through 45, wherein the scheduling constraint further relates to the second uplink transmission scheduled to overlap with the first uplink transmission.

Aspect 47: The method of any of aspects 40 through 46, wherein the first uplink transmission comprises a hybrid automatic repeat request acknowledgment transmission or a channel state information transmission.

Aspect 48: The method of any of aspects 40 through 47, wherein the scheduling constraint provides that the UE does not expect to receive a grant scheduling a low priority uplink transmission that overlaps with a previously scheduled high priority uplink transmission.

Aspect 49: A method for wireless communication at a base station, comprising: transmitting, to a UE, an uplink cancelation indication for a first frequency-time resource; identifying a scheduling constraint that is based at least in part on whether the first frequency-time resource overlaps with a second frequency-time resource of an uplink transmission to be scheduled by a grant; and transmitting, after transmission of the uplink cancelation indication, the grant for the uplink transmission in accordance with the scheduling constraint.

Aspect 50: The method of aspect 49, wherein the scheduling constraint is satisfied based at least in part on the first frequency-time resource being entirely separate in time and frequency than the second frequency-time resource.

Aspect 51: An apparatus for wireless communication at a UE, comprising a processor; memory coupled with the processor; and instructions stored in the memory and executable by the processor to cause the apparatus to perform a method of any of aspects 1 through 8.

Aspect 52: An apparatus for wireless communication at a UE, comprising at least one means for performing a method of any of aspects 1 through 8.

Aspect 53: A non-transitory computer-readable medium storing code for wireless communication at a UE, the code comprising instructions executable by a processor to perform a method of any of aspects 1 through 8.

Aspect 54: An apparatus for wireless communication at a UE, comprising a processor; memory coupled with the processor; and instructions stored in the memory and executable by the processor to cause the apparatus to perform a method of any of aspects 9 through 13.

Aspect 55: An apparatus for wireless communication at a UE, comprising at least one means for performing a method of any of aspects 9 through 13.

Aspect 56: A non-transitory computer-readable medium storing code for wireless communication at a UE, the code comprising instructions executable by a processor to perform a method of any of aspects 9 through 13.

Aspect 57: An apparatus for wireless communication at a UE, comprising a processor; memory coupled with the processor; and instructions stored in the memory and executable by the processor to cause the apparatus to perform a method of any of aspects 14 through 24.

Aspect 58: An apparatus for wireless communication at a UE, comprising at least one means for performing a method of any of aspects 14 through 24.

Aspect 59: A non-transitory computer-readable medium storing code for wireless communication at a UE, the code comprising instructions executable by a processor to perform a method of any of aspects 14 through 24.

Aspect 60: An apparatus for wireless communication at a UE, comprising a processor; memory coupled with the processor; and instructions stored in the memory and executable by the processor to cause the apparatus to perform a method of any of aspects 25 through 26.

Aspect 61: An apparatus for wireless communication at a UE, comprising at least one means for performing a method of any of aspects 25 through 26.

Aspect 62: A non-transitory computer-readable medium storing code for wireless communication at a UE, the code comprising instructions executable by a processor to perform a method of any of aspects 25 through 26.

Aspect 63: An apparatus for wireless communication at a base station, comprising a processor; memory coupled with the processor; and instructions stored in the memory and executable by the processor to cause the apparatus to perform a method of any of aspects 27 through 34.

Aspect 64: An apparatus for wireless communication at a base station, comprising at least one means for performing a method of any of aspects 27 through 34.

Aspect 65: A non-transitory computer-readable medium storing code for wireless communication at a base station, the code comprising instructions executable by a processor to perform a method of any of aspects 27 through 34.

Aspect 66: An apparatus for wireless communication at a base station, comprising a processor; memory coupled with the processor; and instructions stored in the memory and executable by the processor to cause the apparatus to perform a method of any of aspects 35 through 39.

Aspect 67: An apparatus for wireless communication at a base station, comprising at least one means for performing a method of any of aspects 35 through 39.

Aspect 68: A non-transitory computer-readable medium storing code for wireless communication at a base station, the code comprising instructions executable by a processor to perform a method of any of aspects 35 through 39.

Aspect 69: An apparatus for wireless communication at a base station, comprising a processor; memory coupled with the processor; and instructions stored in the memory and executable by the processor to cause the apparatus to perform a method of any of aspects 40 through 48.

Aspect 70: An apparatus for wireless communication at a base station, comprising at least one means for performing a method of any of aspects 40 through 48.

Aspect 71: A non-transitory computer-readable medium storing code for wireless communication at a base station, the code comprising instructions executable by a processor to perform a method of any of aspects 40 through 48.

Aspect 72: An apparatus for wireless communication at a base station, comprising a processor; memory coupled with the processor; and instructions stored in the memory and executable by the processor to cause the apparatus to perform a method of any of aspects 49 through 50.

Aspect 73: An apparatus for wireless communication at a base station, comprising at least one means for performing a method of any of aspects 49 through 50.

Aspect 74: A non-transitory computer-readable medium storing code for wireless communication at a base station, the code comprising instructions executable by a processor to perform a method of any of aspects 49 through 50.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
  receiving a first grant for a first uplink transmission scheduled for transmission by the UE;

identifying that the first uplink transmission at least partially overlaps with a second uplink transmission also scheduled for transmission by the UE;

determining to drop the second uplink transmission based at least in part on a first scheduling constraint to resolve overlapping between the first uplink transmission and the second uplink transmission, wherein the first scheduling constraint is based at least in part on a first priority of the first uplink transmission being greater than a second priority of the second uplink transmission; and transmitting uplink data transmissions in accordance with a second scheduling constraint, wherein the second scheduling constraint relates to an additional uplink transmission scheduled by an additional grant received after the first grant and scheduled to at least partially overlap with the first uplink transmission, and wherein the second scheduling constraint is evaluated after satisfaction of the first scheduling constraint to resolve overlapping between the additional uplink transmission and the first uplink transmission after resolving overlapping between the first uplink transmission and the second uplink transmission.

2. The method of claim 1, further comprising:
receiving the additional grant; and
ignoring the received additional grant based at least in part on the second scheduling constraint until overlapping between the first uplink transmission and the second uplink transmission is resolved, wherein the second uplink transmission is dropped based at least in part on the ignoring.

3. The method of claim 1, further comprising:
receiving the additional grant for the additional uplink transmission scheduled for transmission by the UE; and
determining to drop the first uplink transmission based at least in part on the additional uplink transmission at least partially overlapping with the first uplink transmission, wherein the second uplink transmission and the additional uplink transmission are non-overlapping.

4. The method of claim 3, wherein transmitting the uplink data transmissions in accordance with the second scheduling constraint comprises:
piggybacking at least a portion of the first uplink transmission on to the additional uplink transmission based at least in part on the determination to drop the first uplink transmission; and
transmitting the additional uplink transmission and the piggybacked portion of the first uplink transmission, wherein the determination to drop the second uplink transmission is maintained based at least in part on the second scheduling constraint.

5. The method of claim 1, wherein the first uplink transmission comprises a high priority uplink control channel transmission or a high priority uplink shared channel transmission.

6. The method of claim 1, wherein the second uplink transmission comprises a low priority uplink control channel transmission, a low priority uplink shared channel transmission, or a sounding reference signal transmission.

7. The method of claim 1, wherein the additional uplink transmission comprises an additional high priority uplink transmission.

8. The method of claim 1, wherein the additional grant comprises a group-common grant, an uplink cancelation indication, or a slot format indicator.

9. A method for wireless communication at a user equipment (UE), comprising:

identifying that a first uplink transmission scheduled for transmission by the UE at least partially overlaps with a second uplink transmission also scheduled for transmission by the UE;

receiving an uplink cancelation indication for a frequency-time resource that at least partially overlaps with the first uplink transmission;

determining to drop the second uplink transmission based at least in part on a scheduling constraint to resolve overlapping between the first uplink transmission and the second uplink transmission, wherein the scheduling constraint is based at least in part on a first priority of the first uplink transmission being greater than a second priority of the second uplink transmission; and applying the uplink cancelation indication to the first uplink transmission after determining that the scheduling constraint is satisfied.

10. The method of claim 9, wherein applying the uplink cancelation indication to the first uplink transmission comprises:
determining to drop the first uplink transmission based at least in part on the frequency-time resource at least partially overlapping with the first uplink transmission.

11. The method of claim 9, wherein applying the uplink cancelation indication to the first uplink transmission comprises:
determining to transmit the first uplink transmission even though the frequency-time resource at least partially overlaps with the first uplink transmission.

12. The method of claim 9, wherein the first uplink transmission comprises a high priority uplink control channel transmission or a high priority uplink shared channel transmission.

13. The method of claim 9, wherein the second uplink transmission comprises a low priority uplink control channel transmission, a low priority uplink shared channel transmission, or a sounding reference signal transmission.

14. A method for wireless communication at a base station, comprising:
transmitting a first grant for a first uplink transmission scheduled for transmission by a user equipment (UE);
identifying that the first uplink transmission at least partially overlaps with a second uplink transmission also scheduled for transmission by the UE;
determining the second uplink transmission will be dropped by the UE based at least in part on a first scheduling constraint to resolve overlapping between the first uplink transmission and the second uplink transmission, wherein the first scheduling constraint is based at least in part on a first priority of the first uplink transmission being greater than a second priority of the second uplink transmission; and
transmitting, after the first grant, an additional grant in accordance with a second scheduling constraint, wherein the second scheduling constraint relates to an additional uplink transmission scheduled by the additional grant and scheduled to at least partially overlap with the first uplink transmission, and wherein the second scheduling constraint is evaluated after satisfaction of the first scheduling constraint to resolve overlapping between the additional uplink transmission and the first uplink transmission after resolving overlapping between the first uplink transmission and the second uplink transmission.

15. The method of claim 14, further comprising:
determining the transmitted additional grant will be ignored by the UE based at least in part on the second scheduling constraint until overlapping between the first uplink transmission and the second uplink transmission is resolved, wherein the second uplink transmission is dropped based at least in part on the ignoring.

16. The method of claim 14, further comprising:
determining the first uplink transmission will be dropped by the UE based at least in part on transmitting the additional grant.

17. The method of claim 16, further comprising:
receiving the additional uplink transmission and a piggybacked portion of the first uplink transmission.

18. The method of claim 14, wherein the first uplink transmission comprises a high priority uplink control channel transmission or a high priority uplink shared channel transmission.

19. The method of claim 14, wherein the second uplink transmission comprises a low priority uplink control channel transmission, a low priority uplink shared channel transmission, or a sounding reference signal transmission.

20. The method of claim 14, wherein the additional uplink transmission comprises an additional high priority uplink transmission.

21. The method of claim 14, wherein the additional grant comprises a group-common grant, an uplink cancelation indication, or a slot format indicator.

22. A method for wireless communication at a base station, comprising:
identifying that a first uplink transmission scheduled for transmission by a user equipment (UE) at least partially overlaps with a second uplink transmission also scheduled for transmission by the UE;
transmitting an uplink cancelation indication for a frequency-time resource that at least partially overlaps with the first uplink transmission, the second uplink transmission, or both;
determining the second uplink transmission will be dropped by the UE based at least in part on a first scheduling constraint to resolve overlapping between the first uplink transmission and the second uplink transmission, wherein the first scheduling constraint is based at least in part on a first priority of the first uplink transmission being greater than a second priority of the second uplink transmission; and
receiving the first uplink transmission in accordance with a second scheduling constraint, wherein the second scheduling constraint is evaluated after satisfaction of the first scheduling constraint, and wherein the second scheduling constraint relates to the frequency-time resource at least partially overlapping with the first uplink transmission, the second uplink transmission, or both.

23. The method of claim 22, wherein receiving the first uplink transmission in accordance with the second scheduling constraint comprises:
determining the first uplink transmission will be dropped by the UE based at least in part on the frequency-time resource at least partially overlapping with the first uplink transmission.

24. The method of claim 22, wherein receiving the first uplink transmission in accordance with the second scheduling constraint comprises:
receiving the first uplink transmission based at least in part on the frequency-time resource at least partially overlapping with the second uplink transmission.

25. The method of claim 22, wherein the first uplink transmission comprises a high priority uplink control channel transmission or a high priority uplink shared channel transmission.

26. The method of claim 22, wherein the second uplink transmission comprises a low priority uplink control channel transmission, a low priority uplink shared channel transmission, or a sounding reference signal transmission.

27. An apparatus for wireless communication at a user equipment (UE), comprising:
a processor,
memory coupled with the processor; and
instructions stored in the memory and executable by the processor to cause the apparatus to:
receive a first grant for a first uplink transmission scheduled for transmission by the UE;
identify that the first uplink transmission at least partially overlaps with a second uplink transmission also scheduled for transmission by the UE;
determine to drop the second uplink transmission based at least in part on a first scheduling constraint to resolve overlapping between the first uplink transmission and the second uplink transmission, wherein the first scheduling constraint is based at least in part on a first priority of the first uplink transmission being greater than a second priority of the second uplink transmission; and
transmit uplink data transmissions in accordance with a second scheduling constraint, wherein the second scheduling constraint relates to an additional uplink transmission scheduled by an additional grant received after the first grant and scheduled to at least partially overlap with the first uplink transmission, and wherein the second scheduling constraint is evaluated after satisfaction of the first scheduling constraint to resolve overlapping between the additional uplink transmission and the first uplink transmission after resolving overlapping between the first uplink transmission and the second uplink transmission.

28. The apparatus of claim 27, wherein the instructions are further executable by the processor to cause the apparatus to:
receive the additional grant; and
ignoring the received additional grant based at least in part on the second scheduling constraint until overlapping between the first uplink transmission and the second uplink transmission is resolved, wherein the second uplink transmission is dropped based at least in part on the ignoring.

29. The apparatus of claim 27, wherein the instructions are further executable by the processor to cause the apparatus to:
receive the additional grant for the additional uplink transmission scheduled for transmission by the UE; and
determine to drop the first uplink transmission based at least in part on the additional uplink transmission at least partially overlapping with the first uplink transmission, wherein the second uplink transmission and the additional uplink transmission are non-overlapping.

30. The apparatus of claim 29, wherein the instructions to transmit the uplink data transmissions in accordance with the second scheduling constraint are executable by the processor to cause the apparatus to:

piggyback at least a portion of the first uplink transmission on to the additional uplink transmission based at least in part on the determination to drop the first uplink transmission; and transmit the additional uplink transmission and the piggybacked portion of the first uplink transmission, wherein the determination to drop the second uplink transmission is maintained based at least in part on the second scheduling constraint.

31. The apparatus of claim 27, wherein the first uplink transmission comprises a high priority uplink control channel transmission or a high priority uplink shared channel transmission.

32. The apparatus of claim 27, wherein the second uplink transmission comprises a low priority uplink control channel transmission, a low priority uplink shared channel transmission, or a sounding reference signal transmission.

33. The apparatus of claim 27, wherein the additional uplink transmission comprises an additional high priority uplink transmission.

34. The apparatus of claim 27, wherein the additional grant comprises a group-common grant, an uplink cancelation indication, or a slot format indicator.

35. An apparatus for wireless communication at a user equipment (UE), comprising:
a processor,
memory coupled with the processor; and
instructions stored in the memory and executable by the processor to cause the apparatus to:
identify that a first uplink transmission scheduled for transmission by the UE at least partially overlaps with a second uplink transmission also scheduled for transmission by the UE;
receive an uplink cancelation indication for a frequency-time resource that at least partially overlaps with the first uplink transmission;
determine to drop the second uplink transmission based at least in part on a scheduling constraint to resolve overlapping between the first uplink transmission and the second uplink transmission, wherein the scheduling constraint is based at least in part on a first priority of the first uplink transmission being greater than a second priority of the second uplink transmission; and
apply the uplink cancelation indication to the first uplink transmission after determining that the scheduling constraint is satisfied.

36. The apparatus of claim 35, wherein the instructions to apply the uplink cancelation indication to the first uplink transmission are executable by the processor to cause the apparatus to:
determine to drop the first uplink transmission based at least in part on the frequency-time resource at least partially overlapping with the first uplink transmission.

37. The apparatus of claim 35, wherein the instructions to apply the uplink cancelation indication to the first uplink transmission are executable by the processor to cause the apparatus to:
determine to transmit the first uplink transmission even though the frequency-time resource at least partially overlaps with the first uplink transmission.

38. The apparatus of claim 35, wherein the first uplink transmission comprises a high priority uplink control channel transmission or a high priority uplink shared channel transmission.

39. The apparatus of claim 35, wherein the second uplink transmission comprises a low priority uplink control channel transmission, a low priority uplink shared channel transmission, or a sounding reference signal transmission.

40. An apparatus for wireless communication at a base station, comprising:
a processor,
memory coupled with the processor; and
instructions stored in the memory and executable by the processor to cause the apparatus to:
transmit a first grant for a first uplink transmission scheduled for transmission by a user equipment (UE);
identify that the first uplink transmission at least partially overlaps with a second uplink transmission also scheduled for transmission by the UE;
determine the second uplink transmission will be dropped by the UE based at least in part on a first scheduling constraint to resolve overlapping between the first uplink transmission and the second uplink transmission, wherein the first scheduling constraint is based at least in part on a first priority of the first uplink transmission being greater than a second priority of the second uplink transmission; and
transmit, after the first grant, an additional grant in accordance with a second scheduling constraint, wherein the second scheduling constraint relates to an additional uplink transmission scheduled by the additional grant and scheduled to at least partially overlap with the first uplink transmission, and wherein the second scheduling constraint is evaluated after satisfaction of the first scheduling constraint to resolve overlapping between the additional uplink transmission and the first uplink transmission after resolving overlapping between the first uplink transmission and the second uplink transmission.

41. The apparatus of claim 40, wherein the instructions are further executable by the processor to cause the apparatus to:
determine the transmitted additional grant will be ignored by the UE based at least in part on the second scheduling constraint until overlapping between the first uplink transmission and the second uplink transmission is resolved, wherein the second uplink transmission is dropped based at least in part on the ignoring.

42. The apparatus of claim 40, wherein the instructions are further executable by the processor to cause the apparatus to:
determine the first uplink transmission will be dropped by the UE based at least in part on transmitting the additional grant.

43. The apparatus of claim 42, wherein the instructions are further executable by the processor to cause the apparatus to:
receive the additional uplink transmission and a piggybacked portion of the first uplink transmission.

44. The apparatus of claim 40, wherein the first uplink transmission comprises a high priority uplink control channel transmission or a high priority uplink shared channel transmission.

45. The apparatus of claim 40, wherein the second uplink transmission comprises a low priority uplink control channel transmission, a low priority uplink shared channel transmission, or a sounding reference signal transmission.

46. The apparatus of claim 40, wherein the additional uplink transmission comprises an additional high priority uplink transmission.

47. The apparatus of claim 40, wherein the additional grant comprises a group-common grant, an uplink cancelation indication, or a slot format indicator.

48. An apparatus for wireless communication at a base station, comprising:

a processor, memory coupled with the processor; and instructions stored in the memory and executable by the processor to cause the apparatus to:

identify that a first uplink transmission scheduled for transmission by a user equipment (UE) at least partially overlaps with a second uplink transmission also scheduled for transmission by the UE;

transmit an uplink cancelation indication for a frequency-time resource that at least partially overlaps with the first uplink transmission, the second uplink transmission, or both;

determine the second uplink transmission will be dropped by the UE based at least in part on a first scheduling constraint to resolve overlapping between the first uplink transmission and the second uplink transmission, wherein the first scheduling constraint is based at least in part on a first priority of the first uplink transmission being greater than a second priority of the second uplink transmission; and receive the first uplink transmission in accordance with a second scheduling constraint, wherein the second scheduling constraint is evaluated after satisfaction of the first scheduling constraint, and wherein the second scheduling constraint relates to the frequency-time resource at least partially overlapping with the first uplink transmission, the second uplink transmission, or both.

49. The apparatus of claim 48, wherein the instructions to receive the first uplink transmission in accordance with the second scheduling constraint are executable by the processor to cause the apparatus to:

determine the first uplink transmission will be dropped by the UE based at least in part on the frequency-time resource at least partially overlapping with the first uplink transmission.

50. The apparatus of claim 48, wherein the instructions to receive the first uplink transmission in accordance with the second scheduling constraint are executable by the processor to cause the apparatus to:

receive the first uplink transmission based at least in part on the frequency-time resource at least partially overlapping with the second uplink transmission.

51. The apparatus of claim 48, wherein the first uplink transmission comprises a high priority uplink control channel transmission or a high priority uplink shared channel transmission.

52. The apparatus of claim 48, wherein the second uplink transmission comprises a low priority uplink control channel transmission, a low priority uplink shared channel transmission, or a sounding reference signal transmission.

* * * * *